US005642101A

United States Patent [19]
Stirk et al.

[11] Patent Number: 5,642,101
[45] Date of Patent: *Jun. 24, 1997

[54] CONTROL APPARATUS FOR USE IN A DWELLING

[75] Inventors: Gary L. Stirk, Arnold; John M. Jamieson, III, Saverna Park, both of Md.; Rob L. Cowden, Washington, D.C.; Susan M. Prothro; John S. Owens, both of West River, Md.; Krishna P. Mikkilineni, New Hope; Philip J. Zumsteg, Minneapolis, both of Minn.; Kenneth P. Wacks, Stoneham, Mass.

[73] Assignee: Building Technology Associates, Wilmington, Del.

[*] Notice: The term of this patent shall not extend beyond the expiration date of Pat. No. 5,218,552.

[21] Appl. No.: 109,987

[22] Filed: Aug. 23, 1993

Related U.S. Application Data

[63] Continuation of Ser. No. 721,328, Jul. 21, 1991, abandoned, which is a continuation of Ser. No. 560,034, Jul. 30, 1990, Pat. No. 5,218,552.

[51] Int. Cl.$^6$ ................................................. G05B 23/02
[52] U.S. Cl. ..................... 340/825.08; 340/825.06; 340/825.07; 340/310.01; 340/310.06; 364/492; 364/131
[58] Field of Search .................. 340/825.08, 825.07, 340/538, 310.01, 310.06, 310.07, 310.08, 825.06; 370/85.8, 85.9, 95.2, 85.1, 60; 364/492, 131, 480, 138, 140, 141

[56] References Cited

U.S. PATENT DOCUMENTS

| | | |
|---|---|---|
| 3,723,973 | 3/1973 | Kennedy . |
| 4,418,333 | 11/1983 | Schwarzbach et al. . |
| 4,540,890 | 9/1985 | Gangemi et al. ................ 340/310 A |
| 4,586,128 | 4/1986 | DeWoskin . |
| 4,665,544 | 5/1987 | Honda et al. . |
| 4,703,306 | 10/1987 | Barritt . |
| 4,737,657 | 4/1988 | Jatko et al. ........................ 340/310 R |
| 4,755,792 | 7/1988 | Pezzolo et al. . |
| 4,779,264 | 10/1988 | Glover .................................. 370/85 |
| 4,796,025 | 1/1989 | Farley et al. ......................... 370/95.2 |
| 4,831,558 | 5/1989 | Shoup et al. . |
| 4,899,129 | 2/1990 | MacFadyen et al. . |
| 4,899,217 | 2/1990 | MacFayden et al. . |
| 4,947,278 | 8/1990 | Nichols, III . |
| 4,962,379 | 10/1990 | Yasuda et al. . |
| 4,964,058 | 10/1990 | Brown, Jr. . |
| 5,003,457 | 3/1991 | Ikei et al. . |
| 5,061,922 | 10/1991 | Nishijima et al. ................. 340/310 A |
| 5,086,385 | 2/1992 | Launey et al. . |
| 5,101,191 | 3/1992 | MacFadyen et al. .............. 340/310 R |
| 5,218,552 | 6/1993 | Stirk et al. ........................... 364/492 |

OTHER PUBLICATIONS

CEBus: "A New Standard in Home Automation", Circuit Cellar Ink,; Aug. 1989, Issue 10 pp. 40–52.
X–10 Powerhouse; X–10 (USA) Inc., Northvale, NJ; Ad in Circuit Cellar Ink; Aug. 1989, Issue 10, p. 53.
Ralph Lee Smith, "Smart House–The Coming Revolution in Housing", 1988, (pp. 49–74).
Article entitled "Smart House Technical Overview", May 1989 (pp. 1–8).
Article entitled "Technical Overview of the Smart House System", Oct. 1988 (pp. 1–12).

Primary Examiner—John K. Peng
Assistant Examiner—Andrew Hill
Attorney, Agent, or Firm—Cushman Darby & Cushman, L.L.P.

[57] ABSTRACT

A controller that operates using two different processors is provided. Each processor performs certain predetermined functions. A control processor is responsible for switching AC power distribution and control, while a message processors is responsible for messaging. A polling scheme and arbitration logic prevent data transfers relating to these two processors from interfering with each other. A configurable interface allows many different types of appliances to attach to the system, and a serial multimode interface further enhances the configurability of the system.

12 Claims, 92 Drawing Sheets

FIG. 3A

| Byte | Bit 7 | Bit 6 | Bit 5 | Bit 4 | Bit 3 | Bit 2 | Bit 1 | Bit 0 |
|---|---|---|---|---|---|---|---|---|
| 0 | Upstream Status Parity Error | Upstream Status Pending | Interface CKT Self-Test Result | | x | Downstream Sync Error | Downstream Framing Error | Downstream Command Parity Error |
| 1 | Long address (LSB) ||||||||
| 2 | Long address (MSB) ||||||||
| 3 | spare ||||||||
| 4 | x | Appl Fault Trip (1 = trip) (0 = ok) | x | Power CKT Test Results (1 = fail & trip) (0 = pass) | x | Power CKT ON/OFF Status (1 = on) (0 = off) | x | Conventional Appliance Plugged In (1 = present) (0 = not) |
| 5 | x | x | x | x | Node Device Class 3 | Node Device Class 2 | Node Device Class 1 | Node Device Class 0 |
| 6 | x | Appliance Channel Parity Error | Appliance CKT Self-Test Result | App Chan Mode (0 = simple) (1 = serial) | App CKT Mode (0 = normal) (1 = complex) | App Status 2 | App Status 1 | App Status 0 |
| 7 | Appliance Report (8 bits) ||||||||

FIG. 3B

| Byte | Bit 7 | Bit 6 | Bit 5 | Bit 4 | Bit 3 | Bit 2 | Bit 1 | Bit 0 |
|---|---|---|---|---|---|---|---|---|
| 0 | Downstream Command Change | x | Interface CKT Self-Test | x | x | x | x | Interface CKT Error Reset |
| 1 | Long address (LSB) | | | | | | | |
| 2 | Long address (MSB) | | | | | | | |
| 3 | x | x | Tickle Flag (1 = tickling) (0 = normal) | Short address (5 bits) | | | | |
| 4 | x | x | x | x | Power CKT Logic Self Test (1 = test) | x | Test Fail & Appl Fault Reset (1 = reset) | Power Switch Control (1 = on) (0 = off) |
| 5 | Power block spare (8 bits) | | | | | | | |
| 6 | Spare (7 bits) | | | | | Branch Reset (BSC→AC) | Appliance Error Reset | Test Appliance Channel | Control Bit |
| 7 | Appliance Report (8 bits) | | | | | | | |

| Bit 3 | Bit 2 | Bit 1 | Bit 0 | Description |
|---|---|---|---|---|
| 0 | 0 | 0 | 0 | Switch/sensor outlet |
| 0 | 0 | 0 | 1 | Applications outlet |
| 0 | 0 | 1 | 0 | Receptacle block, 15A |
| 0 | 0 | 1 | 1 | Receptacle block, 20A |
| 0 | 1 | 0 | 0 | Fixture block, 15A, non-dimming |
| 0 | 1 | 0 | 1 | Fixture block, 20A, non-dimming |
| 0 | 1 | 1 | 0 | Fixture block, 5A, dimming |
| 0 | 1 | 1 | 1 | Spare |
| 1 | 0 | 0 | 0 | UPS |
| 1 | 0 | 0 | 1 | Remote control device for fixed 120/240 VAC devices |
| 1 | 0 | 1 | 0 | Spare |
| 1 | 0 | 1 | 1 | Spare |
| 1 | 1 | 0 | 0 | Gas outlet |
| 1 | 1 | 0 | 1 | Gas branch controller |
| 1 | 1 | 1 | 0 | Whole-house shutoff valve |
| 1 | 1 | 1 | 1 | Spare |

| AS2 (ADATA) | AS1 (NACLK) | AS0 (ACLK) | Definition | Power Deliv. |
|---|---|---|---|---|
| H | H | H | No SMART HOUSE appliance | No, unless CONV APPL |
| H | H | L | Toggle | NO |
| H | L | H | Neutral | NO |
| H | L | L | On | NO |
| L | H | H | Appliance Fault | NO |
| L | H | L | Power allowed | YES* |
| L | L | H | Off | NO |
| L | L | L | Force on | YES |

| Synchronization Encoding |||
|---|---|---|
| 3rd bit | 4th bit | Meaning |
| 0 | 0 | Control Poll |
| 0 | 1 | Message Poll |
| 1 | 0 | Data sync |
| 1 | 1 | Reset sync |

| Link Layer Control Byte (LLCB) ||||
|---|---|---|---|
| Bit # | 7 | 6 | 5 | 4 3 2 1 0 |
| 1 = | x | Upstream | Message | Short address |
| 0 = | x | Downstream | Control | |

*FIG. 3I*

| 1st bit | 2nd Bit | 3rd bit | 4th bit | Meaning |
|---|---|---|---|---|
| 1 | 1 | 0 | 0 | Upstream Status |
| 1 | 1 | 0 | 1 | Downstream Command |
| 1 | 1 | 1 | 0 | Downstream Msg. |
| 1 | 1 | 1 | 1 | Upstream Msg. |
| 0 | 0 | 1 | 1 | Control Poll |
| 0 | 0 | 1 | 0 | Message Poll |
| 0 | 0 | 0 | 0 | Commerr |

| Downstream Message CSR (DMCSR) | | | | |
|---|---|---|---|---|
| Bit #s | 15 — 11 | 10 | 9 — 5 | 4 — 0 |
| | spare | Downstream Message Present | Branch # | Node # |

| Upstream Message CSR (UMCSR) | | | | | |
|---|---|---|---|---|---|
| Bit #s | 15 | 14 — 11 | 10 | 9 — 5 | 4 — 0 |
| | Parity error | spare | Ready for Upstream Message | Branch # | Node # |

— 0000 Null Packet
— 0100 Variable-length Data
— 0101 Acknowledgement Packet
— 0110 Variable-length Data with CRC
— 1000 Reset Packet
— 1001 Reset Acknowledgement
— 1010 Test Request
— 1011 Test Response SMART HOUSE Core Language Message Types
July 27, 1990
msgtable.mp 2.6 5/22/90

| Message Type[9] | Hex Number | Parameters (≤ 60 bytes) | Return[1] |
|---|---|---|---|
| Message Exchange Control: | | | |
| Null | 00 | — | — |
| Message-confirmation | 01 | Execution status (1 byte)<br>Identification tag (1 byte) | — |
| Deferred-execution-notification | 02 | Identification tag (1 byte) | — |
| System Configuration Messages: | | | |
| Set-node-address | 10 | Node number (1 byte) | — |
| Set-house-PIN | 11 | New House PIN (2 bytes)[8]<br>Old House PIN (2 bytes)[8] | — |
| Set-system-time/date | 12 | Seconds (1 byte)<br>Minutes (1 byte)<br>Hours (1 byte)<br>Date (1 byte)<br>Month (1 byte)<br>Year (1 byte) | — |
| Set-node-configuration | 13 | Physical address (2 bytes)<br>Node location encoding (2 bytes)<br>Endpoint location encoding (2 bytes)<br>Light group membership flag (1 byte) | — |
| Authorize-remote-service | 14 | Service provider ID (4 bytes) | 15 |

FIG. 3LI

| | | | |
|---|---|---|---|
| Remote-service-authorization-confirmation | | Access privileges (1 byte) | — |
| Deauthorize-remote-service | 15 | Access key (4 bytes) | — |
| | 16 | Service provider ID (4 bytes) Access privileges (1 byte) | — |
| Appliance Registration Messages: | | | |
| Register-appliance | 30 | Appliance functional type (2 bytes) | 36 |
| Register-appliance-languages | 32 | Languages (8 bytes³) | — |
| Register-touch-tone-application | 33 | Submenu number (1 byte) | — |
| Register-technician's-device | 34 | Authentication code (4 bytes) | — |
| Register-applications-manager | 35 | Authentication code (4 bytes) | — |
| Registration-confirmation | 36 | Physical address (2 bytes) | — |
| Remote Service Registration Messages: | | | |
| Register-remote-service | 40 | Service provider ID (4 bytes) Authentication code (4 bytes) | 41 |
| Remote-service-registration-confirmation | 41 | Physical address (2 bytes) Access privileges (1 byte) | — |
| Receive-SMART HOUSE-identification | 42 | SMART HOUSE serial number (4 bytes) Authentication code (4 bytes) | — |
| Remote Service Request Messages: | | | |
| | — | — | — |

FIG. 3L2

| System Service Request Messages: | | |
|---|---|---|
| Request-time/date | 50 | — |
| Time/date-response[1] | 51 | Seconds (1 byte)<br>Minutes (1 byte)<br>Hours (1 byte)<br>Day-of-week (1 byte)<br>Date (1 byte)<br>Month (1 byte)<br>Year (1 byte) | 51 |
| Request-database-access-permission | 52 | Database number (2 bytes) | — |
| Remove-database-access-permission | 53 | Database number (2 bytes) | — |
| Database-change-notification | 54 | Database number (2 bytes)<br>Entry number (2 bytes) | — |
| Query-database | 55 | Database number (2 bytes)<br>Field number (1 byte[7])<br>*if field number ≠ don't care:*<br>Relational (1 byte)<br>Value (2 bytes)<br>Mask (2 bytes) | 56 |
| Database-query-response | 56 | Database number (2 bytes)<br>Entry number (2 bytes)<br>Packet number (2 bytes[4])<br>Data (1-54 bytes) | — |
| Time/date-notification[1] | 57 | Seconds (1 byte)<br>Minutes (1 byte)<br>Hours (1 byte)<br>Day-of-week (1 byte) | — |

FIG. 3L3

| | | | |
|---|---|---|---|
| Set-system-variable | 58 | Date (1 byte)<br>Month (1 byte)<br>Year (1 byte) | — |
| Set-system-variable-bits | 59 | Variable number (1 byte)<br>Variable value (1 byte) | — |
| Clear-system-variable-bits | 5A | Variable number (1 byte)<br>Variable bits (1 byte) | — |
| Verify-house-PIN | 5B | Variable number (1 byte)<br>Variable bits (1 byte) | — |
| | | House PIN (2 bytes)[8] | — |
| Telephone Gateway Service Request Messages: | | | |
| Establish-uninterpreted-data-link | 60 | Call type (1 byte)<br>Data rate (1 byte)<br>Communications parameters (1 byte)<br># data bits (7 or 8)<br>parity (none, even, odd, mark, space)<br># stop bits (1, 1.5, 2)<br>Call priority (1 byte)<br>Telephone number (1-40 bytes) | 61 |
| Uninterpreted-data-link-confirmation | 61 | Link number (1 byte)[16]<br>Rejection type (1 byte) | — |
| Send-telephone-data | 62 | Link number (1 byte)<br>Data (1-59 bytes) | — |
| Receive-telephone-data | 63 | Link number (1 byte)<br>Data (1-59 bytes) | — |

| | | | |
|---|---|---|---|
| Terminate-uninterpreted-data-link | 64 | Link number (1 byte) | — |
| Uninterpreted-data-link-termination-notification | 65 | Link number (1 byte) | — |
| Establish-interpreted-communications | 66 | Call type (1 byte)<br>Data rate (1 byte)<br>Communications parameters (1 byte)<br>  # data bits (7 or 8)<br>  parity (none, even, odd, mark, space)<br>Call priority (1 byte)<br>Telephone number (1-40 bytes) | 67 |
| Interpreted-communications-confirmation | 67 | Link number (1 byte)[16]<br>Rejection type (1 byte) | — |
| Terminate-interpreted-communications | 68 | Link number (1 byte) | — |
| Interpreted-communications-termination-notification | 69 | Link number (1 byte) | — |
| Enable-auto-answer | 6A | Enable data calls (1 byte)<br>Enable touch-tone applications (1 byte)<br>Distinctive ring detect (1 byte)<br>Number of rings (1 byte) | — |
| Disable-auto-answer | 6B | — | — |
| Establish-incoming-data-link | 6C | Physical address (2 bytes) | — |
| Incoming-data-link-notification | 6D | Link number (1 byte)<br>Call type (1 byte)<br>Data rate (1 byte)<br>Telephone number (1-40 bytes) | — |
| Establish-touch-tone-application | 6E | Call priority (1 byte) | 6F |

| | | |
|---|---|---|
| Start-touch-tone-application | 6F | Telephone number (1-40 bytes) |
| End-touch-tone-application | 70 | Link number (1 byte)[16] Rejection type (1 byte) Submenu number (1 byte) Telephone number (1-40 bytes) |
| Receive-touch-tone | 71 | Link number (1 byte) Touch-tone character (1 byte) |
| Send-touch-tone | 72 | Link number (1 byte) Touch-tone character (1 byte) |
| Send-voice-message | 73 | Link number (1 byte) Message numbers (2-44 bytes)[15] |
| Terminate-touch-tone-application | 74 | Link number (1 byte) |
| Telephone-gateway-error-notification | 75 | Link number (1 byte) Error code (1 byte) |
| Non-abortable-voice-message-completion-notification | 76 | Link number (1 byte) |
| Bridge-touch-tone-application-to-audio | 77 | Link number (1 byte) |
| Request-telephone-link-status | 78 | — |
| Telephone-link-status-response | 79 | Link status (1-30 bytes) |
| Coaxial Service Request Messages: | | |
| Request-tx-channels-by-number | 80 | Band number (1 byte) |

| | | | |
|---|---|---|---|
| Request-tx-channels-from-band | 81 | Begin channel number (1 byte)<br>Number of channels (1 byte) | |
| Tx-channels-confirmation | 82 | Band number (1 byte)<br>Number of channels (1 byte) | 82 |
| Release-tx-channels-by-number | 83 | Begin channel number (1 byte)<br>Number of channels (1 byte) | — |
| Band number (1 byte)<br>Begin channel number (1 byte)<br>Number of channels (1 byte) | | | — |
| Appliance-to-Appliance Communication Messages: | | | |
| Send-message-by-address | 94 | Physical address (2 bytes)<br>Language (2 bytes)<br>Data (1-56 bytes) | — |
| Send-message-by-language | 96 | Language (2 bytes)<br>Data (1-56 bytes) | — |
| Receive-message | 97 | Source (2 bytes)<br>Language (2 bytes)<br>Data (1-56 bytes) | — |
| Programmable Control Messages: | | | |
| Set-switch-control | A5 | Physical address of target (2 bytes)<br>Physical address of switch (2 bytes) | — |
| Remove-switch-control | A6 | Physical address of target (2 bytes)<br>Physical address of switch (2 bytes) | — |
| Set-switch-indicator-mapping | A7 | Physical address of target (2 bytes)<br>Physical address of switch (2 bytes) | — |

FIG. 3L8

| | | |
|---|---|---|
| Remove-switch-indicator-mapping | A8 | Physical address of target (2 bytes)<br>Physical address of switch (2 bytes) |
| Set-TOD-on-control[13] | A9 | Physical address of target (2 bytes)<br>Minutes (1 byte)<br>Hours (1 byte)<br>Day-of-week (1 byte)<br>Date (1 byte)<br>Month (1 byte)<br>Year (1 byte) |
| Remove-TOD-on-control[13] | AA | Physical address of target (2 bytes)<br>Minutes (1 byte)<br>Hours (1 byte)<br>Day-of-week (1 byte)<br>Date (1 byte)<br>Month (1 byte)<br>Year (1 byte) |
| Set-TOD-off-control[13] | AB | Physical address of target (2 bytes)<br>Minutes (1 byte)<br>Hours (1 byte)<br>Day-of-week (1 byte)<br>Date (1 byte)<br>Month (1 byte)<br>Year (1 byte) |
| Remove-TOD-off-control[13] | AC | Physical address of target (2 bytes)<br>Minutes (1 byte)<br>Hours (1 byte)<br>Day-of-week (1 byte)<br>Date (1 byte)<br>Month (1 byte)<br>Year (1 byte) |

FIG. 3L9

| | | | |
|---|---|---|---|
| Set-on-delay | AD | Physical address of target (2 bytes)<br>Delay interval (2 bytes) | — |
| Set-off-delay | AE | Physical address of target (2 bytes)<br>Delay interval (2 bytes) | — |
| Set-toggle-delay | AF | Physical address of target (2 bytes)<br>Delay interval (2 bytes) | — |
| Set-high-priority-event/action[12] | B0 | Physical address of target (2 bytes)<br>Event set number (2 bytes)<br>Event logic (1 byte)<br>Control action type (1 byte)<br>Power action type (1 byte)<br>System permanent flag (1 byte)<br>Days applicable (1 byte)<br>Delay interval (2 bytes)<br>Begin time (2 bytes)<br>End time (2 bytes)<br>*four times, one for each entry:*<br>When/while flag (1 byte)<br>Source address (2 bytes)<br>Status byte number (1 byte)<br>Mask (1 byte)<br>Relational logic (1 byte)<br>Value (1 byte) | |
| Remove-high-priority-event/action[12] | B1 | Physical address of target (2 bytes)<br>Event set number (2 bytes) | — |
| Set-dynamic-event/action | B2 | Sequence number (2 bytes)<br>*for the first packet of a set:*<br>Eventual length of entries and actions (2 bytes)<br>System permanent flag (1 byte)<br>Event entry relational logic (1 byte) | B8[17] |

FIG. 3LI0

| | | |
|---|---|---|
| | | Delay interval (2 bytes)<br>Action source address (2 bytes)<br>Event entries (0-45 bytes)<br><br>*for other packets of the set:*<br>Event entries (0-53 bytes) |
| Remove-dynamic-event/action | B3 | Event set unique ID (2 bytes) |
| Set-appliance-report-mapping-entry | B4 | Source physical address (2 bytes)<br>Destination physical address (2 bytes) |
| Remove-appliance-report-mapping-entry | B5 | Destination physical address (2 bytes) |
| Dynamic-event/action-identification-notification | B8 | Unique ID (2 bytes) |
| Direct Control Messages: | | |
| Set-appliance-report | C0 | Physical address (2 bytes)<br>Appliance report value (1 byte) |
| Set-appliance-report-bits | C1 | Physical address (2 bytes)<br>Appliance report bits (1 byte) |
| Clear-appliance-report-bits | C2 | Physical address (2 bytes)<br>Appliance report bits (1 byte) |
| Toggle-appliance-report-bits | C3 | Physical address (2 bytes)<br>Appliance report bits (1 byte) |
| Set-control-bit | C4 | Physical address (2 bytes) |
| Clear-control-bit | C5 | Physical address (2 bytes) |
| Toggle-control-bit | C6 | Physical address (2 bytes) |

FIG. 3LII

| | | | |
|---|---|---|---|
| Apply-power-by-address | C7 | Physical address (2 bytes) | — |
| Remove-power-by-address | C8 | Physical address (2 bytes) | — |
| Toggle-power-by-address | C9 | Physical address (2 bytes) | — |
| Apply-power-by-light-group | CA | Location encoding mask (2 bytes)<br>Relational (1 byte)<br>Location encoding value (2 bytes) | — |
| Remove-power-by-light-group | CB | Location encoding mask (2 bytes)<br>Relational (1 byte)<br>Location encoding value (2 bytes) | — |
| Query-power-by-light-group | CC | Location encoding mask (2 bytes)<br>Relational (1 byte)<br>Location encoding value (2 bytes) | CD |
| Light-group-power-response | CD | Powered light count (2 bytes) | — |
| Status and Diagnostic Messages: | | | |
| Request-software-version | E0 | — | E1 |
| Software-version-response | E1 | Message processor version (2 bytes)<br>Control processor version (2 bytes)<br>Telephone gateway CPS version (3 bytes)<br>Telephone gateway version (2 bytes)<br>Telephone gateway type (1 byte)<br>Telephone gateway ring-through support (1 byte) | — |
| Request-controller-information | E2 | — | E3 |
| Controller-information-response | E3 | Controller serial number (4 bytes) | — |

FIG. 3LI2

| | | | |
|---|---|---|---|
| Request-diagnostic-results | | | E5 |
| Diagnostic-results-response | E4 | Branches present (4 bytes)<br>Branches functioning (4 bytes)<br>Telephone gateway functioning (1 byte)<br>Telephone gateway powerup status (1 byte)<br>Last startup time (7 bytes)<br>Last shutdown time (7 bytes) | — |
| Perform-appliance-self-test | E5 | Control processor results (2 bytes)<br>Message processor results (2 bytes)<br>Optional RAM present (1 byte)<br>Serial port test results (1 byte)<br>Real-time clock test results (1 byte) | E8 |
| Appliance-self-test-response | E7 | Physical address (2 bytes) | — |
| Request-node-information | E8 | Pass/fail status (1 byte) | EA |
| Node-information-response | E9 | Physical address (2 bytes) | — |
| Request-system-status | EA | Physical address (2 bytes)<br>Node status bytes (8 bytes)<br>Node command bytes (8 bytes) | EC |
| System-status-response | EB | — | — |
| System-status-notification | EC<br>ED | Incoming data call count (1 byte)<br>Outgoing data call count (1 byte)<br>Touch-tone application count (1 byte)<br>Configuration database error (1 byte)<br>System controller malfunction (1 byte)<br>Communications malfunction (1 byte)<br>House mode (1 byte) | |

FIG. 3L13

| | | | | | |
|---|---|---|---|---|---|
| System Management Messages: | | | | | |
| Shutdown-system | F0 | UPS status (1 byte)<br>RCD status A (1 byte)<br>RCD status B (1 byte)<br>WHSV status (1 byte)<br>GBC status A (1 byte)<br>GBC status B (1 byte)<br>GBC status C (1 byte)<br>Gas malfunction (1 byte)<br>Electrical distribution malfunction (1 byte)<br>Telephone malfunction (1 byte)<br>Coaxial malfunction (1 byte) | | | |
| Reset-system | F2 | — | | | |
| Receive-from-node | FD | Physical address (2 bytes)<br>Identification tag (1 byte)<br>Data (2-57 bytes) | | | |
| Transmit-to-node | FE | Physical address (2 bytes)<br>Data (2-58 bytes) | | | |

1 Message Type number of any returned response, in addition to the Message-confirmation which is returned for every Message Type execution and the Deferred-execution-notification which is returned for every deferred Message Type execution.
2 Up to 116 functional type restrictions at 2 bytes each.
3 Up to 4 appliance languages at 2 bytes each.
4 Packet number of 0 indicates final packet of response.
5 Up to 4 appliance functional type and room combinations at 3 bytes each (2 bytes/type, 1 byte/room).
6 Limited by available data space in Receive-message (697) message type.
7 A value of FFhex (for bytes) or FFFFhex (for words) indicates "don't care" for commands and "unknown" for responses.
8 Implementation of Core Language Message Types with names in *italics* has been deferred until such time as the functionality is required.
9 Implementation of Core Language Message Types with names in *italics* has been deferred until such time as the functionality is required.
11 May only be issued by an appliance which accommodates SMART HOME requirements for conflict detection and resolution logic.
12 Any combination of the seconds, minutes, hours, day-of-week, date, month, and year parameters may be set to FFhex to indicate "don't care" for this parameter. This will create a periodic event.

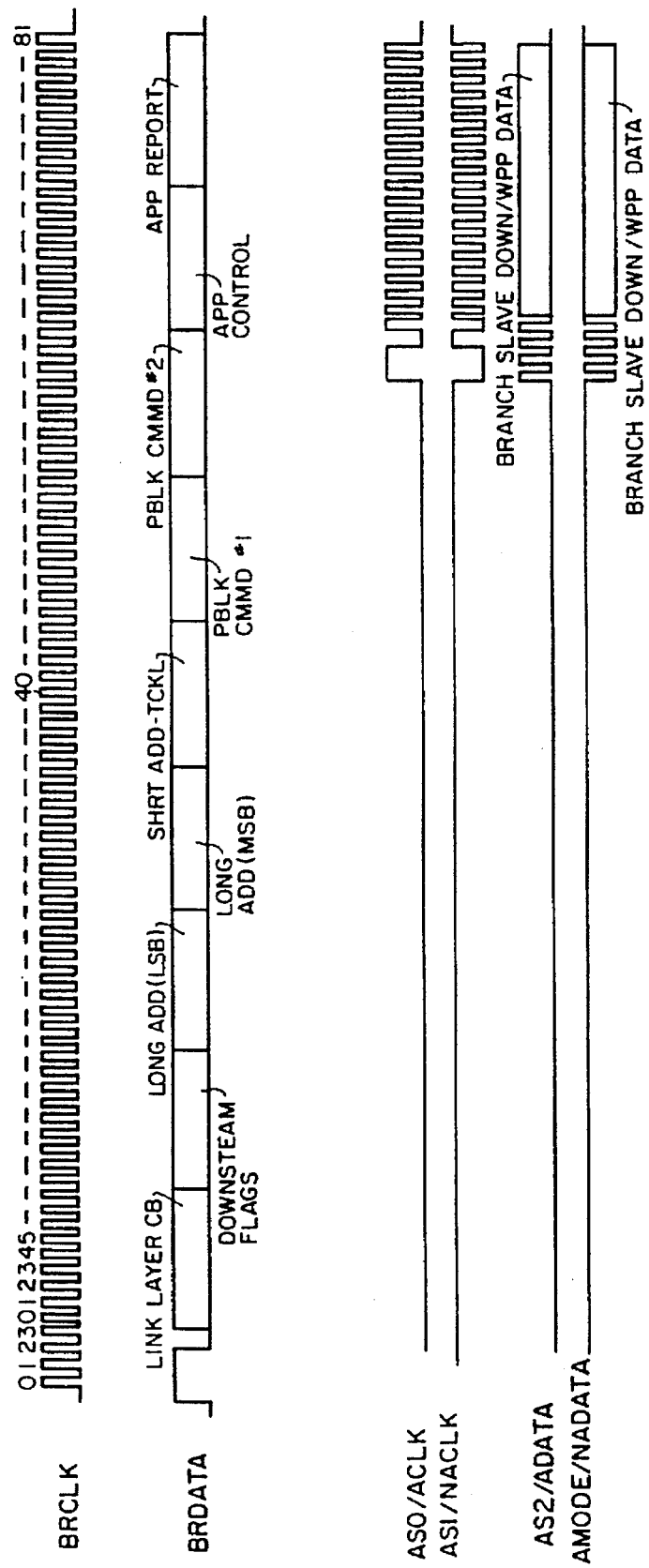

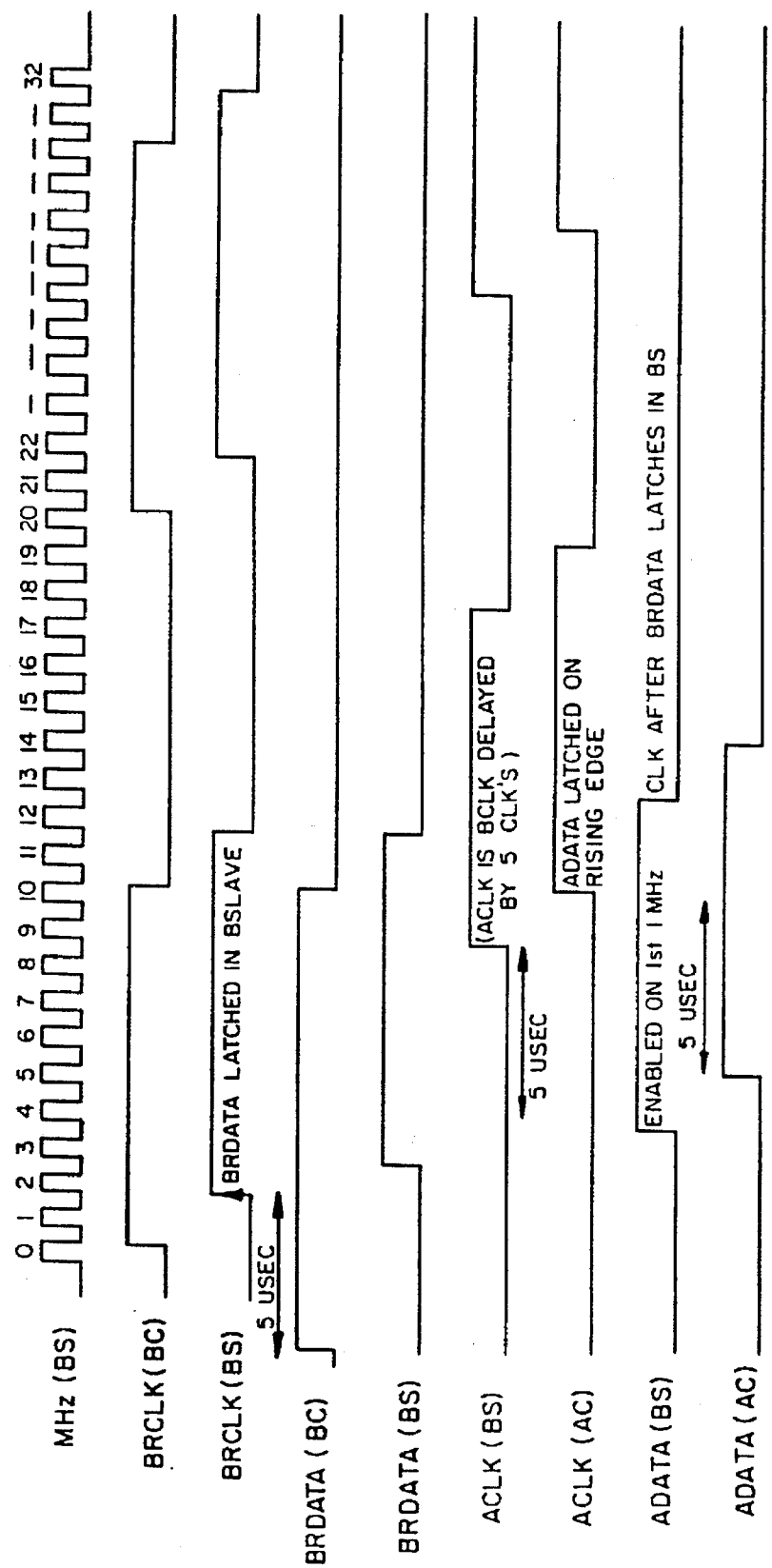

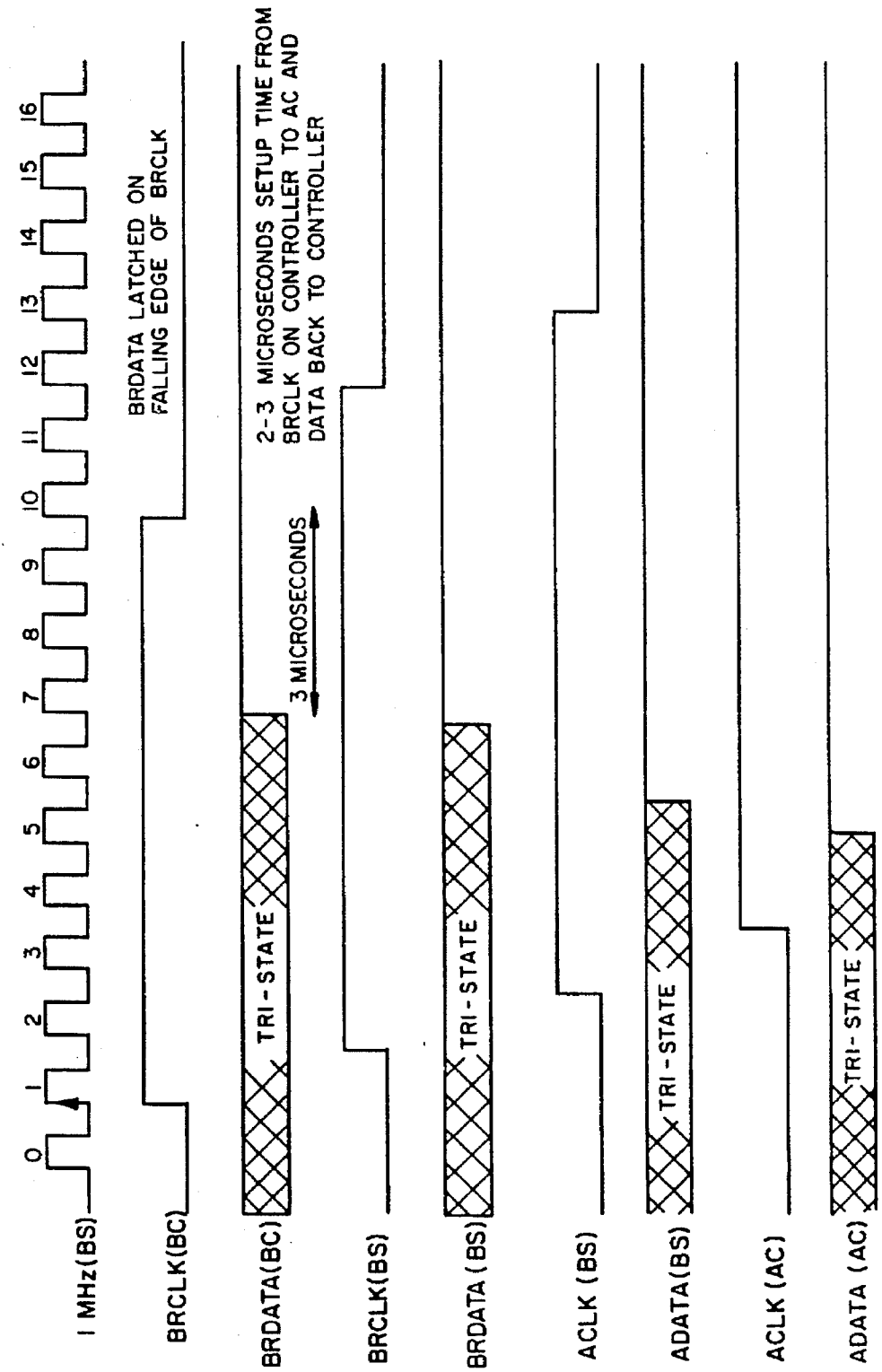

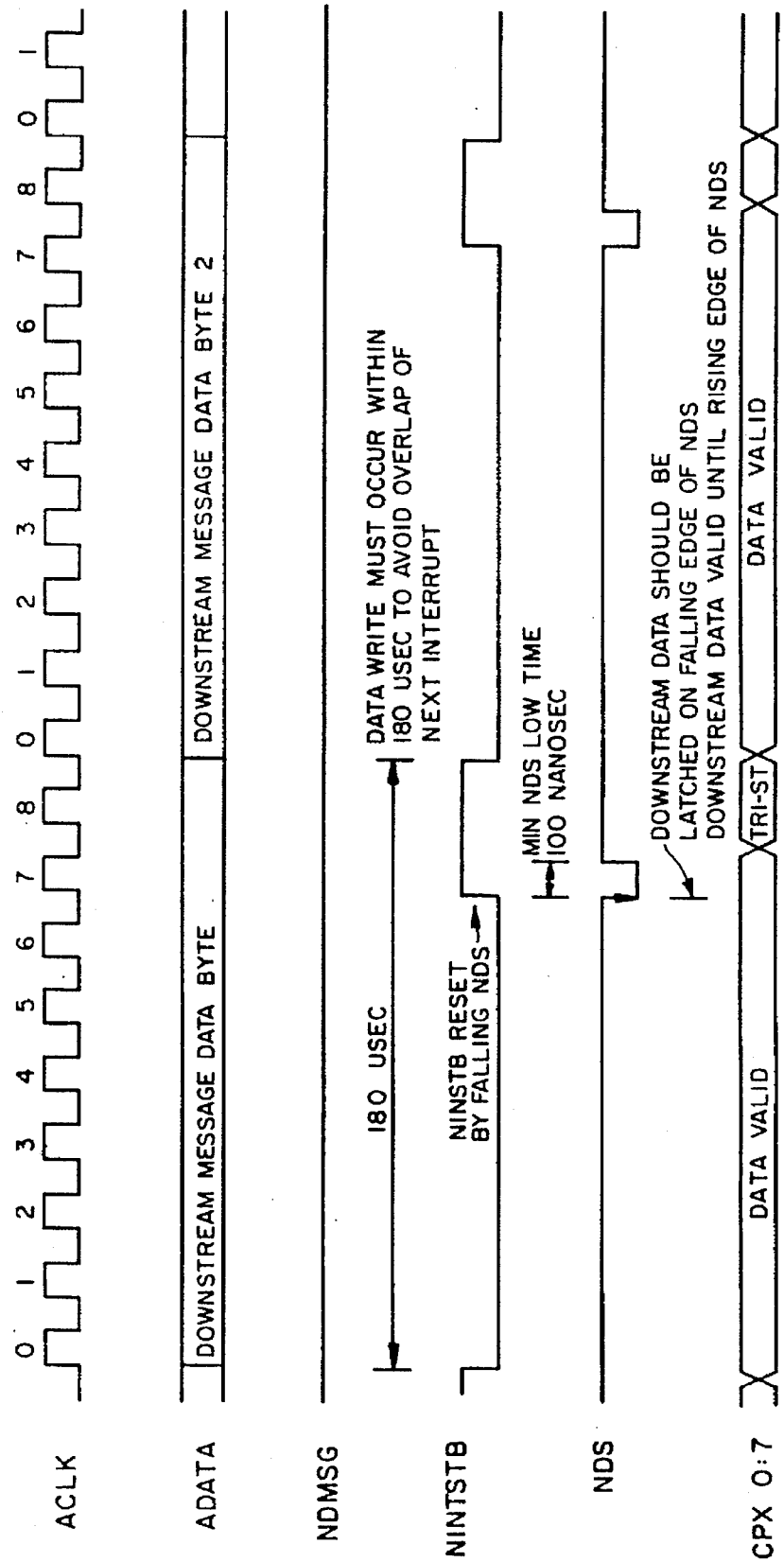

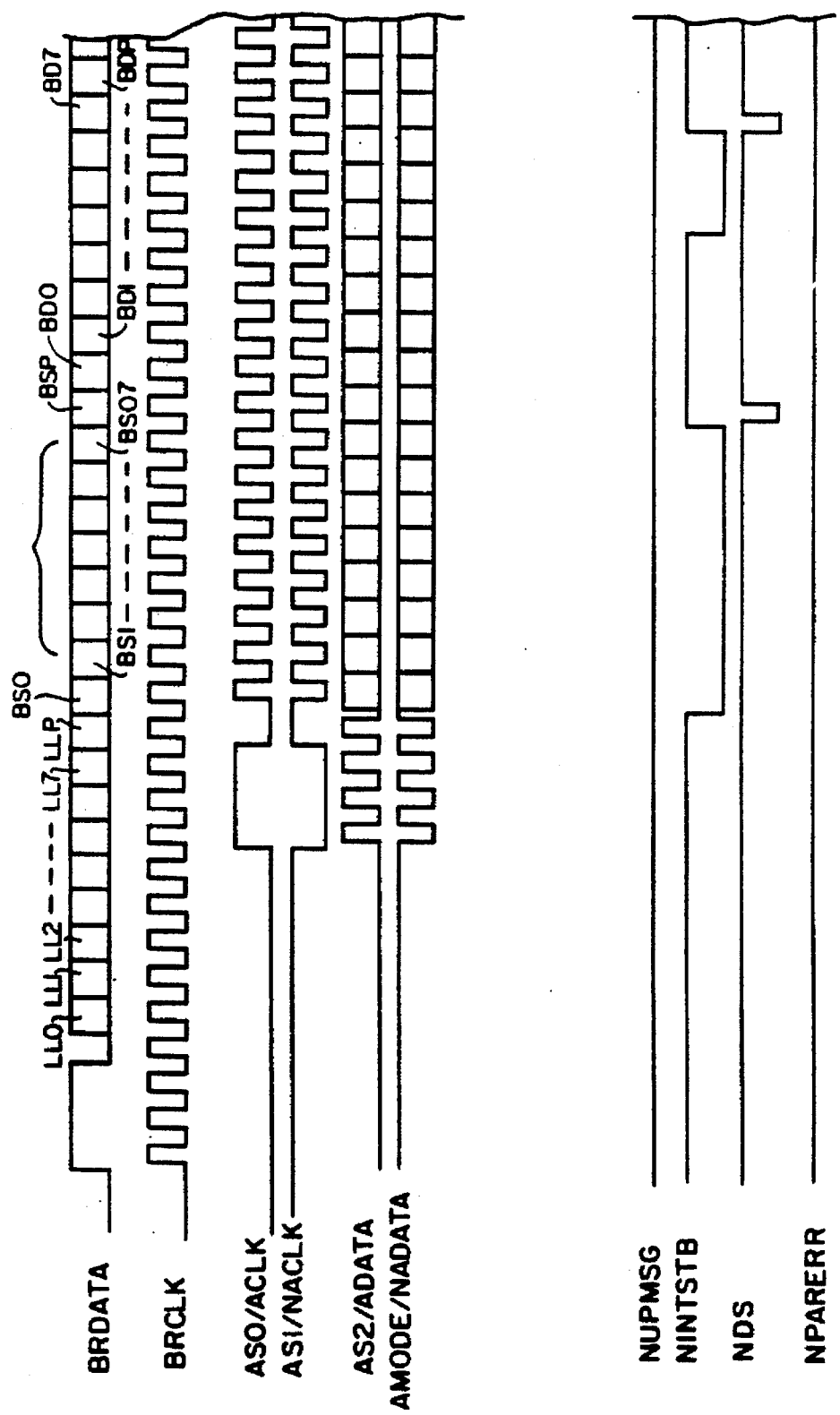

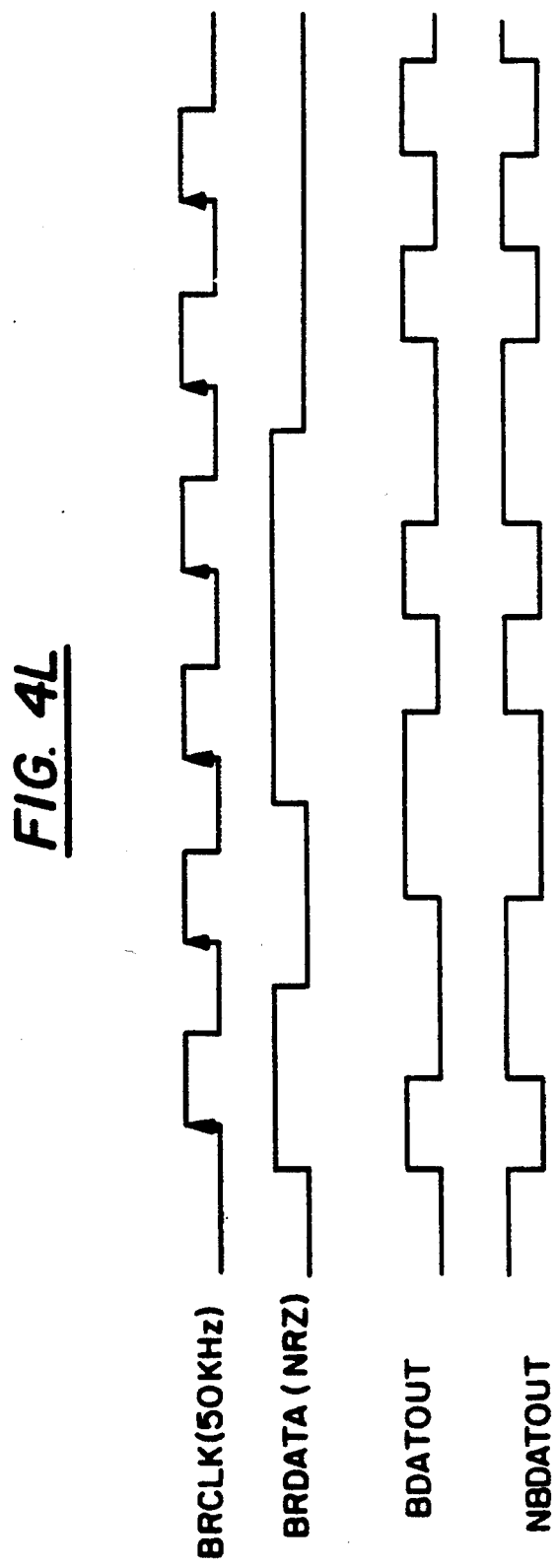

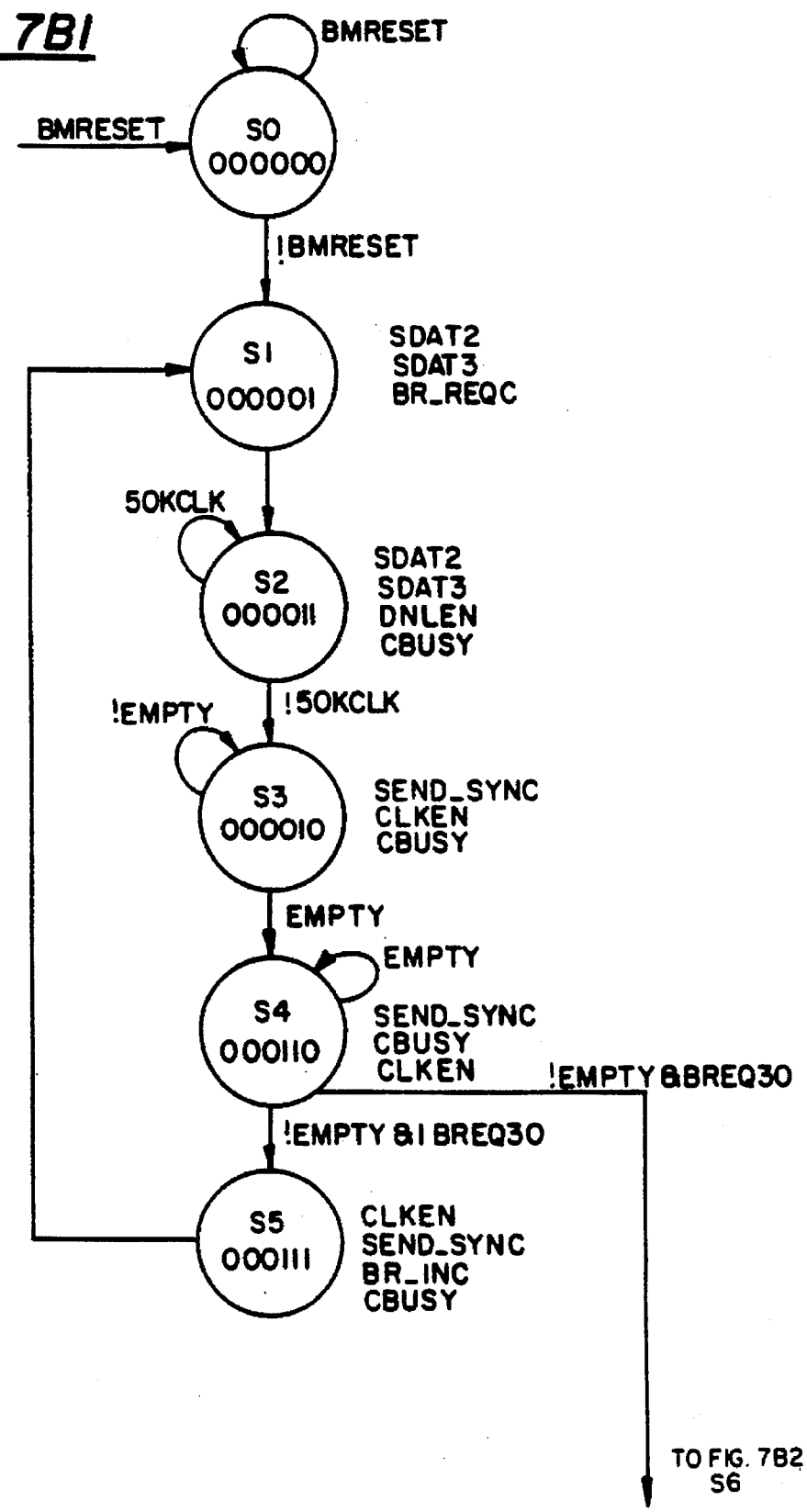
FIG. 7B1

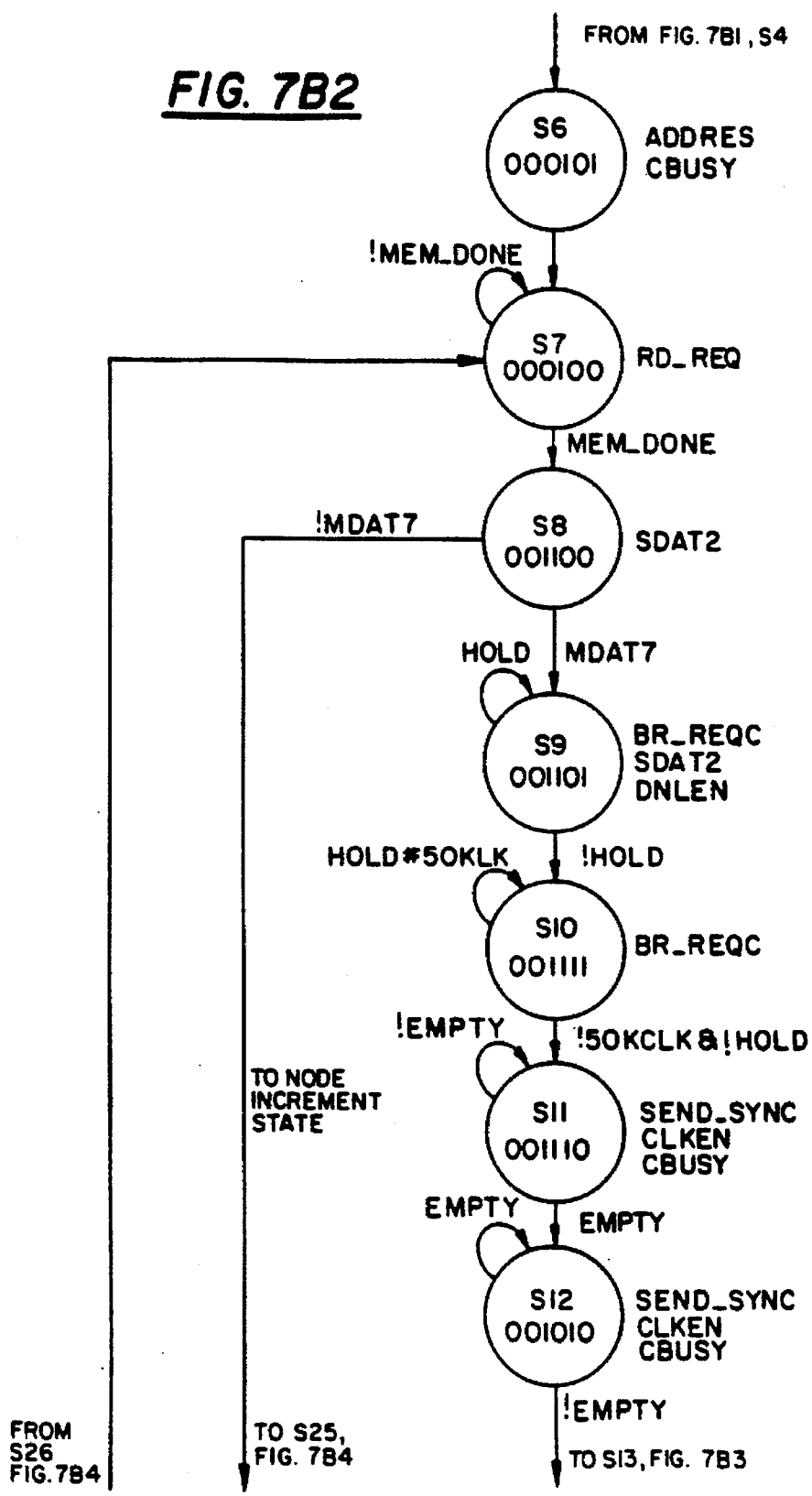
FIG. 7B2

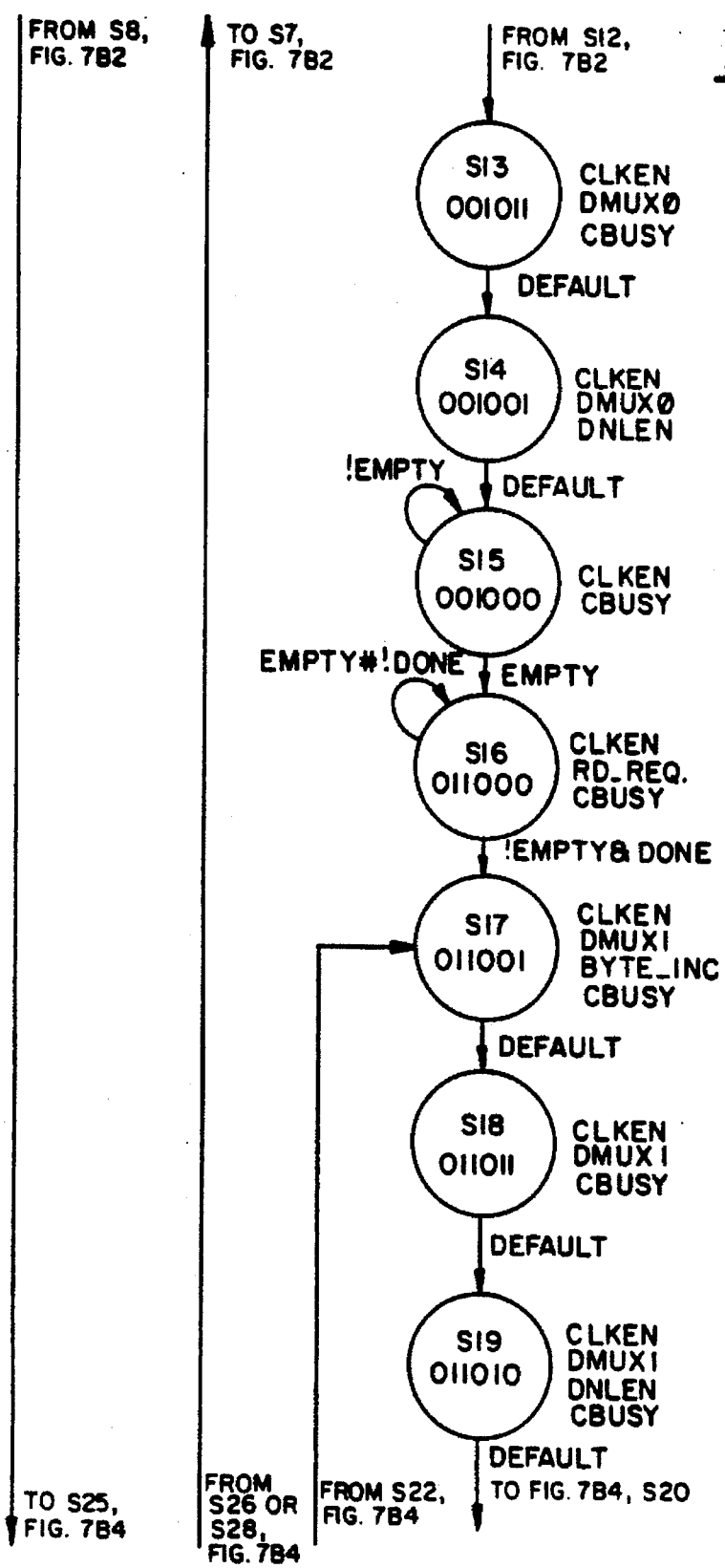
FIG. 7B3

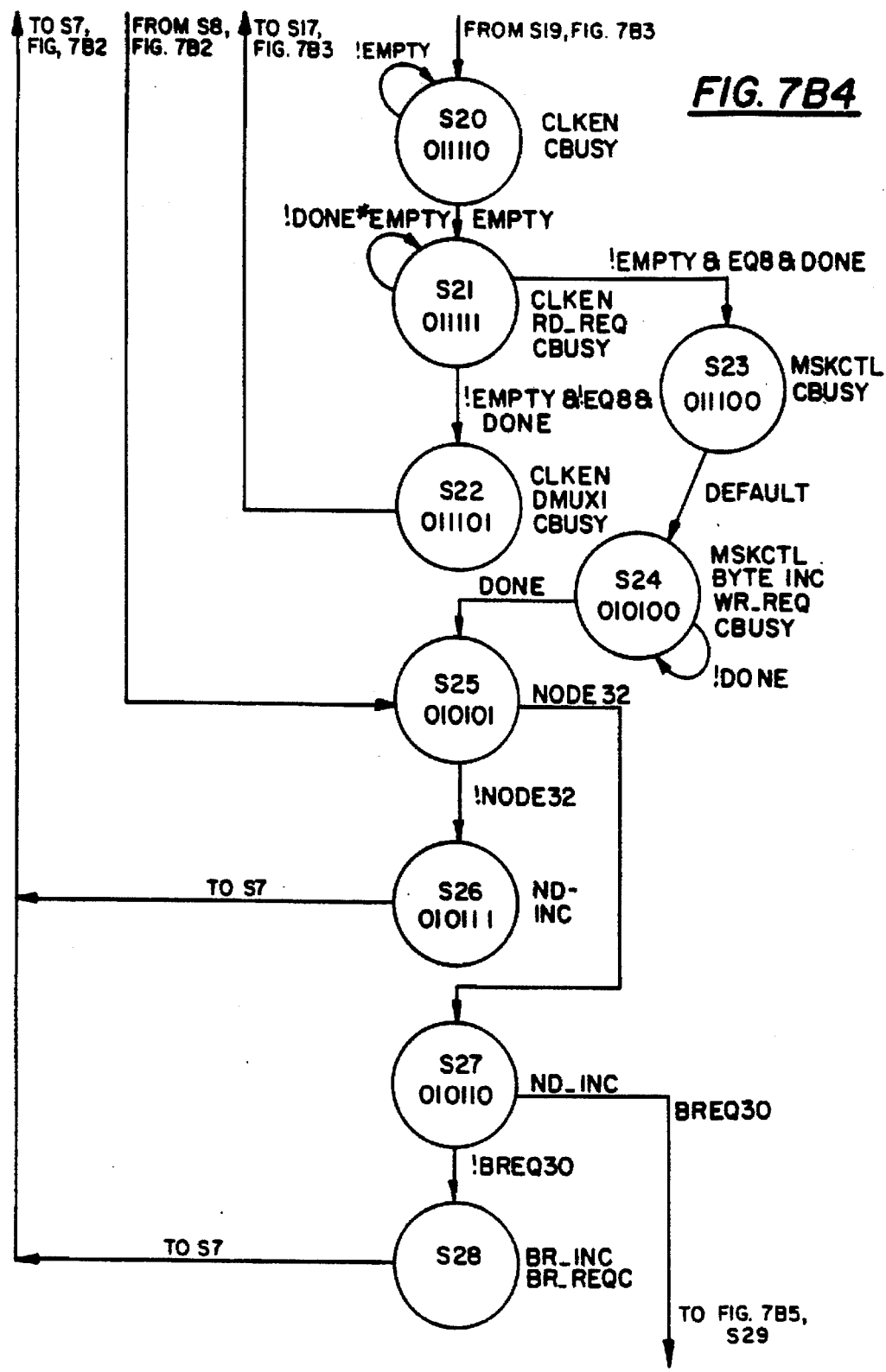

FIG. 7B5
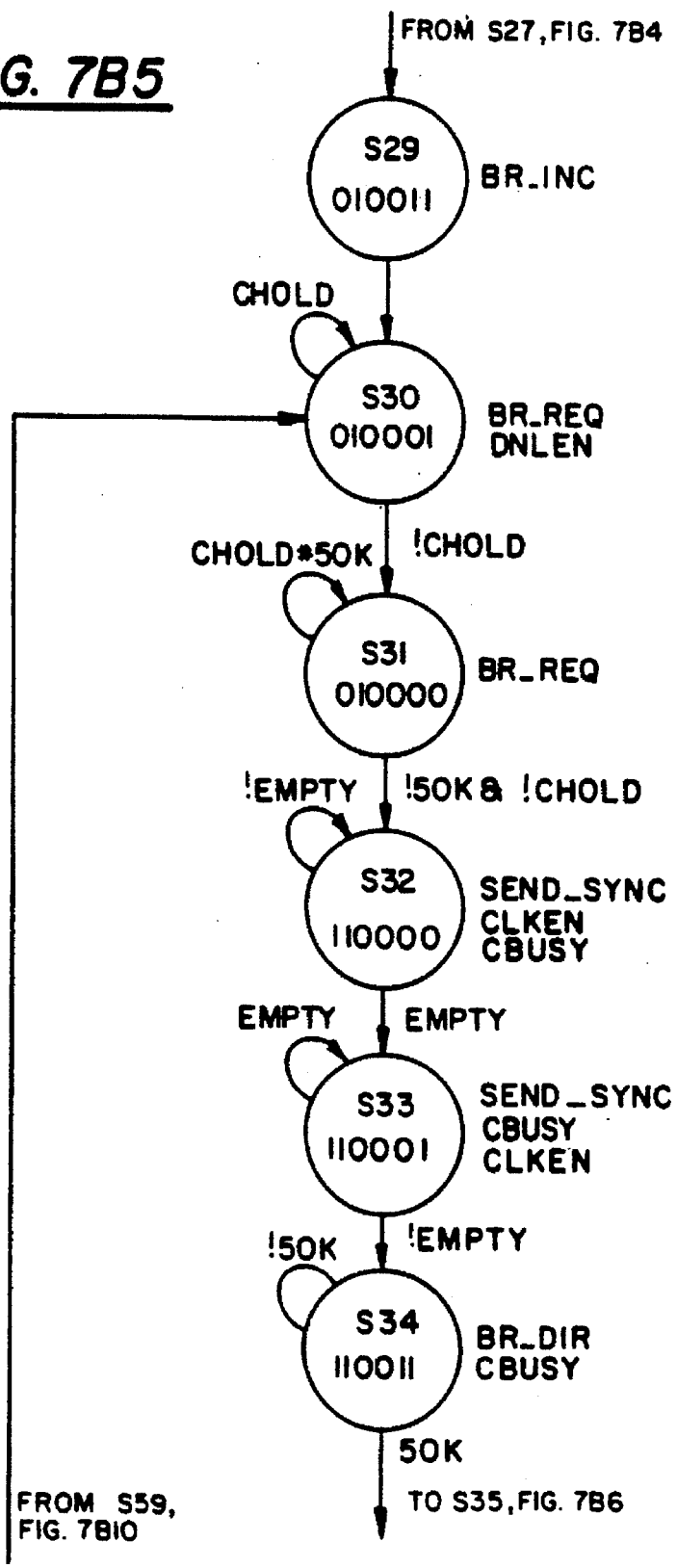

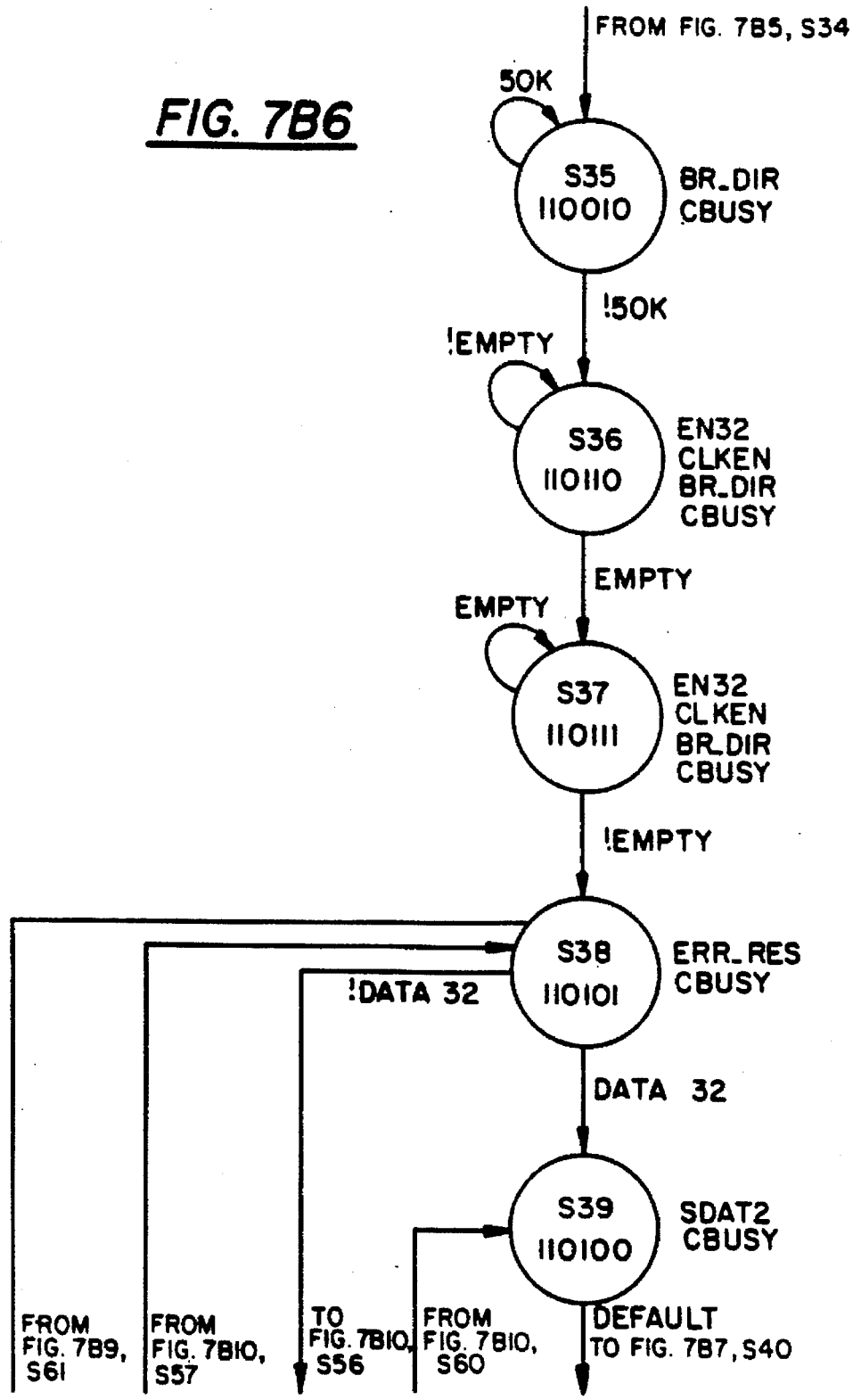
FIG. 7B6

FIG. 7B7
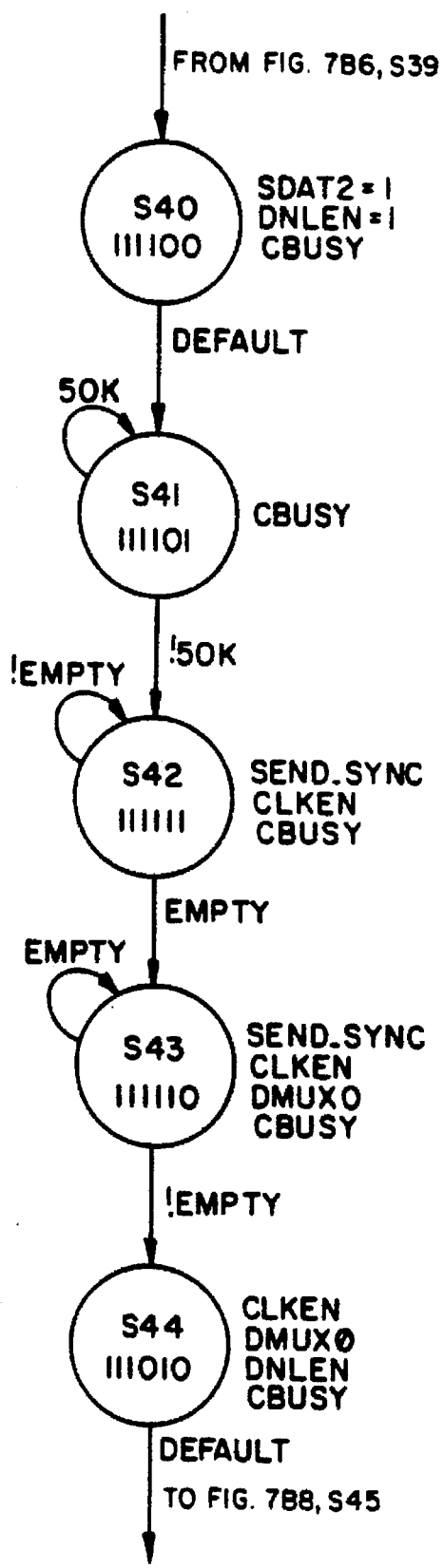

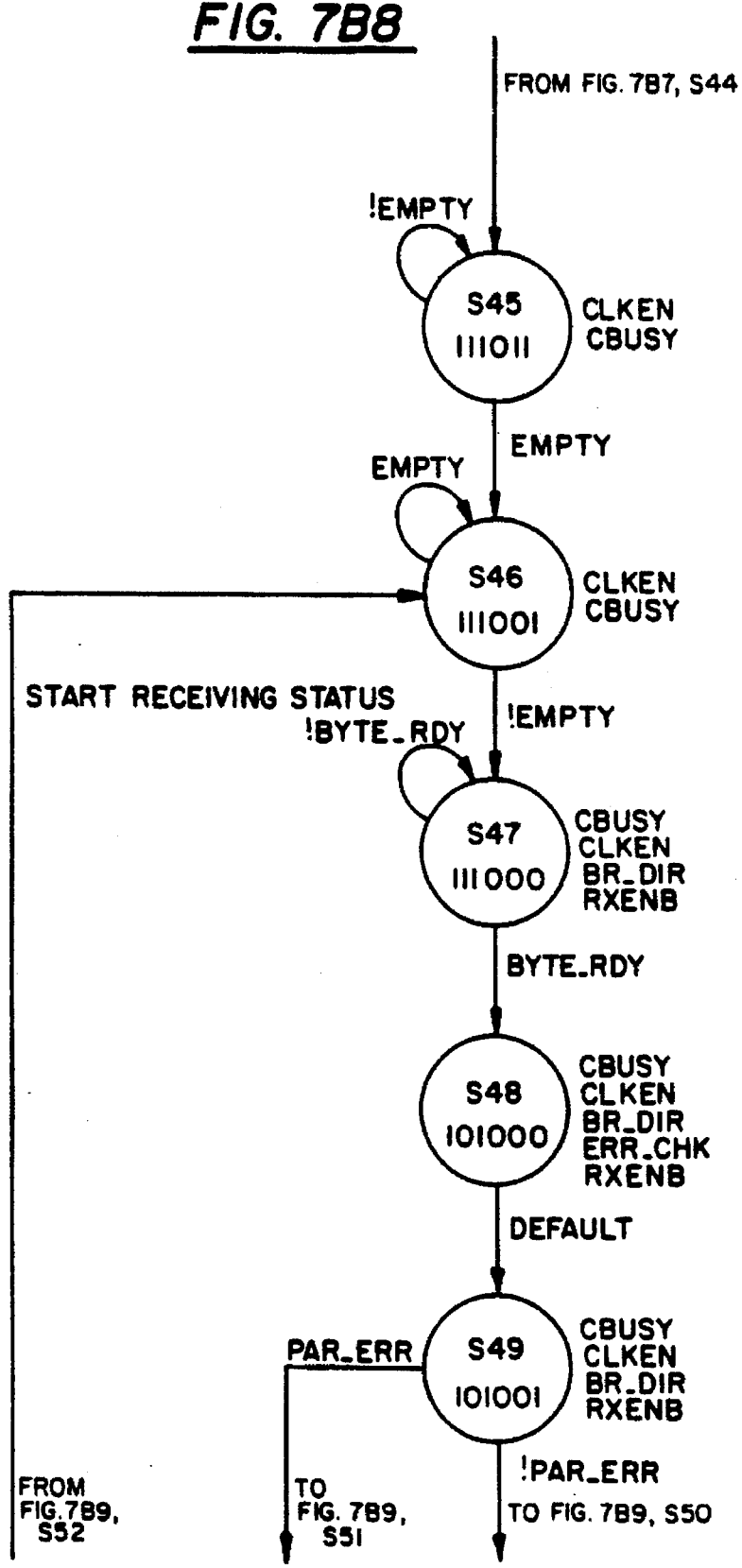
FIG. 7B8

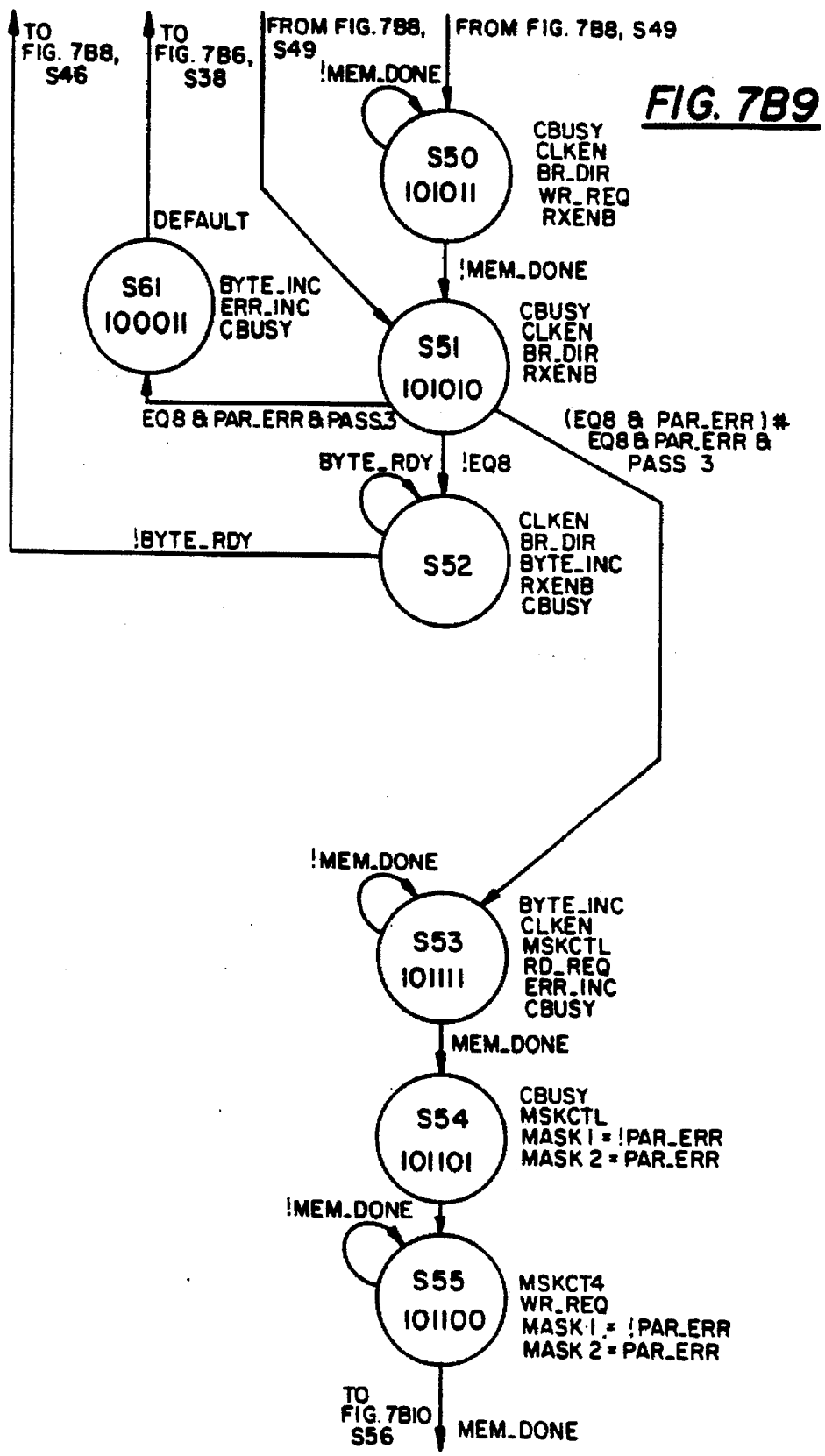
FIG. 7B9

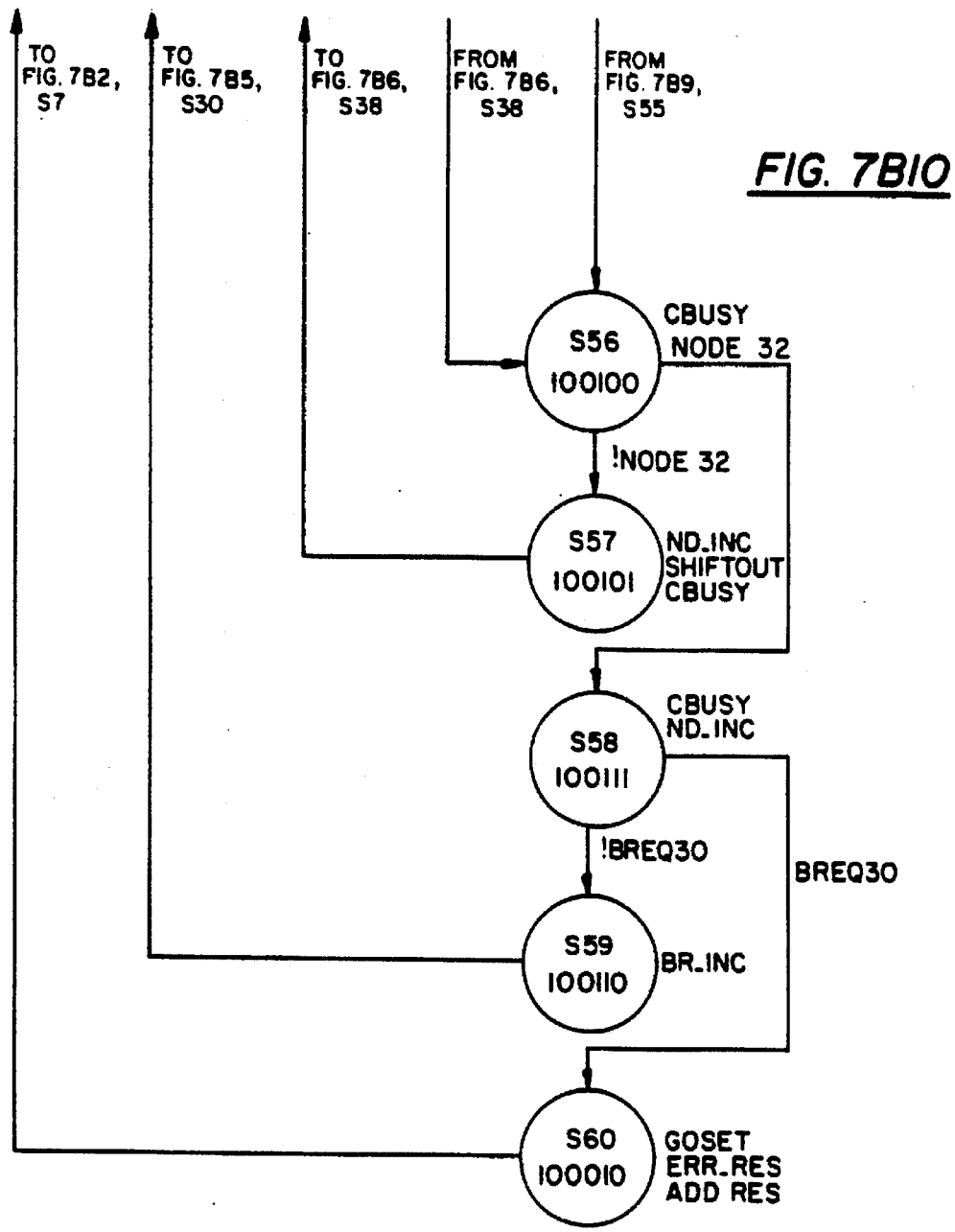

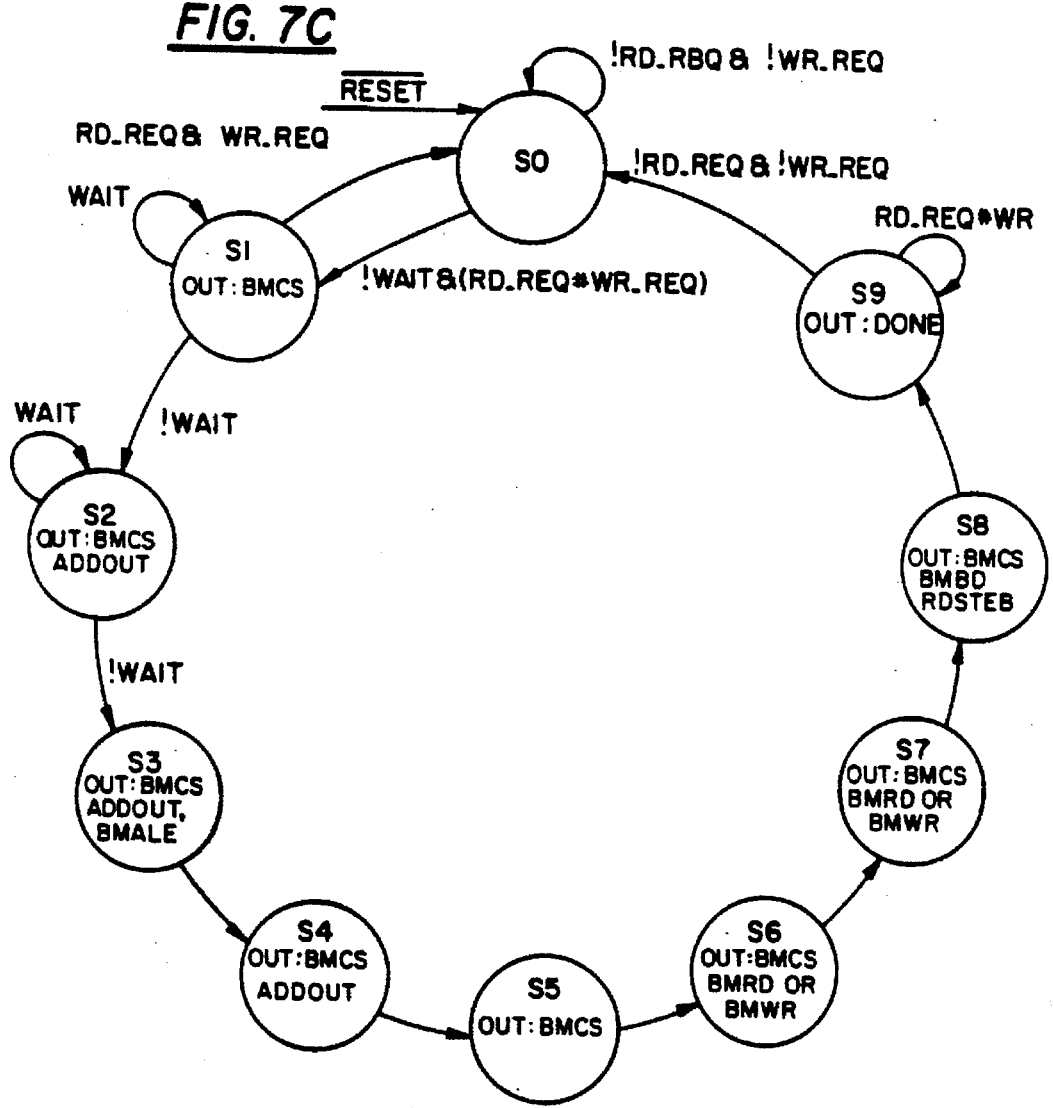

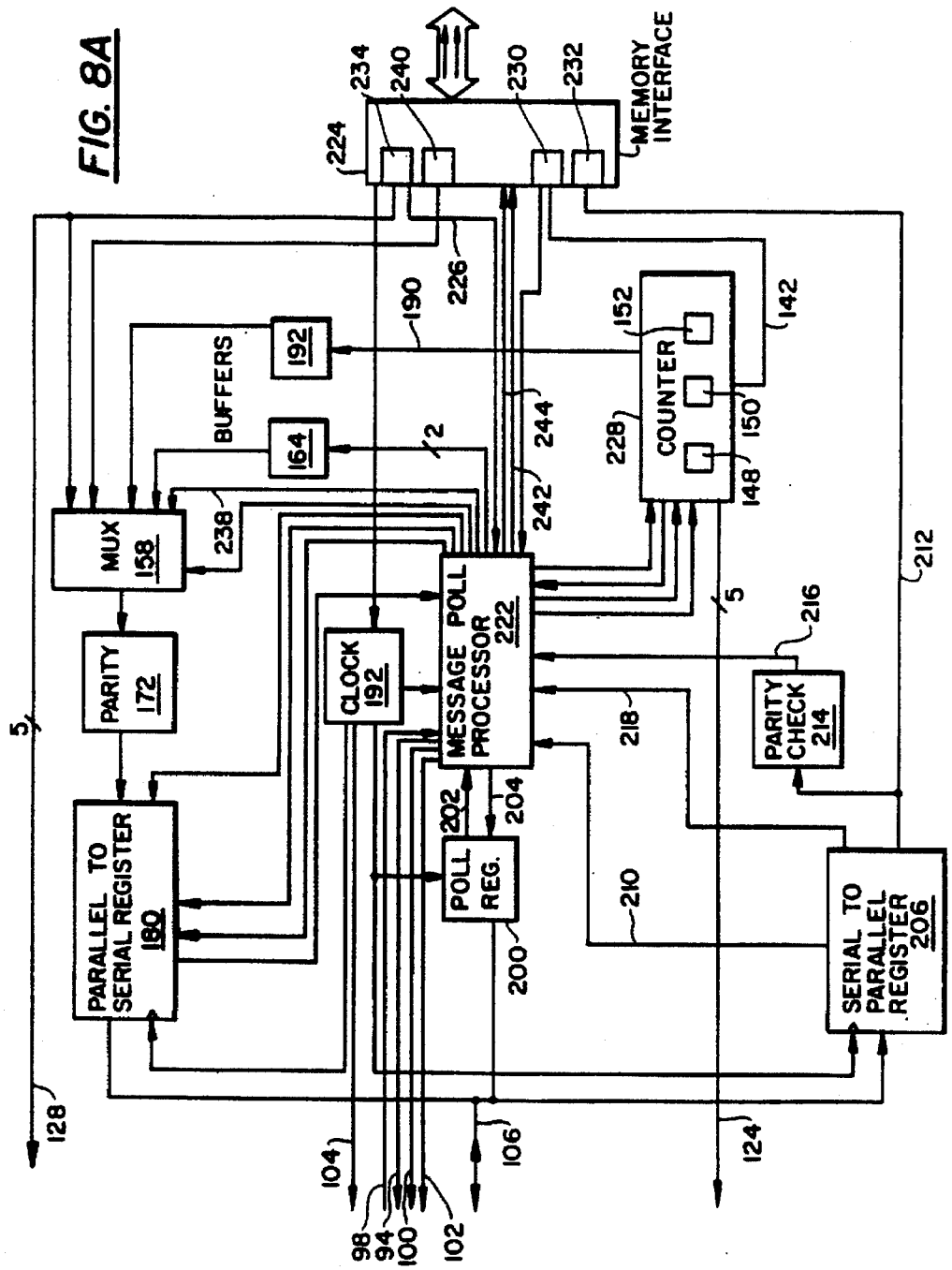

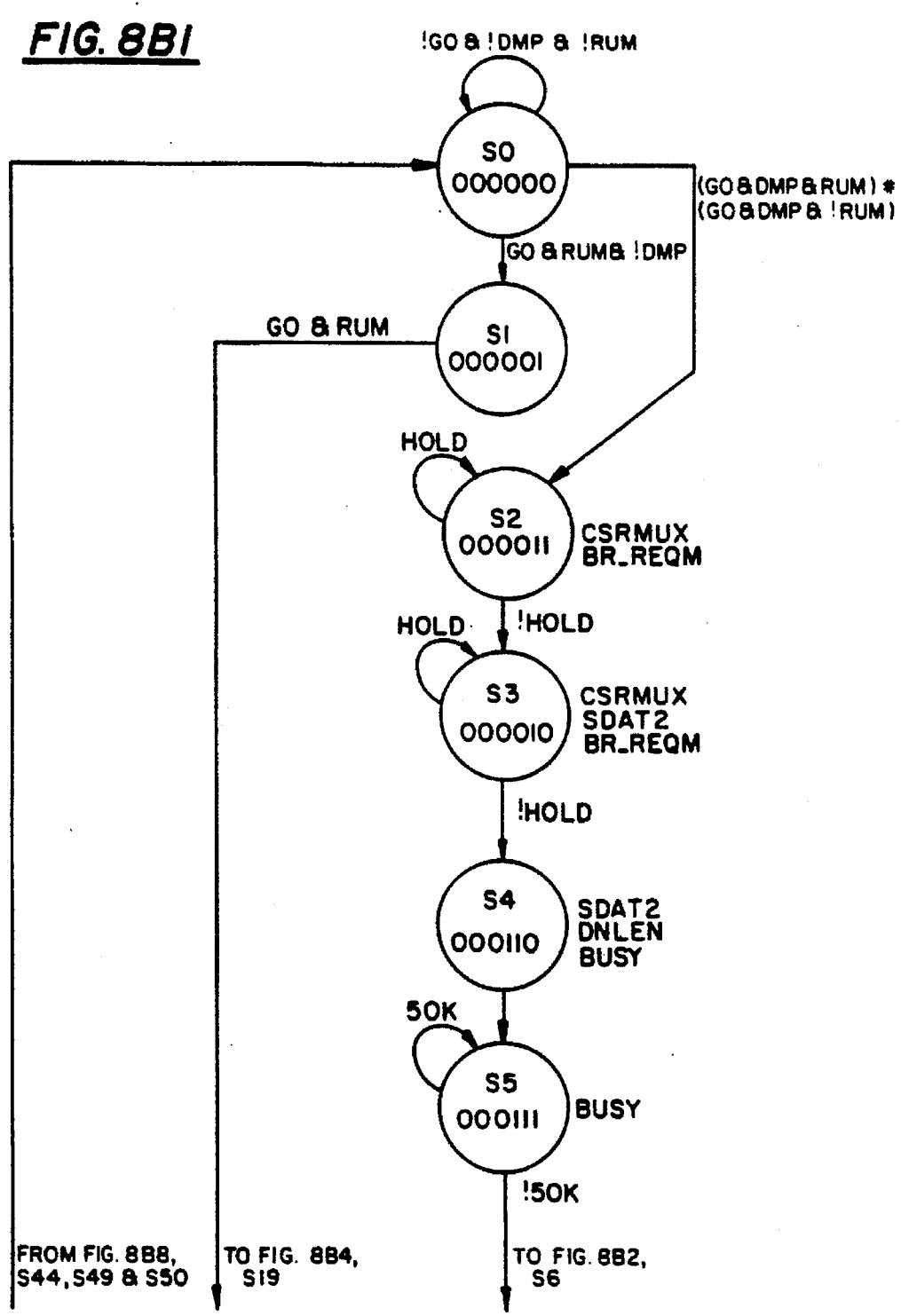

FIG. 8B2
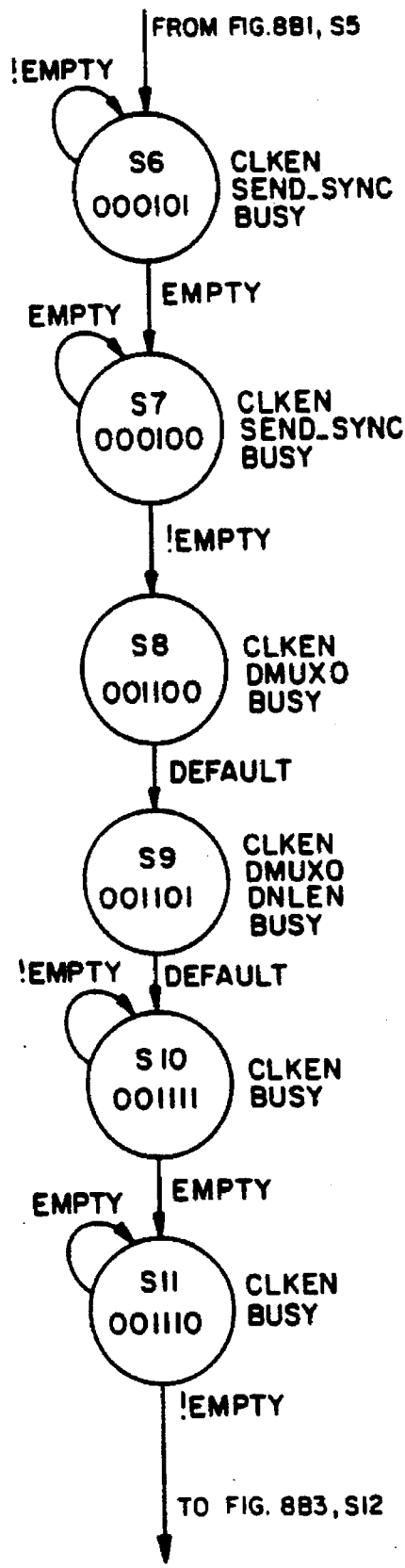

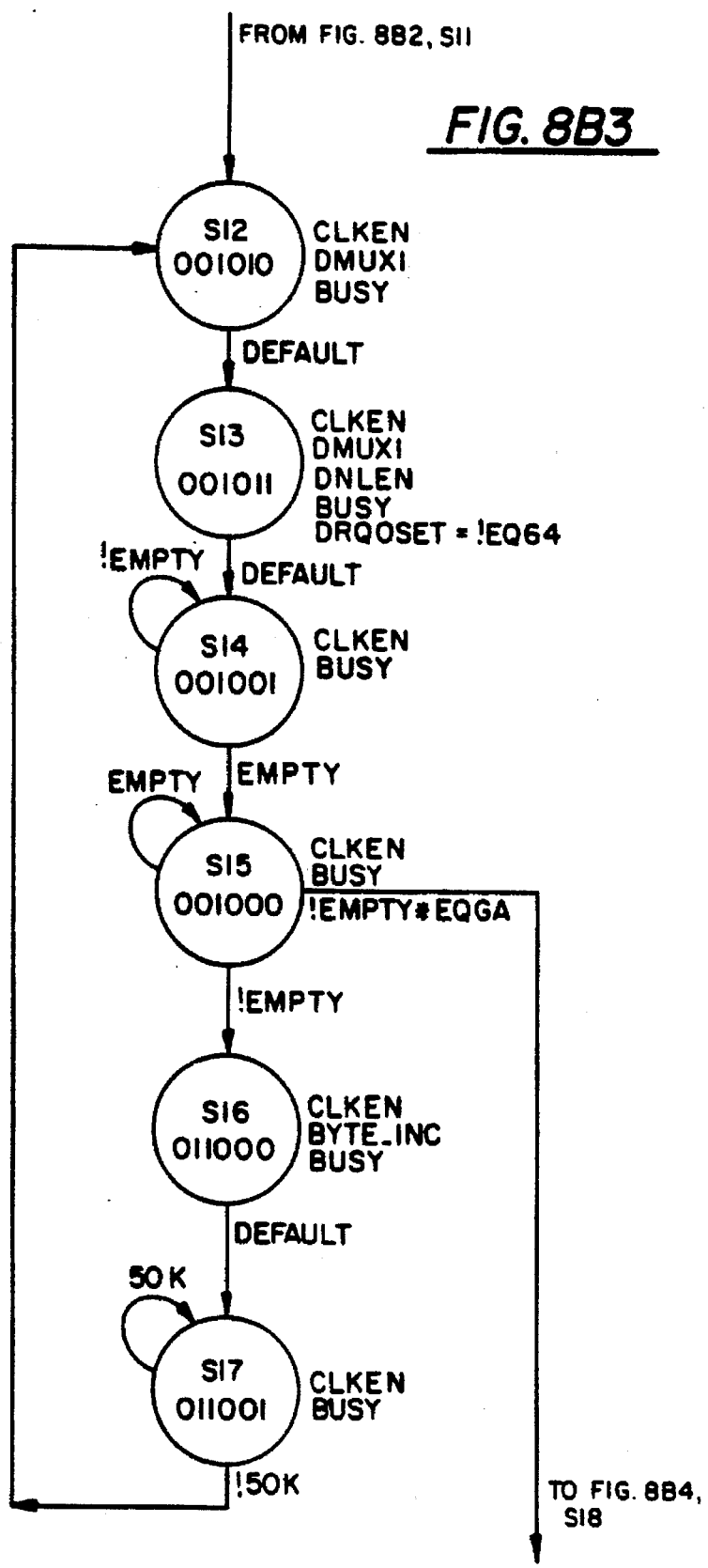
FIG. 8B3

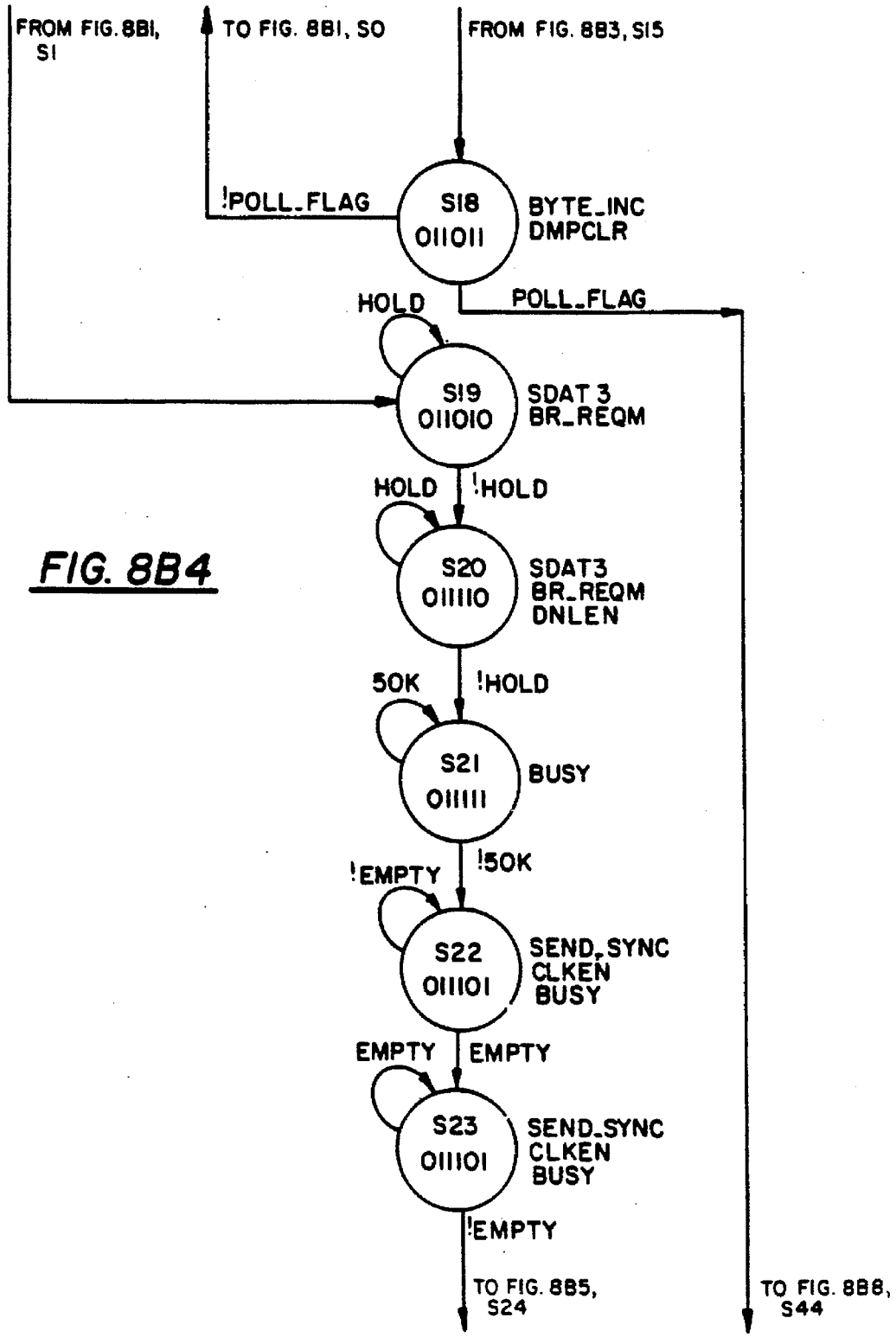
FIG. 8B4

FIG. 8B5
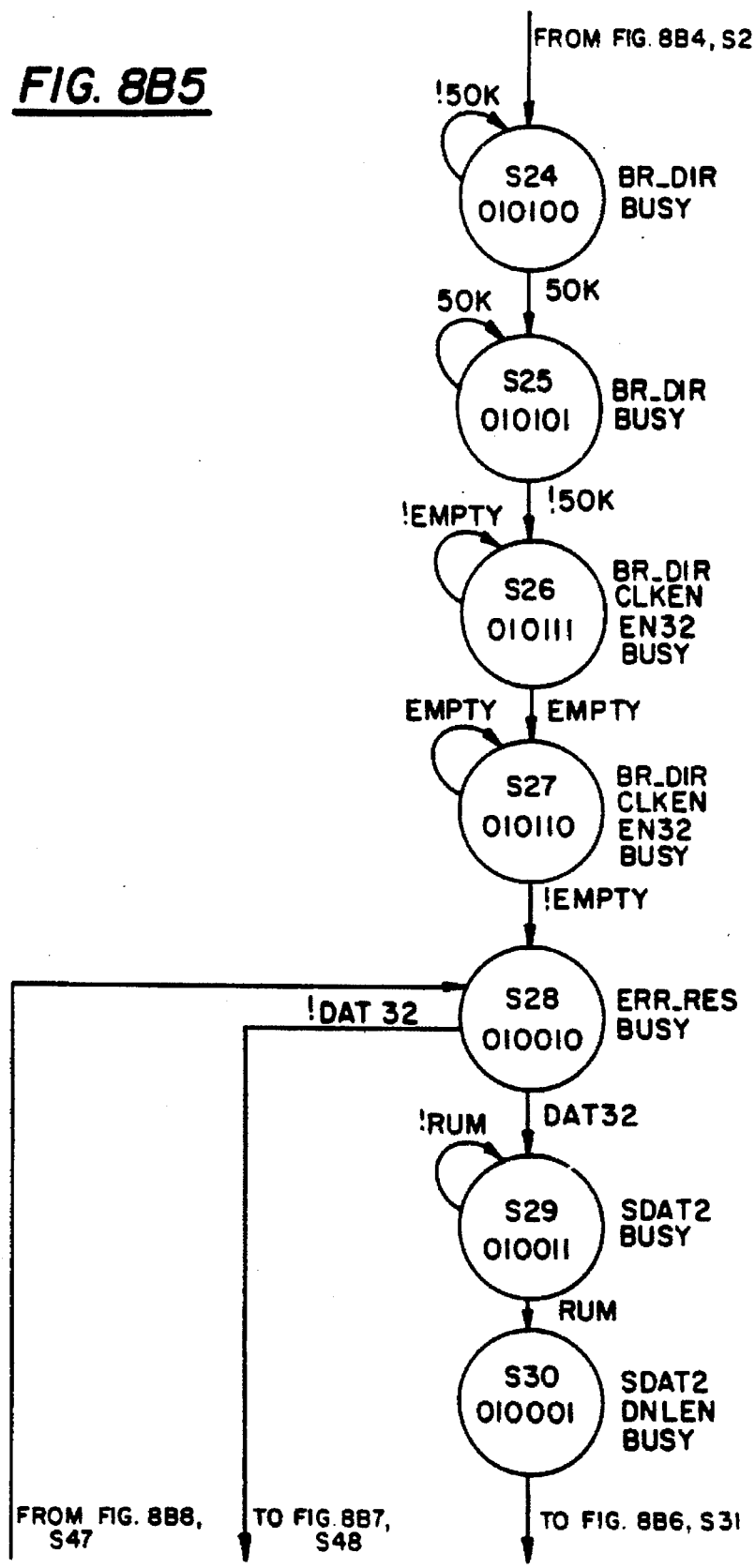

FIG. 8B6
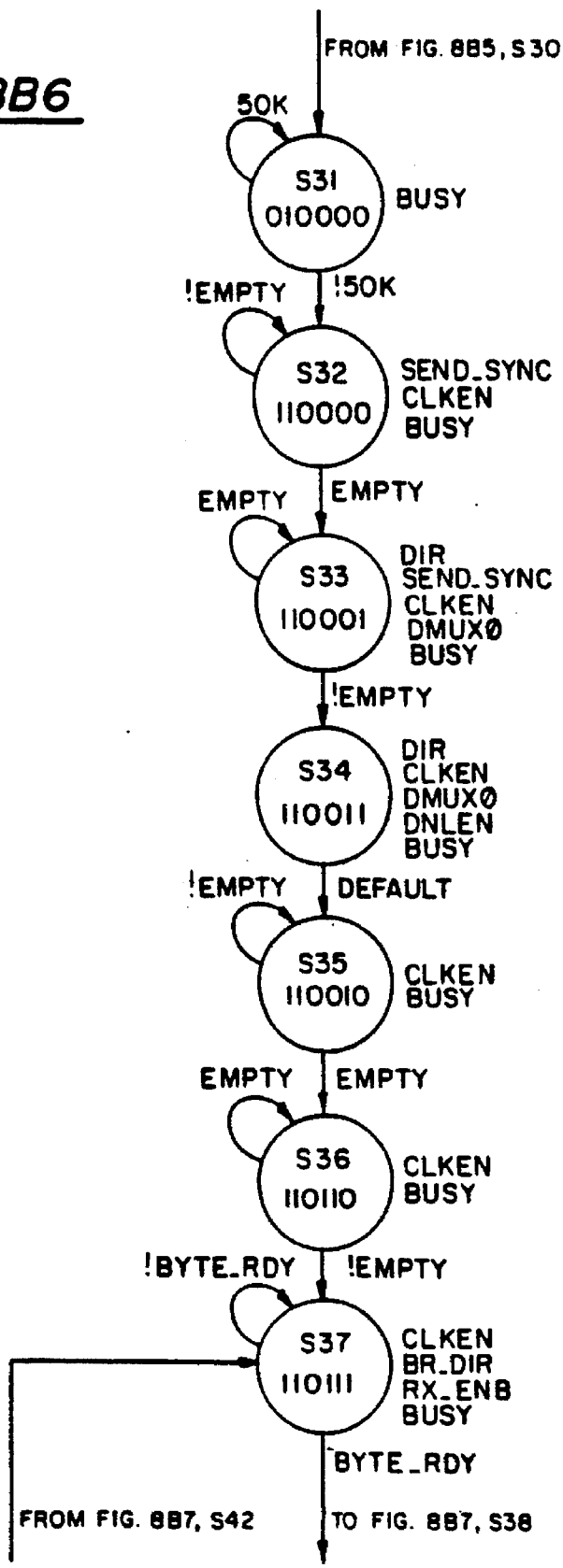

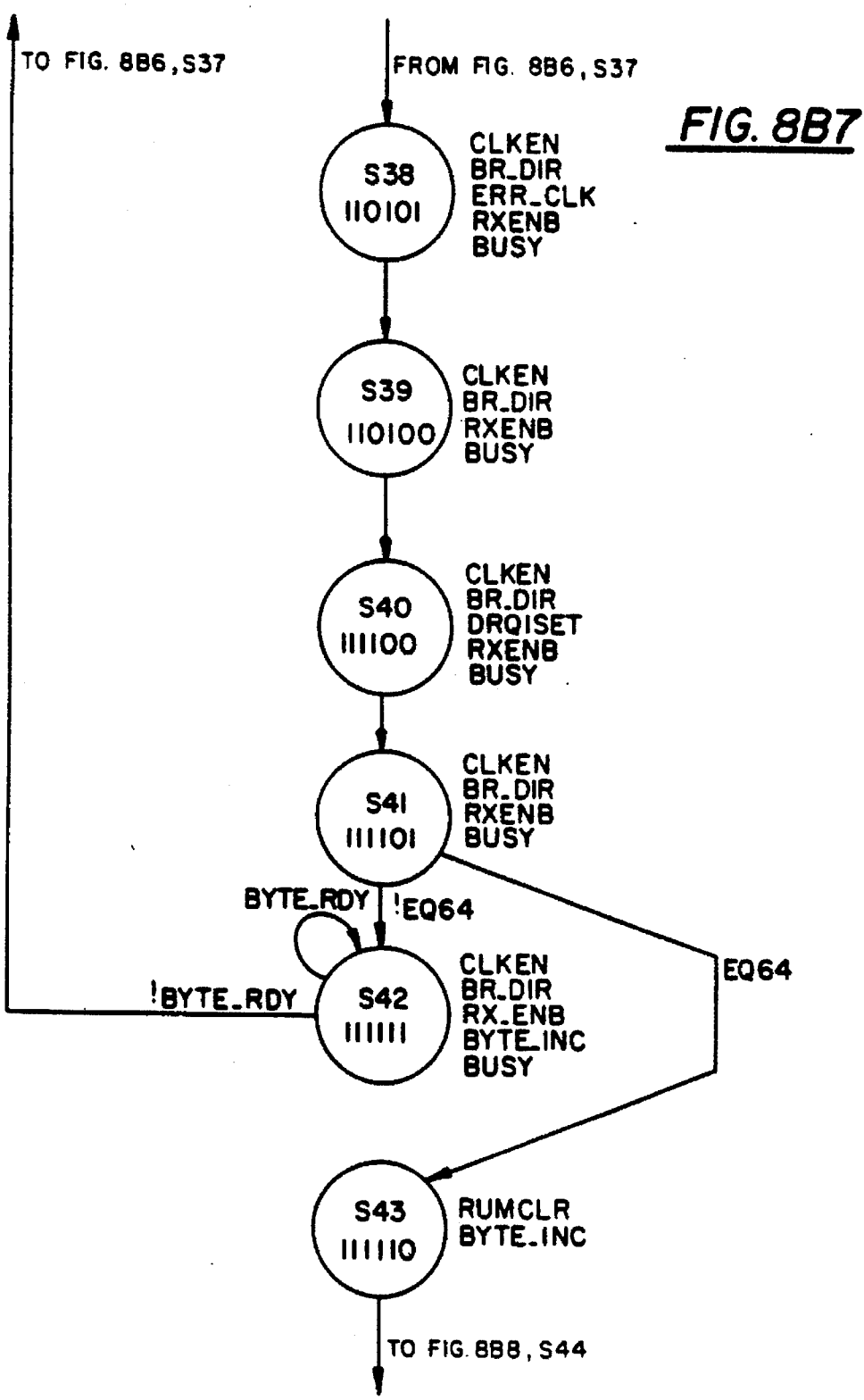
FIG. 8B7

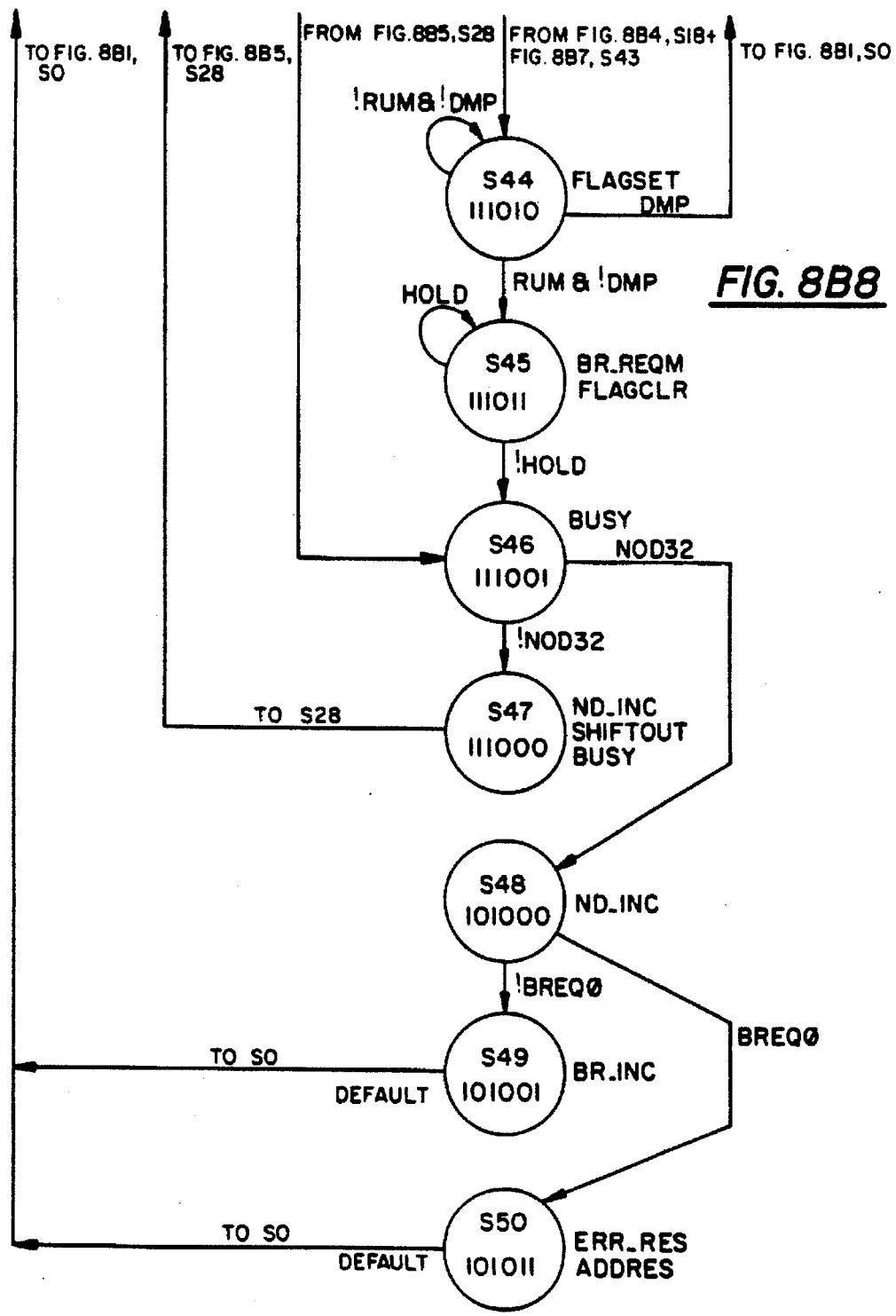
FIG. 8B8

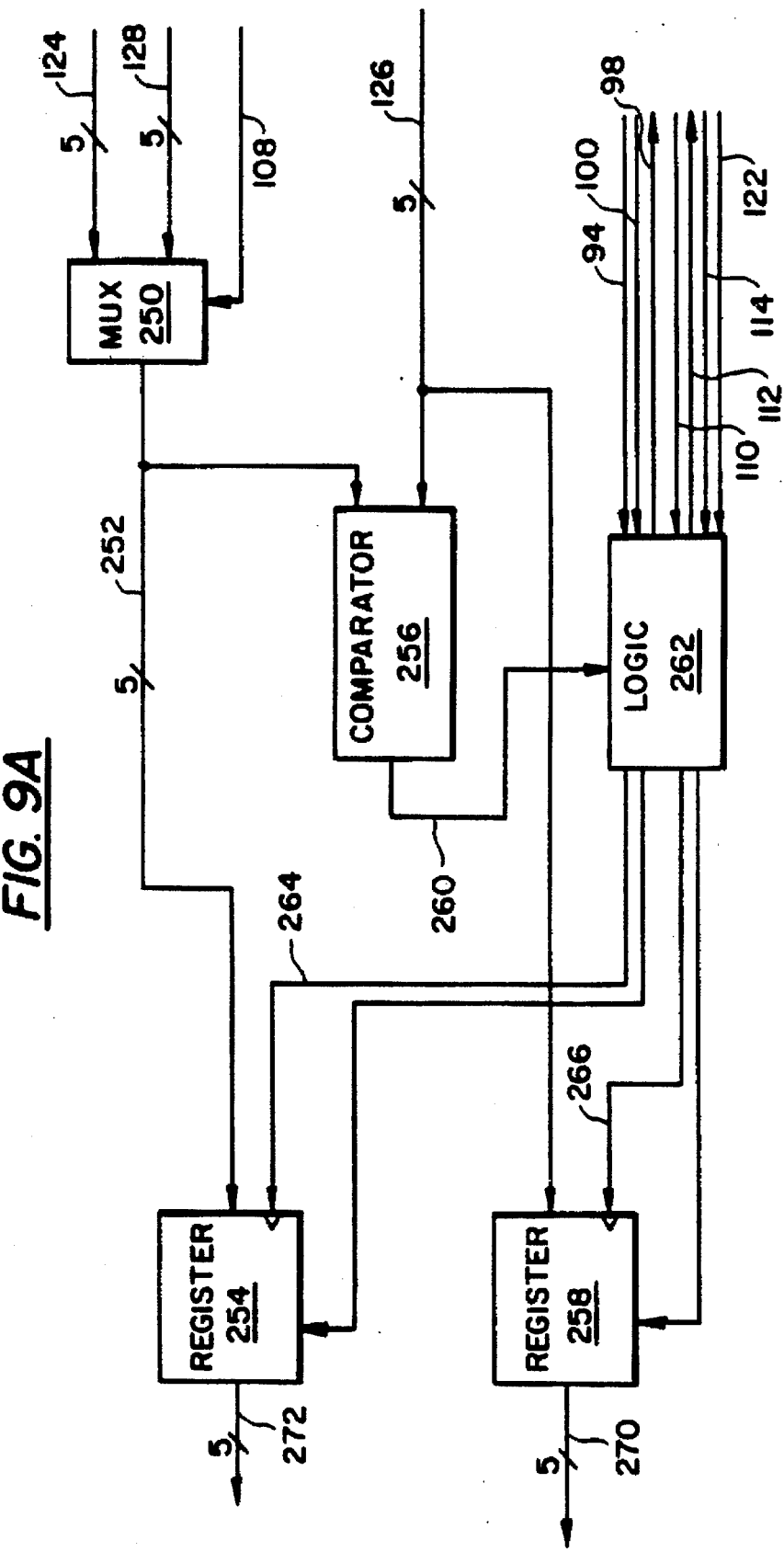

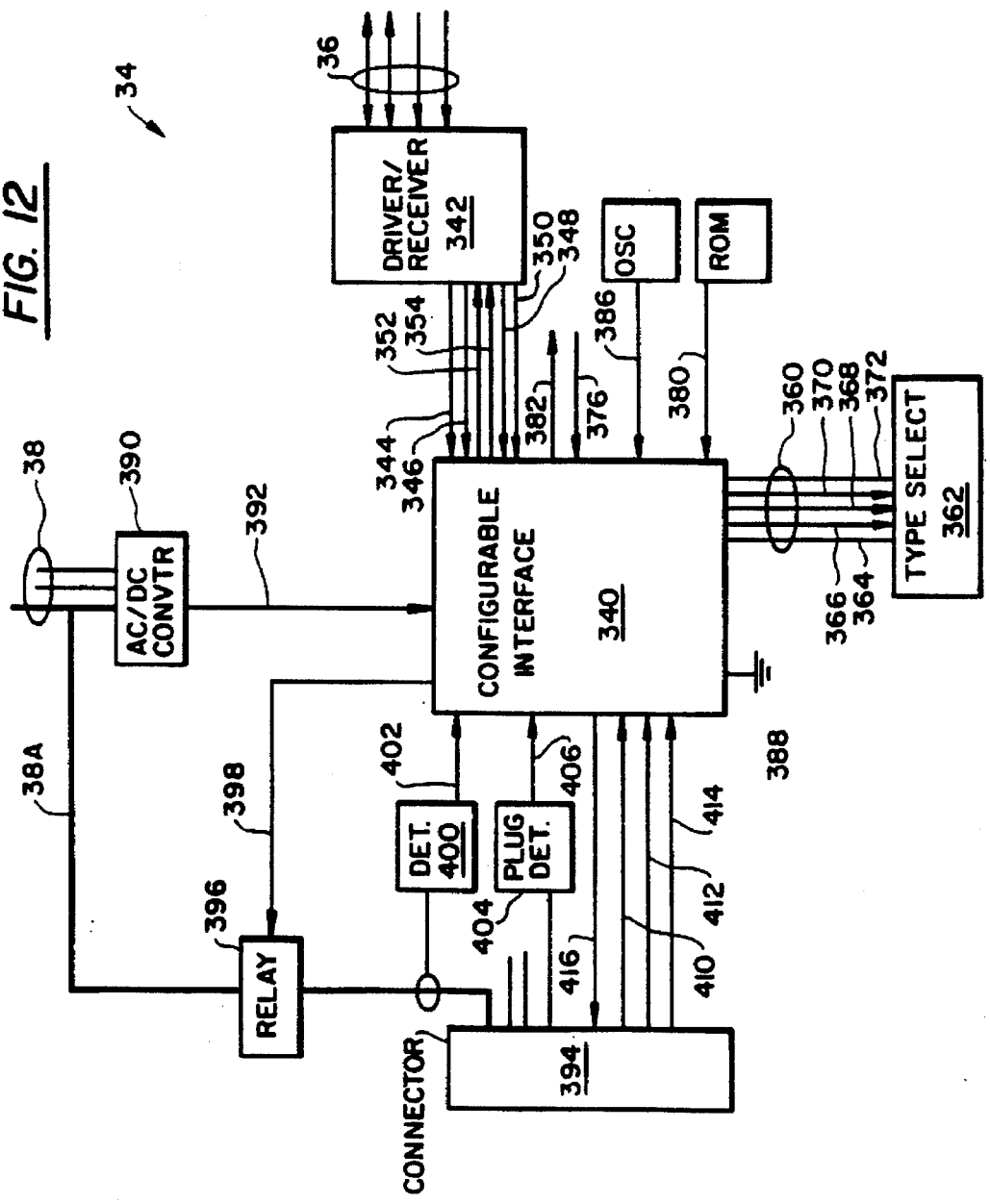

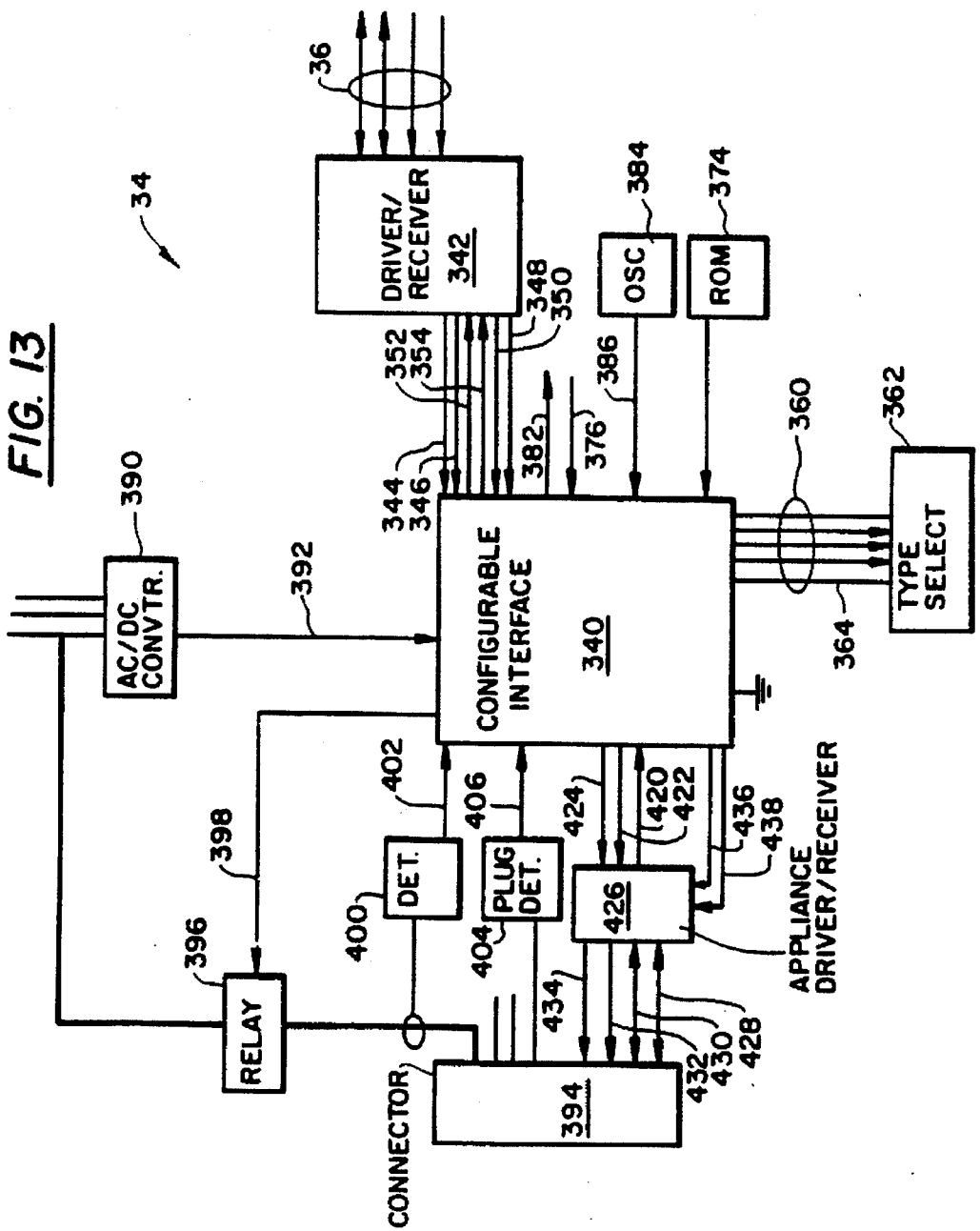

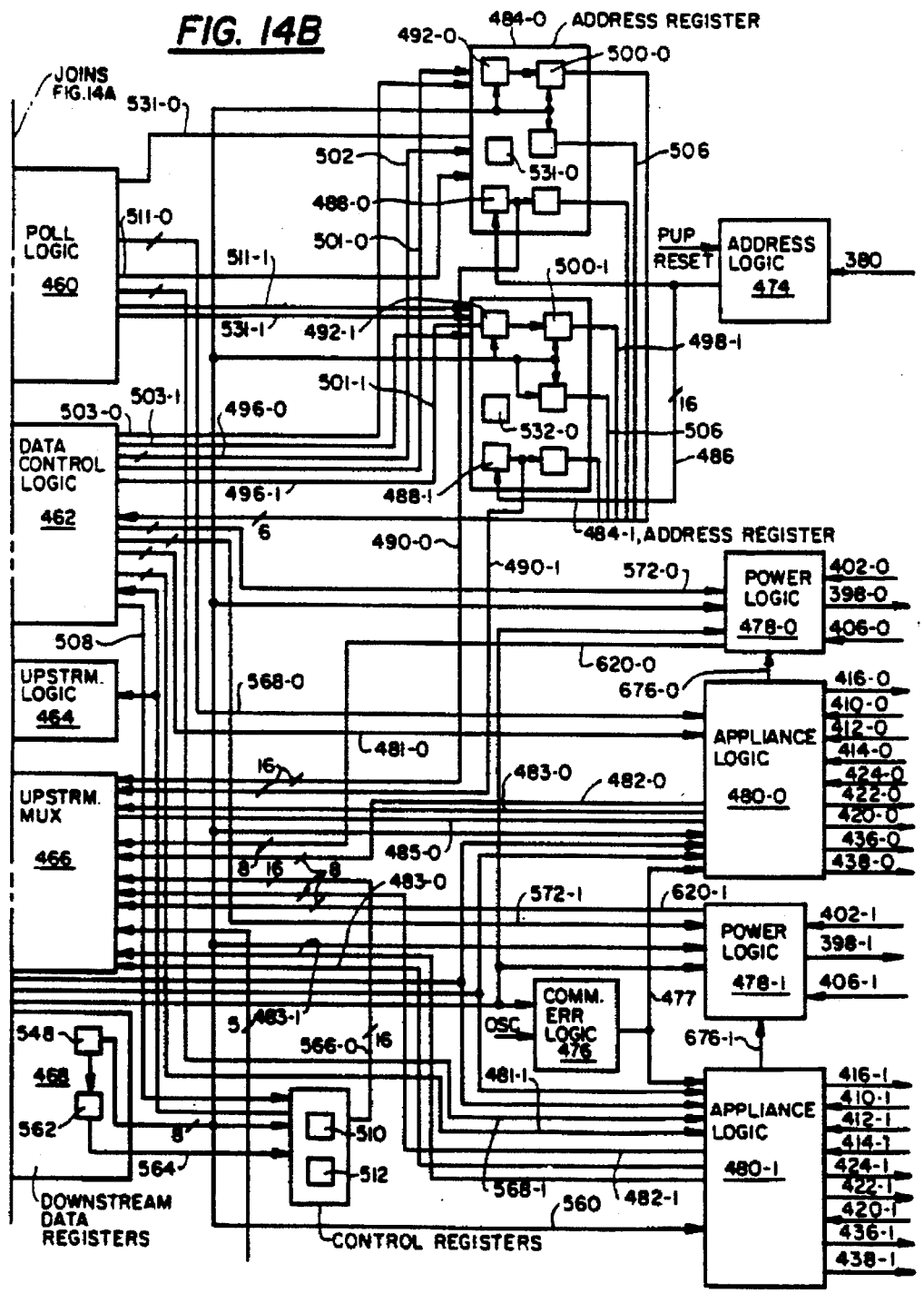

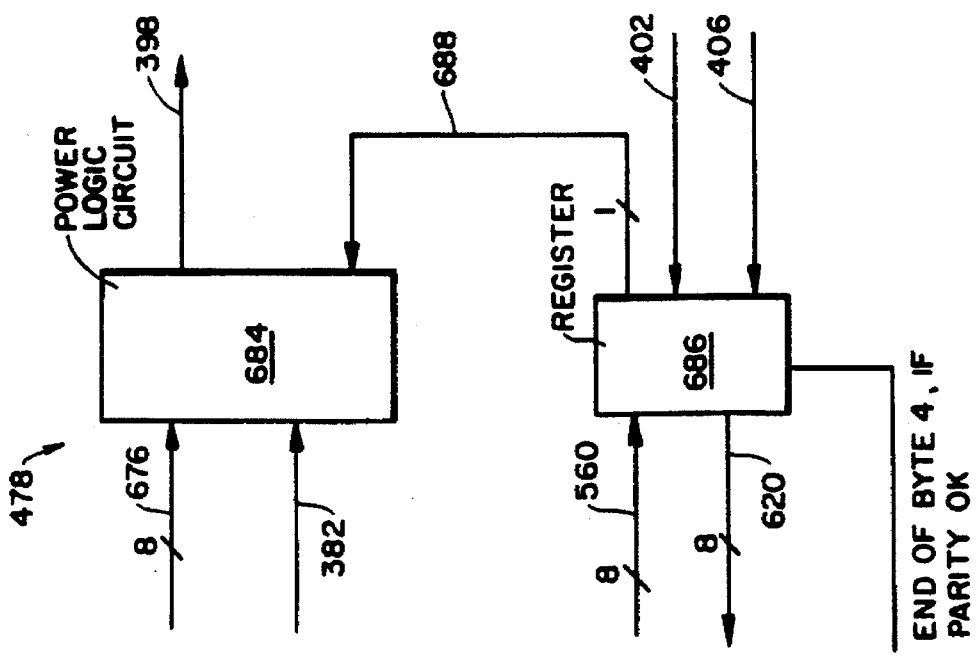
*FIG. 16D2*
NewState: = ((Not CommFail AND SC) OR
(CommFail AND
(NOT(Off OR(Oldstate AND Toggle)))
AND ((Oldstate XOR Toggle) OR
On OR ForceOn OR
(NoSmartAppliance AND NOT Convapp)
)
))
SwithCon: = ((ForceON OR
(PowerAllowed AND NewState) OR
(ConvApp AND NewState)
) AND
NOT SelfTestFailure)
*FIG. 16D1*

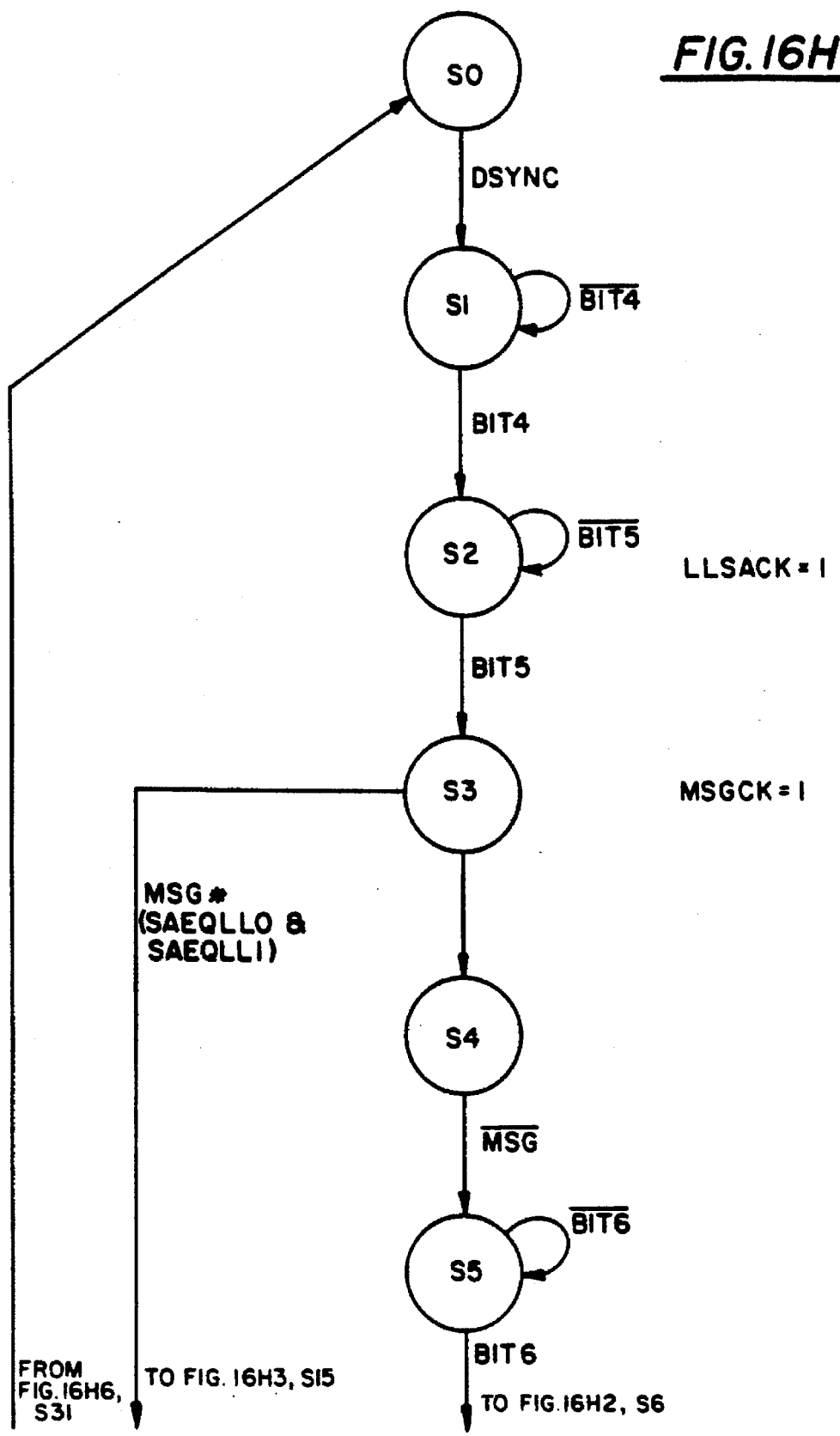
FIG.16H1

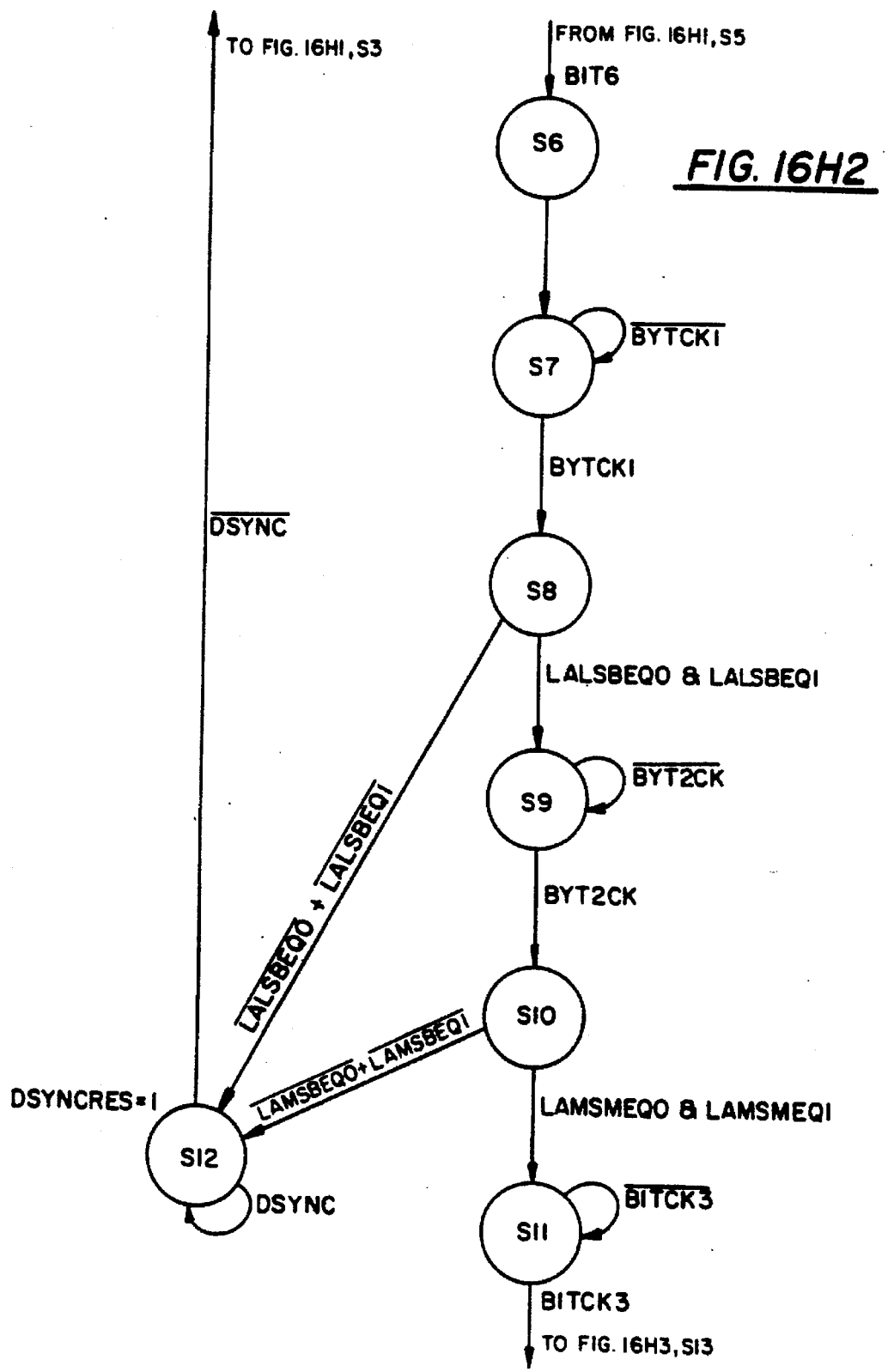
FIG. 16H2

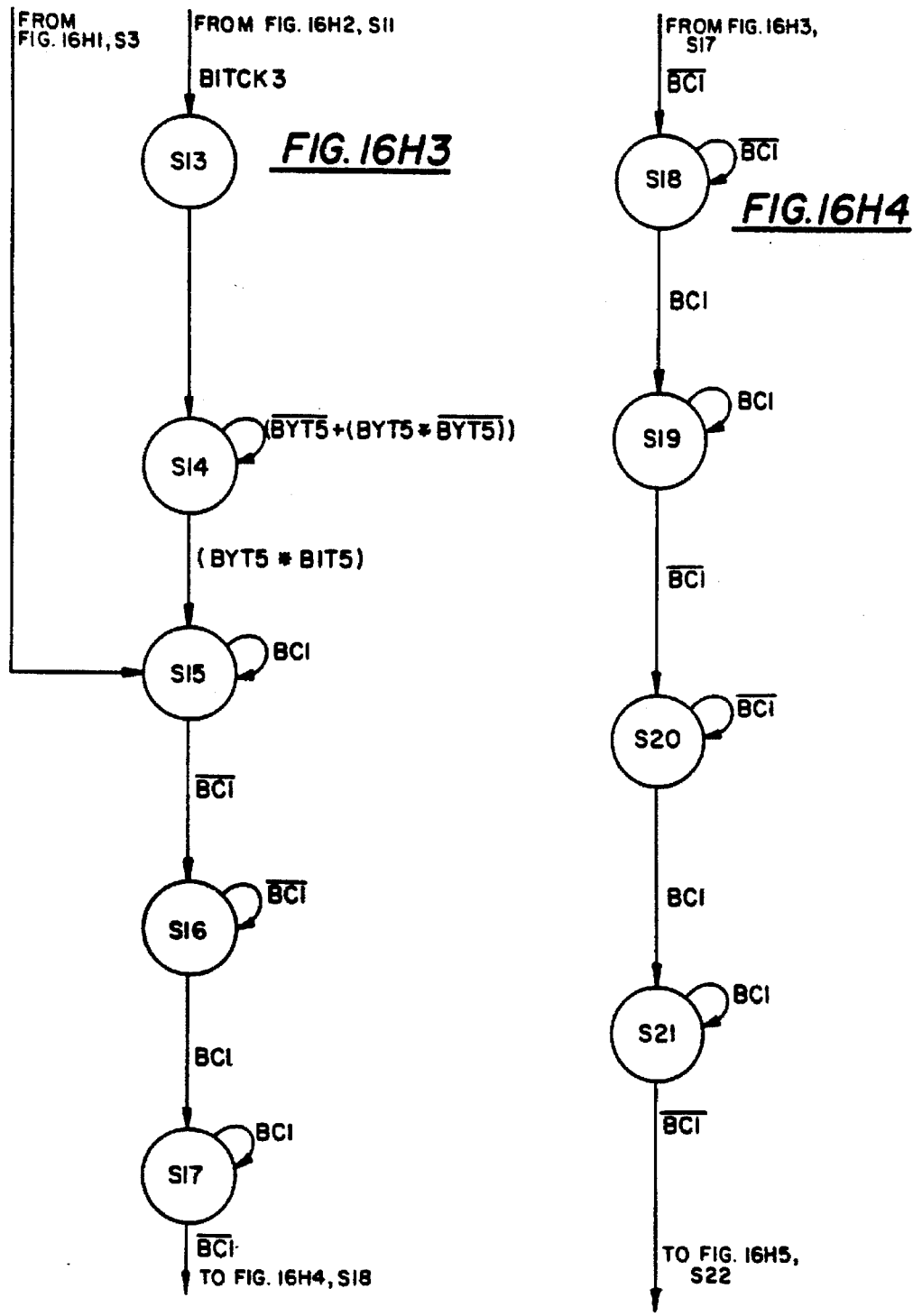

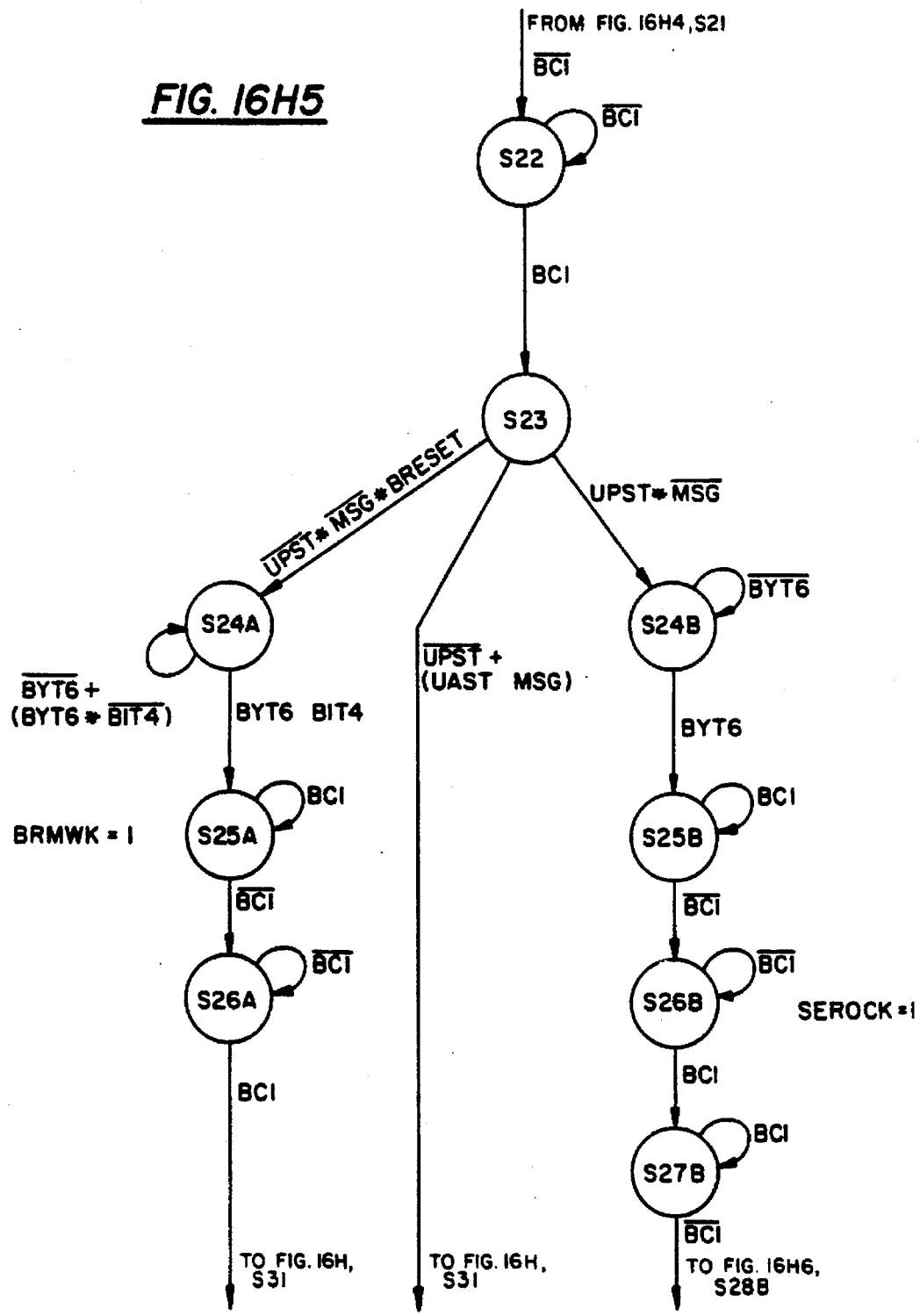
FIG. 16H5

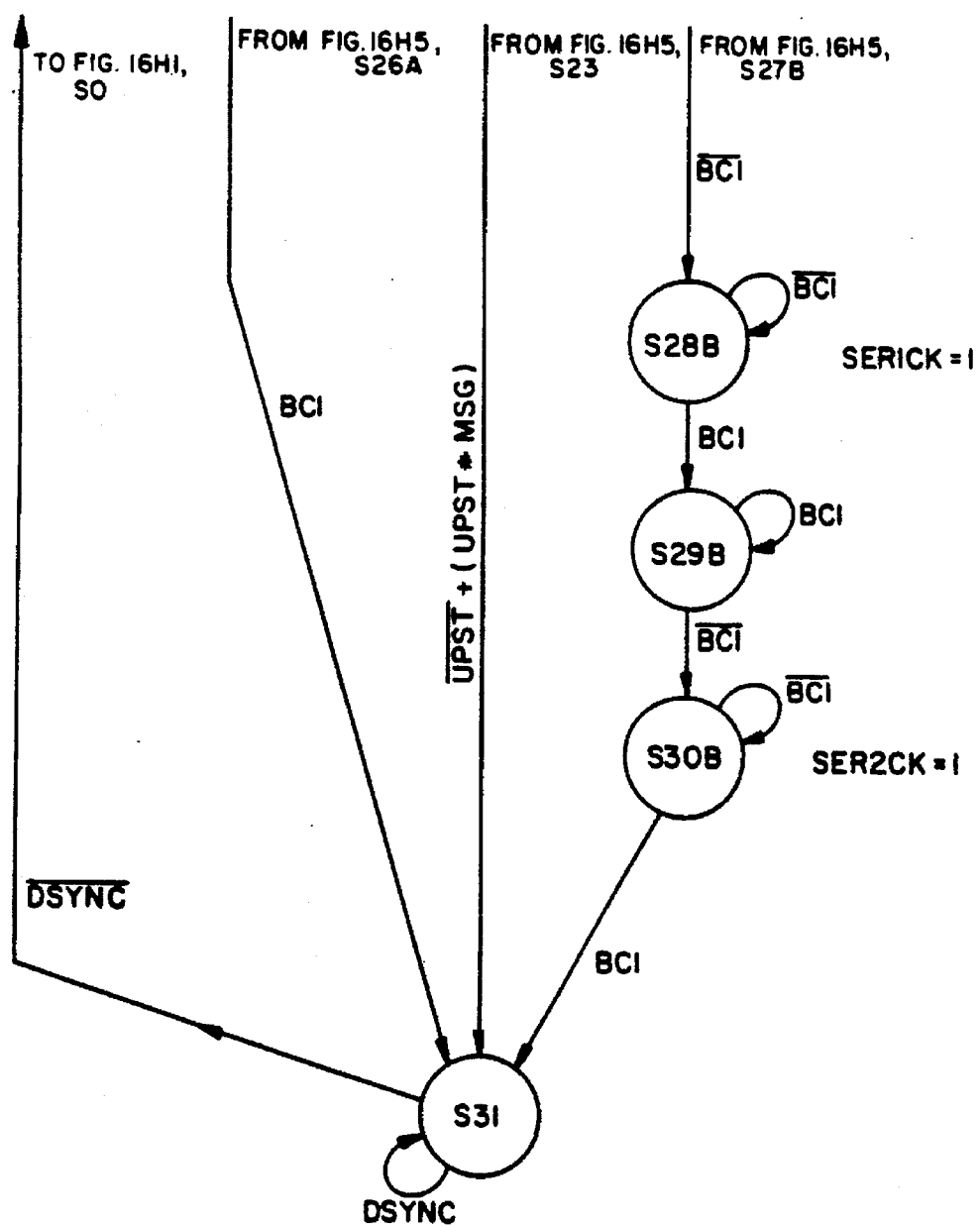
FIG. 16H6

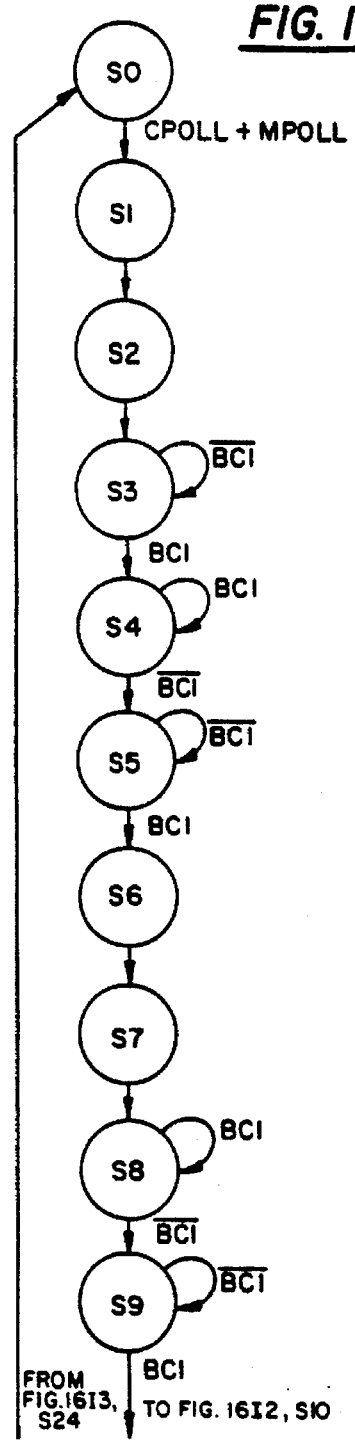
FIG. 16I1
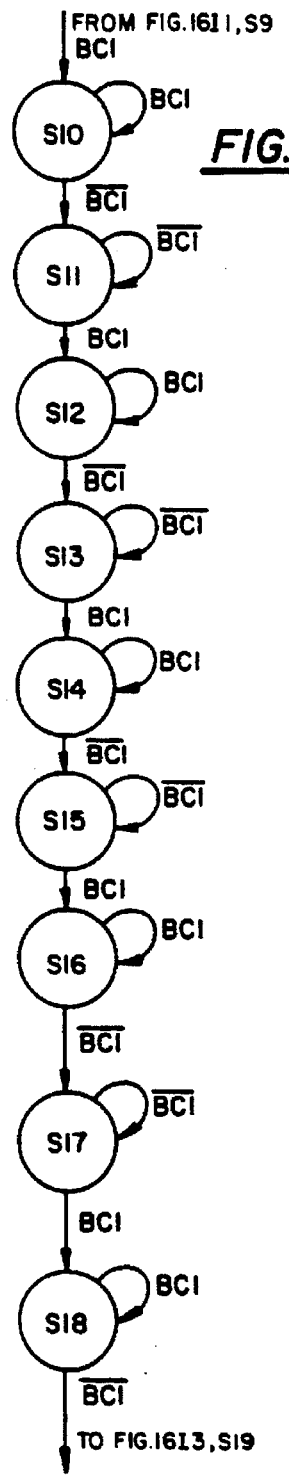
FIG. 16I2

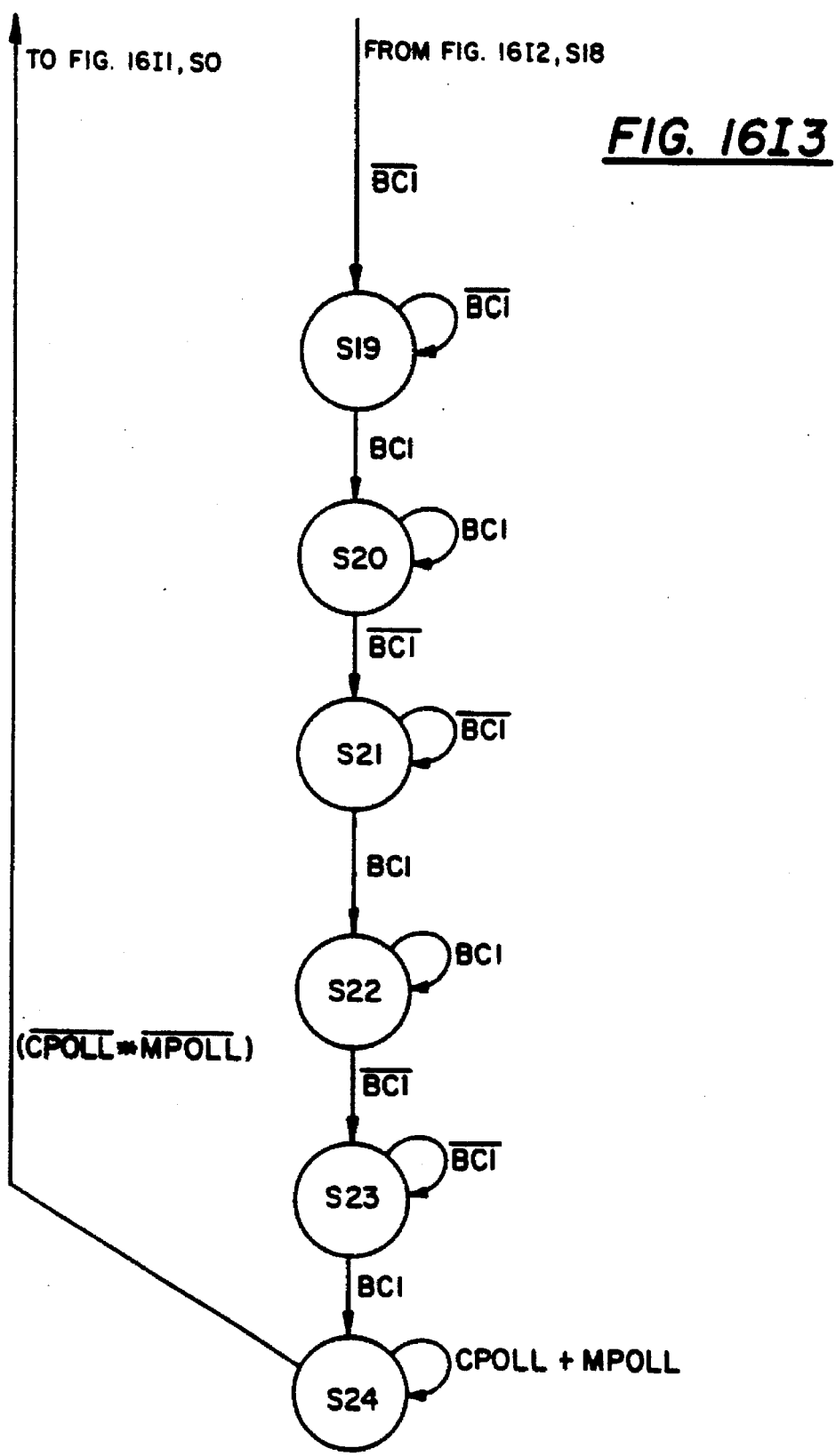
FIG. 1613

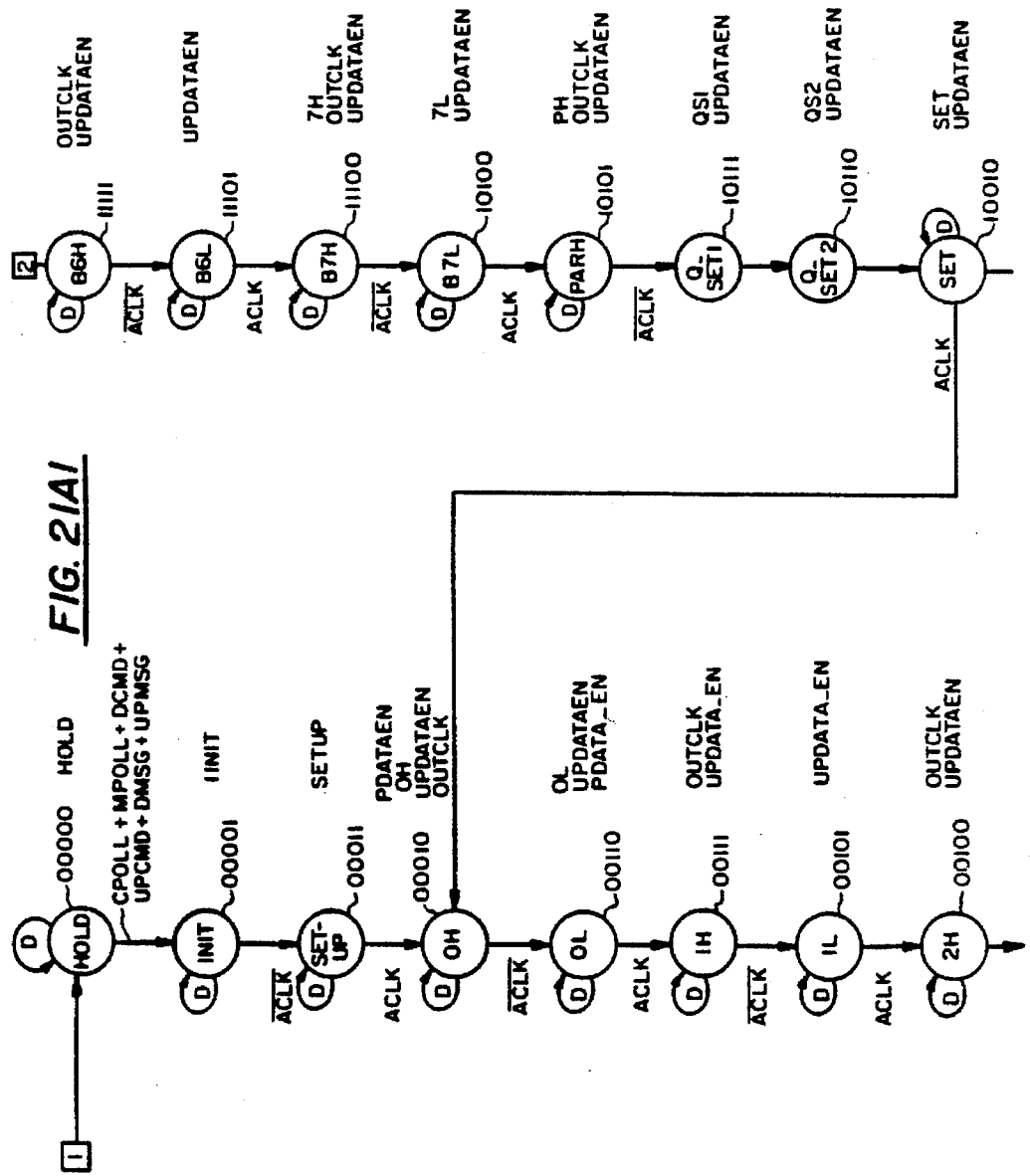

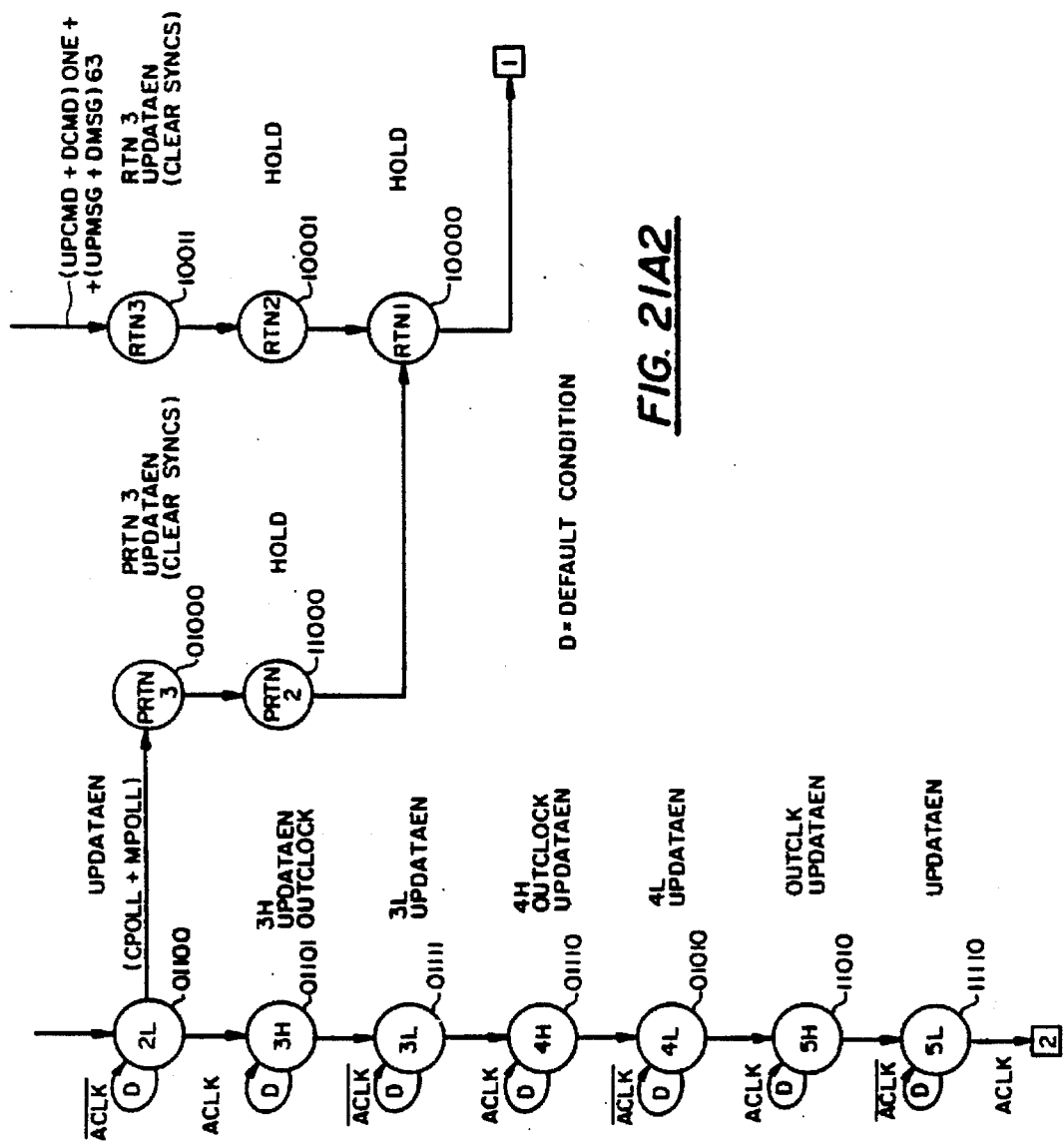
FIG. 21A2

FIG. 21B

| OUTPUT LINE | LOGIC |
|---|---|
| OUT EN | $\overline{\text{NOLD}} \cdot \text{DMSG}$ |
| DMSG CLK | $[7L + (3L \cdot 8\_4)] \cdot \text{DMSG}$ |
| DPAR_CLK | $\text{DMSG} \cdot \text{QS2}$ |
| CB_CLK | $\text{DCMD} \cdot \text{QS2} \cdot \overline{\text{TWO}}$ |
| AR_CLK | $\text{DCMD} \cdot \text{QS2} \cdot \text{TWO}$ |
| NPAR CLR | $\overline{\text{DCMD} \cdot \text{PRESET} \cdot \text{QSI}\_\overline{\text{TWO}}}$ |
| NB RESET | $\overline{\text{DCMD} \cdot \text{BRESET} \cdot \text{QSI} \cdot \text{TWO}}$ |

FIG. 21C

| OUTPUT | LOGIC |
|---|---|
| SELECT | UPMSG + (UPCMD · TWO) |
| NIN - CLK | UPCMD · SET · TWO |
| CLOCK | OUTCLOCK · (UPCMD + UPMSG) |
| SH NLD | [(SETUP + SET + 0H)(UPCMD+UPMSG) + (3L + 4H)(UPMSG)($\overline{8.4}$) ·] |
| PAR CLK 4 PARCLK | $\overline{SH\ NLD}$ · CLOCK |
| 4 PAR RSET | $\overline{HOLD + QSI}$ |

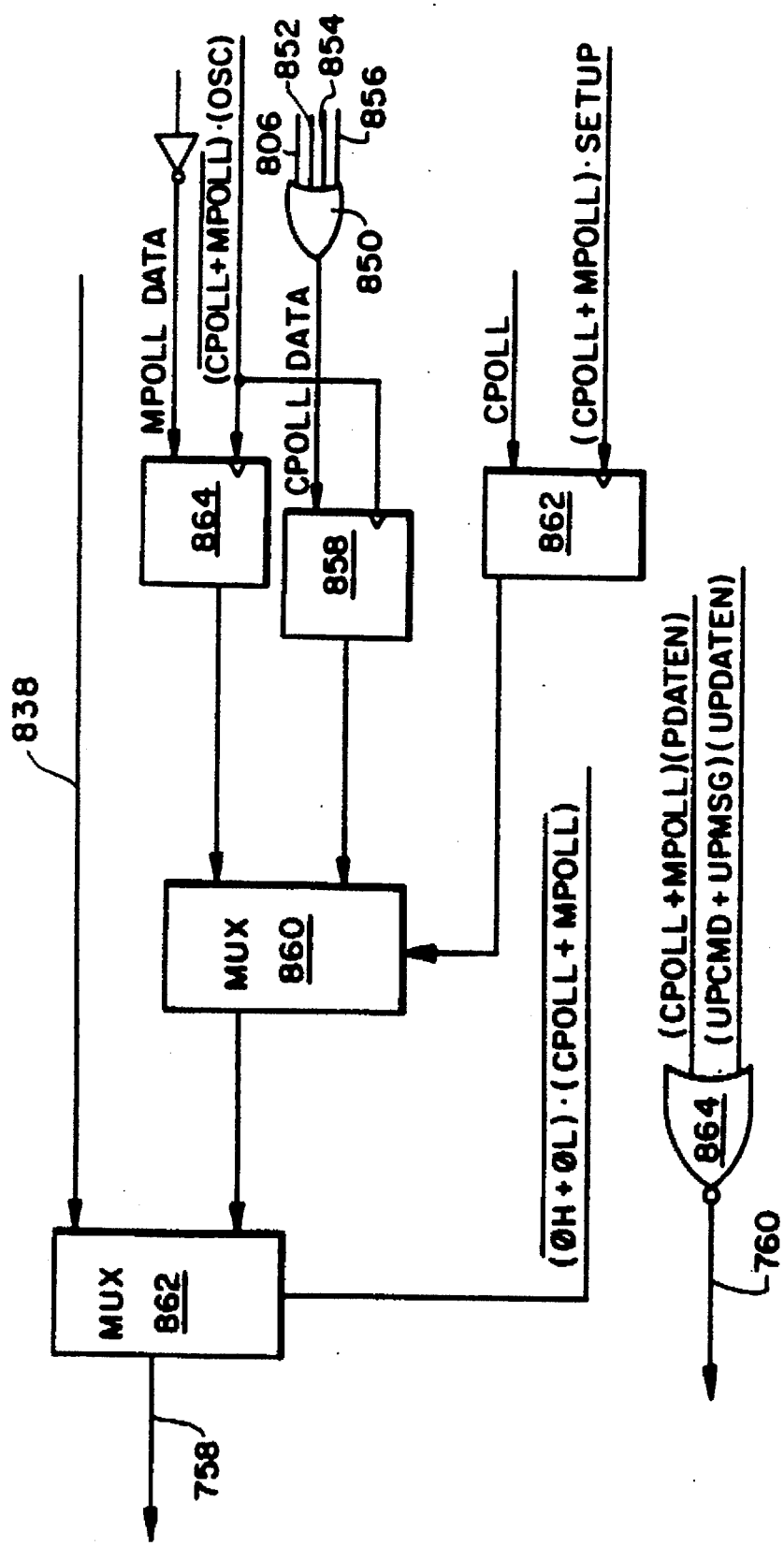

5,642,101

CONTROL APPARATUS FOR USE IN A DWELLING

This application is a continuation of Ser. No. 07/721,328 filed on Jul. 21, 1991, now abandoned, which is a continuation of Ser. No. 07/560,034 filed on Jul. 30, 1990, now U.S. Pat. No. 5,218,552.

BACKGROUND OF THE INVENTION

1. The Field of the Art

The present invention relates to an improved electronic apparatus capable of controlling electrical and gas appliances in a dwelling.

2. Description of the Prior Art

Most conventional dwellings are built using wiring for separate electrical functions and manually adjustable valves for turning on and off gas appliances. These homes are costly to build and do not provide for integrated services such that alarm systems, other sensors, electrical power distribution, and other digital signal processing can be easily transmitted throughout.

U.S. Pat. No. 4,899,129, assigned to the assignee of the present invention, provides for integrated electrical services such that electrical power distribution using an integrated electrical network. However, although certain features of this system are extremely advantageous, it was found desirable to provide a more intelligent control system having greater stability during even higher volume uses, provide for greater configurability, and allow for many new types of "appliances" to easily interface with the control system.

SUMMARY OF THE INVENTION

It is therefore an object of the present invention to provide a control system that will perform with stability during high volume uses.

It is another object of the present invention to provide a system that complies with section 780 of the National Electric Code.

It is another object of the present invention to provide for greater configurability in home automation control systems.

It is a further object of the present invention to allow for many new types of "appliances" to easily interface with the control system.

It is a further object of the invention to provide a controller that efficiently process different data formats to provide a safe environment for residential purposes.

It is still a further object of the invention to provide an appliance connect circuit that allows many different types of appliances to communicate with the controller of the present invention.

It is another object of the invention to provide a interface circuit with the controller of the present invention that will allow conventional appliances that cannot transmit or receive digital information, appliances having the capability to generate or receive only three or four electrical signals, appliances having the capability to generate or receive only one 8 bit byte of signals in any one data transmission, as well as appliances having the capability to generate or receive multiple bytes of 8 bit data in any one data transmission.

In order to attain the above recited objects of the invention, among others, the present invention provides a controller that operates using two different processors. Each processor performs certain predetermined functions. A control processor is responsible for switching AC power distribution and control, as well as processing data that is either three or four bits long, as well as data that is one byte long. A message processor, operating simultaneously, is then primarily responsible for the transmission of long messages between appliances. Further, the manner in which these two processors poll the various appliances attached to the system provides for stable operation even in times of great demand.

The branch interface provides for the regulation of AC power to an appliance attached in a relatively close proximity to the branch interface, such that safe operation is ensured, even if communication with the controller is lost.

The appliance connect circuit allows sophisticated appliances, such as personal computers or other microprocessor based appliances to connect to the system and be able to transmit and receive data messages.

BRIEF DESCRIPTION OF THE DRAWINGS

These and other advantages of the present invention may be appreciated from studying the following detailed description of the preferred embodiment together with the drawings in which:

FIGS. 3A and 3B illustrate STATUS CONTROL DATA and COMMAND CONTROL DATA stored for each appliance according to the present invention;

FIG. 3C illustrates the appliance description assignments according to the present invention;

FIG. 3D is a decoder table used to process STATUS DATA signals for AC power switching according to the present invention;

FIG. 3G illustrates branch channel synchronization encoding signals according to the present invention;

FIG. 3H illustrates the link layer control byte according to the present invention;

FIG. 3I illustrates appliance channel synchronization encoding signals according to the present invention;

FIG. 3L lists the core language message types according to the present invention;

FIGS. 4A and B illustrate downstream COMMAND CONTROL DATA sequence and timing according to the present invention;

FIGS. 4G and 4H illustrate downstream MESSAGE DATA sequence and timing according to the present invention;

FIGS. 4I and 4J illustrate upstream MESSAGE DATA sequence and timing according to the present invention;

FIG. 4L illustrates an example of the encoded and decoded branch data signals transmitted along the branches according to the present invention;

FIGS. 7B1–7B10 illustrate the state diagram of the control poll processor within the control poll circuit according to the present invention;

FIG. 7C illustrates the state diagram of control poll memory interface within the control poll circuit according to the present invention;

FIG. 8A illustrates the message poll circuit according to the present invention;

FIGS. 8B1–8B8 illustrate the state diagram of the message poll processor within the message poll circuit according to the present invention;

FIG. 9A illustrates the branch master poll arbitor according to the present invention;

FIG. 10 illustrates the branch multiplexer according to the present invention;

FIG. 12 illustrates a block diagram of the branch interface connected to a simple or conventional appliance according to the present invention;

FIG. 13 illustrates a block diagram of the branch interface connected to a normal or complex appliance according to the present invention;

FIGS. 14A and 14B together illustrate a block diagram of the configurable interface circuit of the branch interface according to the present invention;

FIG. 16D illustrates power control circuit of FIG. 14 according to the present invention;

FIGS. 16H1–16H6 is a state machine diagram illustrating operation of the data control state machine of FIG. 14 according to the present invention;

FIGS. 16I1–16I3 is a state machine diagram illustrating operation of polling state machine of FIG. 14 according to the present invention;

FIG. 21A illustrates a state diagram of data bit counter state machine of FIG. 20 according to the present invention;

FIG. 21B illustrates a table of the logic equations for the downstream control logic circuit of FIG. 20 according to the present invention;

FIG. 21C illustrates a table of the logic equations for the upstream control logic circuit of FIG. 20 according to the present invention;

FIG. 21D illustrates upstream data circuit of FIG. 20 according to the present invention.

DETAILED DESCRIPTION OF THE PREFERRED EMBODIMENT

Figure 1:
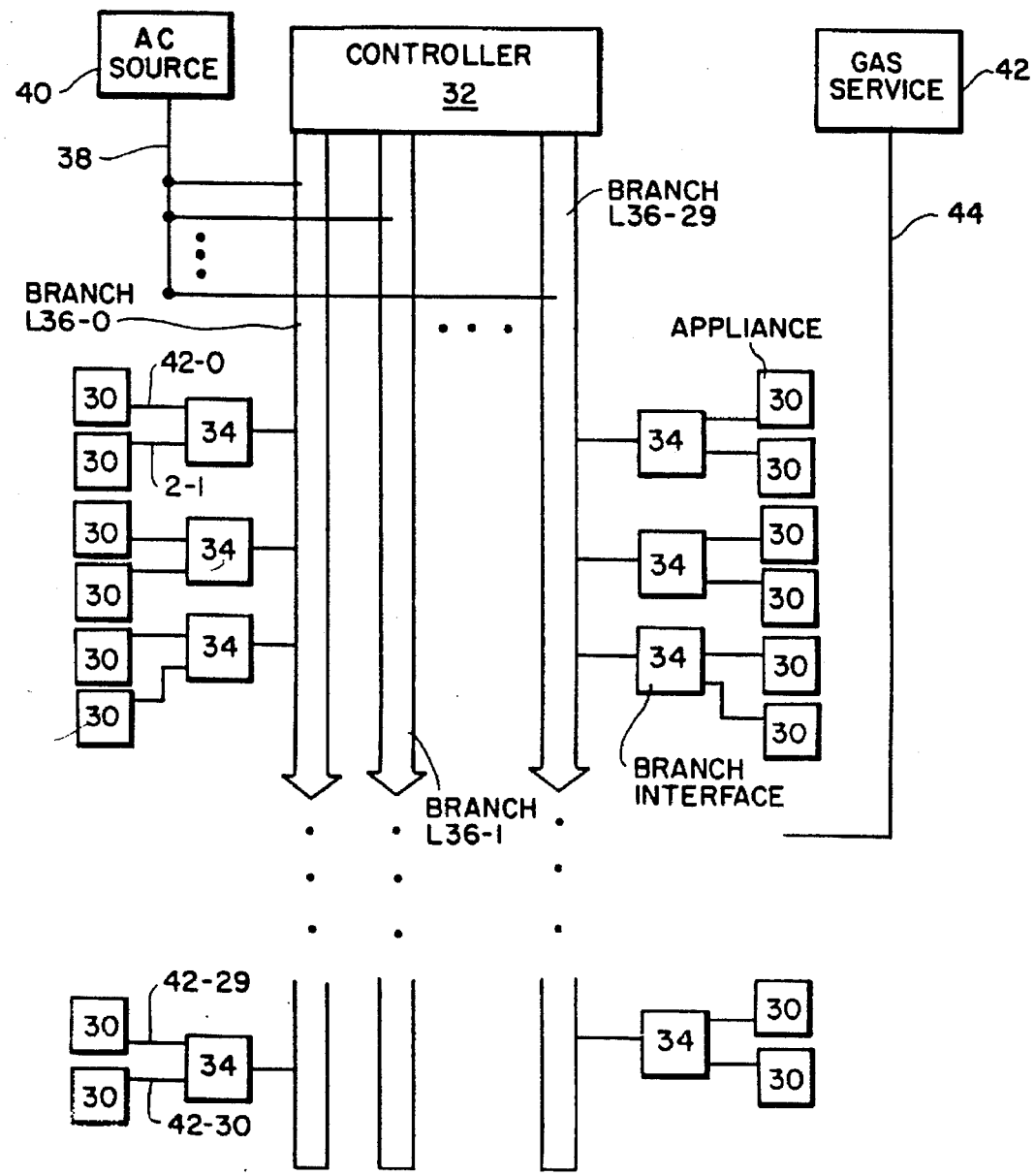
FIG. 1 illustrates the control apparatus according to the present invention.

FIG. 1 illustrates a block diagram of the present invention in which a plurality of branchlines 36 are all connected to a controller 32. Connected to each branchline 36 are a plurality of branch interfaces 34. Each branch interface 34 provides the interface for communication and between controller 32 and an appliance 30 connected to the branch interface 34 as well as energy delivery circuits.

As used herein, "appliance" has a broad meaning, and should be construed as such. Appliance 30 can mean any ordinary conventional type of electrical appliance, such as is plugged into a conventional electrical socket. Appliance 30 can also mean, for example a sensor, light switch or mechanical gas switch that can only receive or transmit certain predetermined electrical signals. Further still, appliance 30 can also mean a sophisticated device capable of receiving and/or transmitting digital signals, such as a device containing an internal microprocessor. Various other types of "appliances", many of which could be variations of the examples set forth above, will become clear in the following description of the invention.

It should be noted that appliance 30 is sometimes referred to as a type of appliance, and other times is used to refer to the location of the appliance. When being used to refer to the location of the appliance, such an appliance will be referred to with a number, such as appliance 30#0 or appliance 30#1.

In the preferred embodiment, controller 32 is capable of supporting 30 branchlines 36, each branchline 36 containing 30 different appliances 30. With this configuration, there exists 930 possible different addresses, one for each appliance 30.

Figure 2:
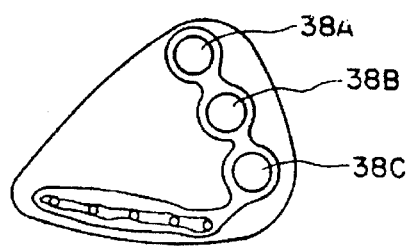
FIG. 2 illustrates a branch cable preferably used in the present invention.

The cable used to make each branchline 36 is illustrated in more detail in FIG. 2. As illustrated, each branchline 36 contains three power conductors 38A, 38B and 38C as well as four data and clock conductors. Two extra ground conductors, as illustrate in FIG. 2, can also be provided. The construction of each branchline 36 is described in more detail in U.S. patent application Ser. No. 07/496,979 filed Mar. 21, 1990, now U.S. Pat. No. 5,057,646, which is hereby expressly incorporated by reference.

FIG. 1 also illustrates that an AC source 40 is connected to the power conductors 38A 38B and 38C, shown in FIG. 2, for hot, neutral and ground conductors, respectively, to supply AC power, such as 120VAC. How this power is switched so that it is received by each appliance 30 will be described in more detail hereinafter.

Also illustrated in FIG. 1 is gas source 42, which can be used to supply natural or bottled gas, for example, via gas line 44 to a gas appliance such as a gas appliance 30, which operation will also be described in greater detail hereinafter. A further description of how gas is supplied is found in U.S. patent application Ser. No. 07/363,849, filed Jun. 9, 1989, now U.S. Pat No. 5,126,934, which is hereby incorporated by reference.

The present invention, described hereinafter, implements various types of digital data transfers so that different types of data are transmitted between the controller 32 and each appliance 30, and vice versa, in different ways. This ensures operation having sufficient speed for operations requiring such speed, but the flexibility to send many different types of detailed messages at the same time.

Such operation is accomplished using two different "types" of data transmitted between controller 32 and each appliance 30. These two types are CONTROL DATA and MESSAGE DATA.

Within the CONTROL DATA, COMMAND CONTROL DATA is used for transmitting data downstream from controller 32 to various branch interfaces 34. FIG. 3B illustrates the b 8byte COMMAND CONTROL DATA that is transmitted downstream from controller 32 to each branch interface 34, which includes data bits for controlling AC power, a user configurable control bit, a user configurable "appliance report", and various test and reset bits. STATUS CONTROL DATA is transmitted upstream from each branch interface 34 to controller 32. FIG. 3A illustrates the 8 byte STATUS CONTROL DATA, which includes power status bits, types of appliance bits, test result bits, and error bits. The purpose of this CONTROL DATA format will become more apparent hereinafter.

Transmission of CONTROL DATA and MESSAGE DATA between the controller 32 and the various branch interfaces 34 will now be described with reference to FIGS. 4–10.

Figure 5:
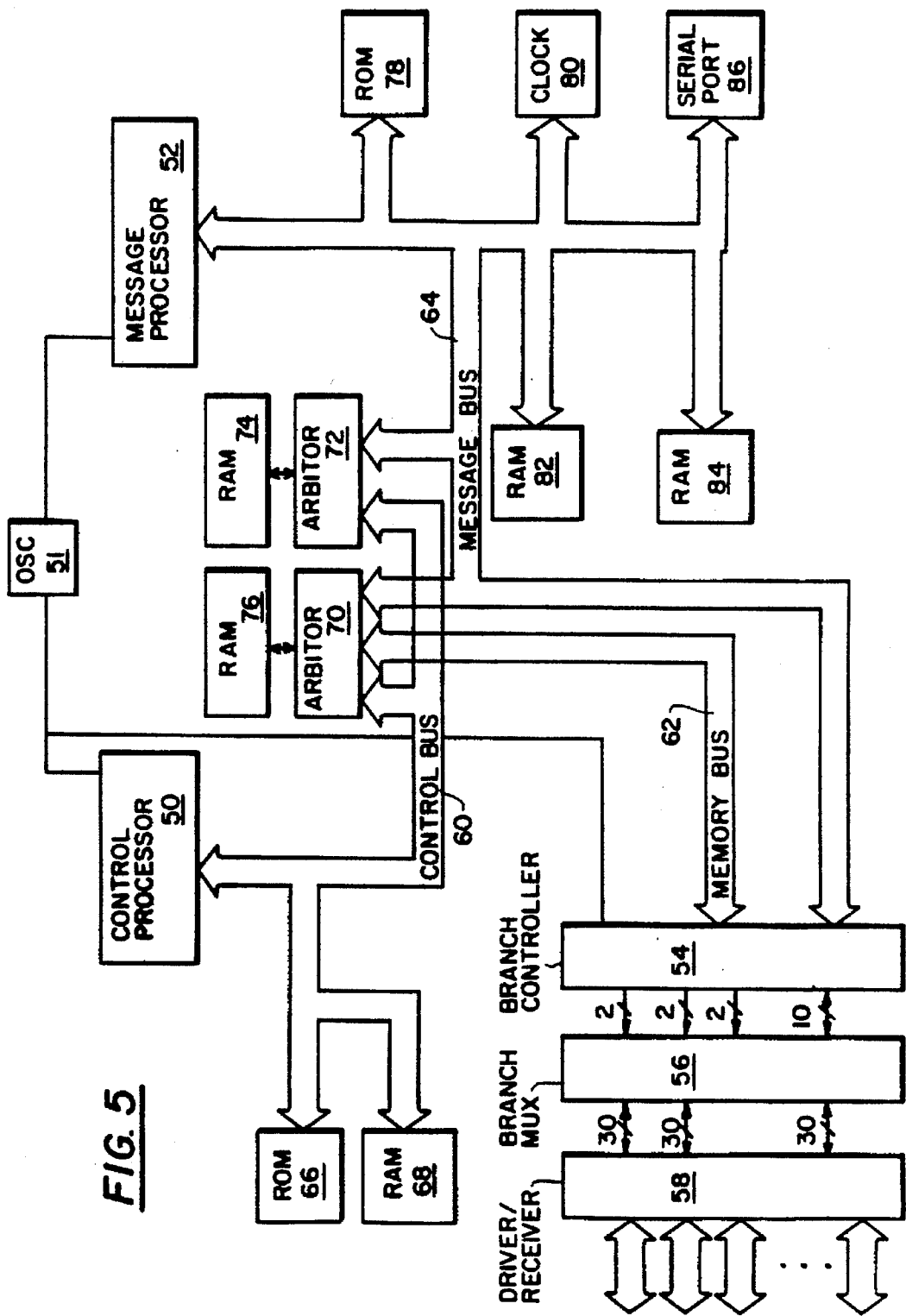
FIG. 5 illustrates the controller according to the present invention.

FIG. 5 illustrates controller 32 in greater detail, and shows the attachment of the various branchlines 36 illustrated in FIG. 1.

Controller 32 uses two processors control processor 50 and message processor 50, which are preferably Intel 80C186 microprocessors having a 16 bit parallel bus and internal DMA controllers. In the controller 32, control processor 50 is used to process the CONTROL DATA, while message processor 52 is used to process MESSAGE DATA. The internal operation and handshaking between control processor 50 and message processor 52 will be described hereinafter. A 32 MHZ oscillator 51 is input to both control poll processor 50 and message processor 52, as well as branch controller, described further hereinafter so that these processors and controllers all use the same clock for most efficient operation.

Control bus 60 is a data bus used to input and output instructions and data from control processor 50 to the branchlines 36 via branch controller 54, branch multiplexer 56, and branch driver/receiver 58, each of which will be described further hereinafter. Control processor 50 data preferably contain about 36 conductors for transmitting 16 parallel address/data signals as well as other control signals, such as read, write, enable, interrupt, chip select, acknowledge, lock and reset signals, for example, as are known in the art.

Control bus 60 is an internal bus that connects the control processor 50 to program code rom 66, local ram 68, arbitor 70, and arbitor 72. Control bus 60 preferably contains about 36 conductors for transmitting 16 parallel address/data signals as well as other control signals, such as read, write, enable, interrupt, chip select, acknowledge, lock and reset signals, for example, as are known in the art.

Program code rom 66 stores the program instruction for operating the control functions described herein.

Local ram 68 is used as a scratchpad memory for control processor 50 as is known in the art.

Arbitor 70 and arbitor 72 are composed of a plurality of configurable multiport memory interfaces such as described in U.S. patent application Ser. No. 07/559,968, entitled CONFIGURABLE MULTIPORT MEMORY INTERFACE, filed on Jul. 30, 1990 simultaneously with this application, now U.S. Pat. No. 5,408,627, which is expressly incorporated into reference. Arbitor 72 is used for data exchanges between shared database ram 74 and control bus 60 and message bus 64, whereas arbitor 70 is used for data exchanges between shared ram 76 and control bus 60, memory bus 62, and message bus 64. Both arbitor 70 and arbitor 72 use a priority scheme such that only one of control bus 60, memory bus 62, or message bus 64 can communicate with control database ram 76 or shared ram 74 at a time. During times when simultaneous requests to communicate occur, a priority scheme determines which of control bus 60, memory bus 62, and message bus 64, for each of arbitor 70 and arbitor 72, receive priority.

Shared database ram 74 is preferably a 32K×16 static ram and is used for storing the contents of the high priority event action table, appliance report mappings, and system clock information.

Ram 76 is preferably an 8K×16 static ram and is used for storing shared STATUS and COMMAND CONTROL DATA, referenced previously in FIGS. 3A and 3B.

Message bus 64 connects message processor 52 to arbitor 70, arbitor 72, program rom 78, real time clock 80, scratchpad ram 82, database ram 84, and a serial communication device for connection to a telephone gateway and technician port 86, as well as branch controller 54 for inputting and outputting data to each branchline 36 via branch controller 54, branch multiplexer 56 and branch driver/receiver 58. Message bus 64 preferably contains 36 conductors for transmitting 16 parallel address/data signals as well as other control signals, such as read, write, enable, interrupt, chip select, acknowledge, lock and reset signals, for example, as are known in the art.

Program rom 78 stores the program instruction for operating the message control functions described herein.

Real time clock 80 provides the real time clock for the controller 32 that synchronizes activities, logs time dependent information, time of day events, and timed event actions, for example. Physically, real time clock 80 can be an ICL7170.

Scratchpad ram 82 is preferably a 32K×16 ram that is used as a local scratchpad by message processor 52 as is known in the art, and also can be used to store the appliance registration table and other tables and queues as described herein.

Database ram 84 is preferably two or more expandable 32K×8 nonvolatile rams, depending on the size of the dwelling, that contain the configuration information stored in the controller 32. This configuration information includes system configuration information, serial telephone gateway tables for serial port 86, and other tables.

Branch Controller

Branch controller 54 of FIG. 5, mentioned previously, is illustrated in greater detail in FIG. 6, which serves as the interface for inputting data from and outputting data to each branchline 36 via branch multiplexer 56 and branch driver/receiver 58. Branch controller 54 includes a control poll 92, message poll 90 and poll arbitor 96, which control the polling of the branchlines 36. Each branchline 36, one branchline 36 at a time, is polled sequentially, by control poll 92 and message poll 90 simultaneously.

Message poll 90 is connected to message bus 64 for transmitting MESSAGE DATA to and from scratchpad ram 82 via an internal DMA bus in message processor 50. Message bus 64 contains data lines, address lines, a clock line, control lines, and two lines used by the internal DMA of message processor 52 for MESSAGE DATA transfer, as will be described hereinafter.

In operation, when a MESSAGE DATA transfer is to take place, message poll 90 outputs BRANCH MESSAGE REQUEST along request line 94 to poll arbitor 96 as well as the message branch address along message branch address lines 124 and 128. If a BRANCH HOLD signal from poll arbitor 96 to message poll 90 along message hold line 98 is not detected within 2 microseconds, message poll 90 assumes that MESSAGE DATA transfer can take place and outputs a BRANCH BUSY signal to poll arbitor 96 along message busy line 100, a MESSAGE DIRECTION SIGNAL along message direction line 102, a MESSAGE CLOCK along message clock line 104, and either sends or receives MESSAGE DATA along message data line 106, as will be described further hereinafter. After the MESSAGE DATA packet has been transmitted, the MESSAGE BUSY signal is removed.

Control poll 92 is connected to memory bus 62 for transmitting/receiving CONTROL DATA between shared ram 76 and the branches 36. Memory bus 62 contains data lines, address lines, a clock line and control lines, similar to message bus 64, but does not contain any lines for DMA transfers, as will become apparent hereinafter. Similar to message poll 90, in operation, when a CONTROL DATA transfer is to take place, control poll 92 outputs CONTROL BRANCH REQUEST along control poll request line 110 to poll arbitor 96 as well as a control branch address along control branch address line 126. If a BRANCH HOLD signal from poll arbitor 96 to control poll 92 along control hold line 112 is not detected within 4 microseconds, control poll 92 assumes that a CONTROL DATA transfer can take place and outputs a BRANCH BUSY signal to poll arbitor 96 along control busy line 114, a CONTROL DIRECTION SIGNAL along control direction line 116, a CONTROL CLOCK along control clock line 120, and either sends or receives CONTROL DATA along control data line 118, as will be described further hereinafter, after which time the BRANCH BUSY signal is removed. The clock input into control poll 92 is also output to arbitor 96 along arbitor clock line 122.

As stated previously, control poll 92 polls each of the 30 branchlines 36 in numerically increasing order, while message poll 90 polls each of the 30 branchlines 36 in numerically decreasing order. To avoid collisions of each of these polls, poll arbitor 96 inputs the branch address along message branch address lines 124 and 128 from message poll 90 and from control poll 92 via control branch address lines 126 prior to every data transfer or polling operation.

With these address inputs, poll arbitor 96 determines whether to transfer the branch address for the MESSAGE DATA along message output branch address line 130, the branch address for CONTROL DATA along control output branch address line 132, or whether to send a HOLD SIGNAL to message poll 90 or control poll 92.

In the preferred embodiment, because COMMAND CONTROL DATA and STATUS CONTROL DATA contains information regarding turning on and off of AC power, control poll 92 always receives priority. As such, poll arbitor 96 determines when control poll 92 is going to switch from, for example branchline 36#5 to branchline 36#6, when message poll 90 is currently on branchline 36#6. Prior to poll arbitor 96 allowing control poll 92 to used branchline 36#6 when a MESSAGE BRANCH REQUEST is sent and a branch address is input for that MESSAGE, poll arbitor 96 first sends a CONTROL HOLD signal to control poll 92 along control hold line 112, allows the current message being transmitted, initiates a MESSAGE HOLD along hold line to message poll 90 after the MESSAGE transmission is complete, turns off the CONTROL HOLD, and allows polling by control poll 92 on branchline 36#6. When control poll 92 finishes the polling of branchline 36#6 and moves to poll branchline 36#7, poll arbitor 96 turns off the MESSAGE HOLD so that message poll 90 can resume its operation on branchline 36#6.

Control Poll

The control poll 92 of FIG. 7A uses control poll processor 134, described in further detail hereinafter, to control the control polling and data exchange operations during the polling of each branchline 36 in the absence of a CONTROL HOLD from poll arbitor 96 illustrated in FIG. 6, which is input on control hold line 112 to control poll processor 134.

During normal operation, control poll 92 first performs downstream transmission of COMMAND CONTROL DATA for every appliance 30 on each branchline 36 that should receive COMMAND CONTROL DATA. After transmission of COMMAND CONTROL DATA for all appliances 30, transmission of STATUS CONTROL DATA from each branch interface 34, for each appliance 30, occurs.

Downstream

Preceding every downstream transfer of 8 bytes of COMMAND CONTROL DATA are a DATA SYNC, and a LLCB, which is a byte of information containing the short address, direction and data type information so that the COMMAND CONTROL DATA is received by the appropriate branch interface 34. FIGS. 4A and 4B illustrate the sequence and timing of the DATASYNC, the LLCB, and the COMMAND CONTROL DATA in relation to the branch clock, which preferably operates at 50 Khz.

Figure 10:
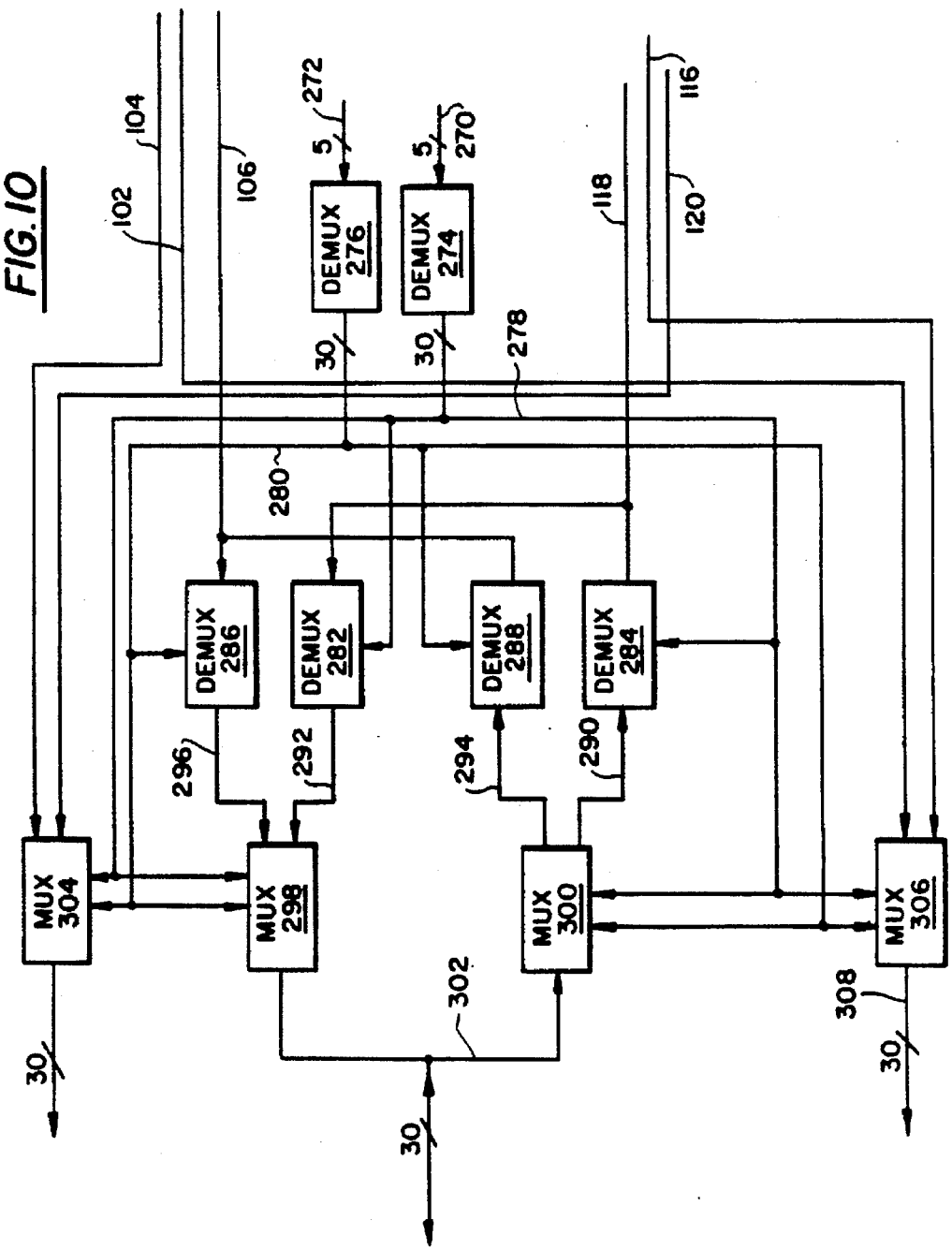

Control poll processor 134 controls operations. FIGS. 7b1–7B10 illustrate a state diagram detailing operation of control poll processor 134, which is also described in the following pages.

Figure 7A:
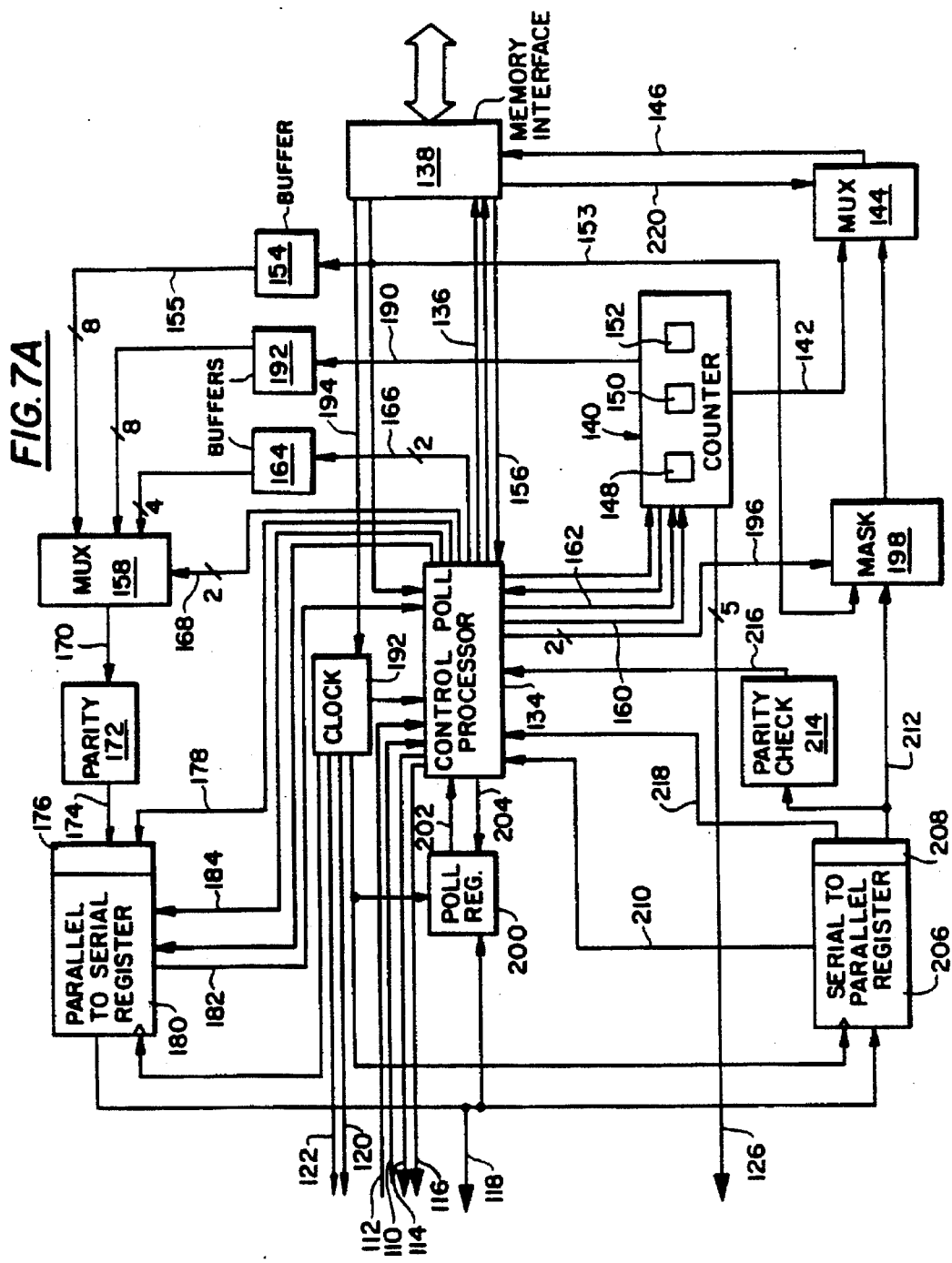
FIG. 7A illustrates the control poll circuit according to the present invention.
Figure 9B:
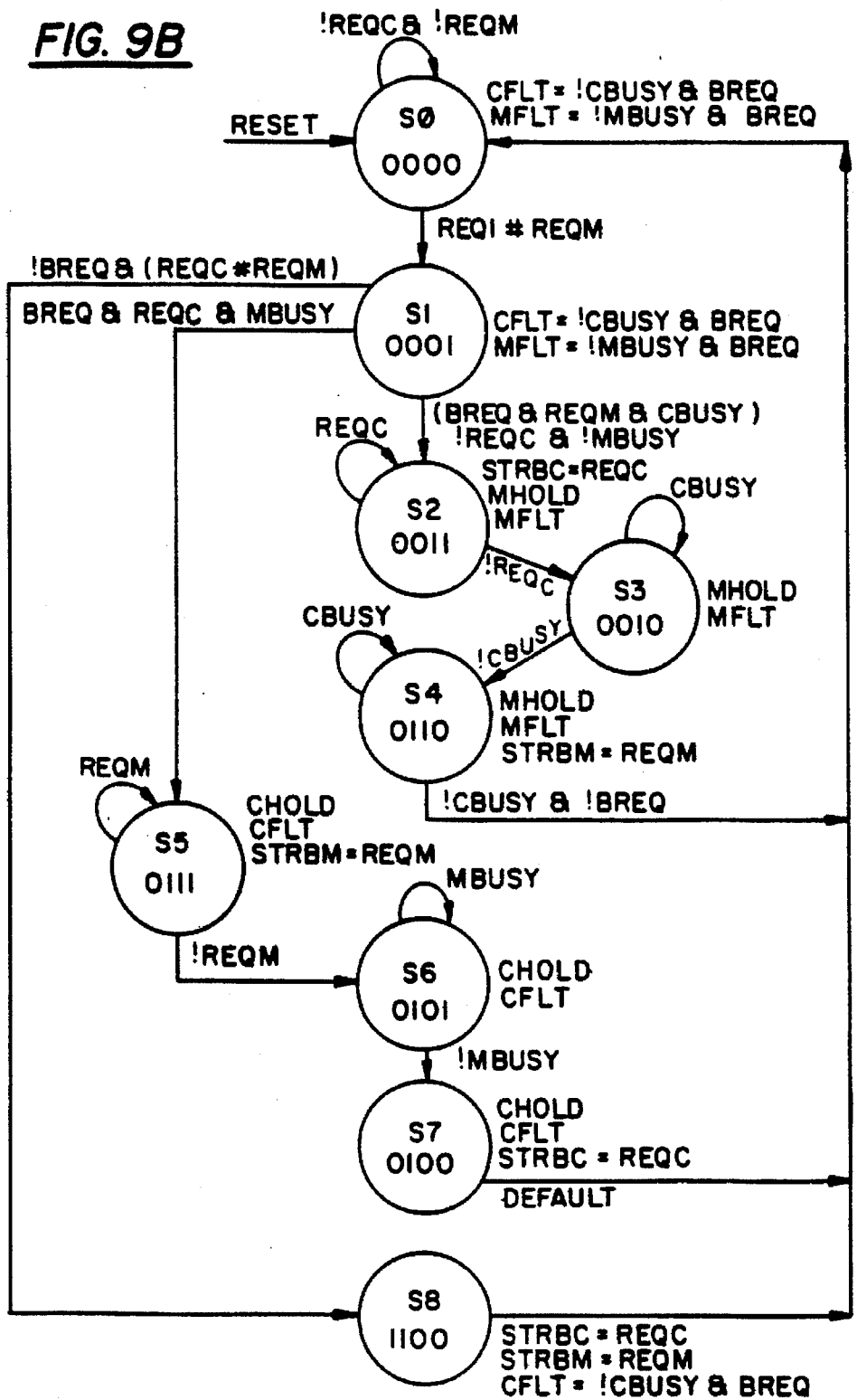
FIG. 9B illustrates the state diagram of the branch master poll arbitor according to the present invention.

In operation, assuming control poll 92 operation is beginning, control poll processor 134 initiates a READ REQUEST along read line 136 in FIG. 7A to memory interface 138.

Memory interface 138 provides the interface to memory bus 62 and memory bus 62. Memory interface 138 contains an internal DMA controller for directly writing CONTROL DATA to and reading CONTROL DATA from shared ram 76 through arbitor 70 illustrated in FIG. 5. A state diagram showing the specific operation of memory interface 138 is set forth at FIG. 7C, which is also described as follows.

Memory interface 138 reads the current address, which includes the branch, appliance, and byte address, of control poll counter 140, which is output along address out line 142 to address/data multiplexer 144 and is input to memory interface 138 via address/data bus 146. Control poll counter 140 contains an 8 bit counter branch address counter 148 for the current branch address, a five bit counter short address counter 150 for the short address corresponding to the attached appliance 30, and a four bit counter byte counter 152 for the byte address of CONTROL DATA transmitted.

Memory interface 138 uses this address to read the first byte of COMMAND CONTROL DATA corresponding to branchline 36#0, appliance 30#0, byte 0. This first byte of COMMAND CONTROL DATA is then output to data buffer 154, which is an 8 bit buffer for storing the next byte if CONTROL DATA and memory interface 138 signals control poll processor 134 that this data is present with a DONE signal along DONE signal line 156.

The byte of CONTROL DATA in data buffer 154 is then transmitted along line 155 and input into multiplexer 158. The most significant bit, bit 7 is also input into control poll processor 134 so that DCC bit, byte 0, bit 7 of COMMAND CONTROL DATA byte zero can be input to control poll processor 134.

If DCC bit corresponding to appliance 30#1 is low, control poll processor 134 increments short address counter 150 by one via increment line 162 using a BYTE INCREMENT signal. Control poll processor 134 can then generate a READ REQUEST to memory interface 138 for the appliance 30 having the next incremental address on branchline 36#2.

If DCC 7 bit is high, a BRANCH REQUEST signal is transmitted to poll arbitor 96 and if a HOLD is not received a BRANCH BUSY is generated and control poll processor 134 then initiates a DATA SYNC. Control poll processor 134 sets sync buffer 164, a four bit buffer that stores the next output 4 bit branch channel sync signal, to 1110 to indicate a data transmission by using two sync set lines 166 to set the state of bits three and four. Bits one and two of this sync signal are always high for a branch sync signal. This SYNC is transmitted to multiplexer 158 and output therefrom by transmitting along multiplexer select lines 168 the MUX-CONTROL signals so that the DATA SYNC is output from multiplexer 158.

The SYNC output from multiplexer 158 is transmitted along output line 170 to parity generator 172, which counts the parity of the input SYNC. The input data byte is then output from parity generator 172, and another bit, bit 8, added to output line 174 so that 9 bits of parallel data are latched into latch 176.

The data within latch 176, upon receipt of a LATCH signal from control poll processor 134 transmitted along latch line 178, is transmitted to parallel to serial register 180 for output of the data, in serial form, to control data line 118. Parallel to serial register 180 also receives a SENDSYNC signal along sync send line 184 at the beginning of a data send that strips bits 4–8 so that only the 4 bit DATA SYNC signal is transmitted. It should be noted that other data syncs could be used, and parity may or may not be part of the sync signal.

After the DATA SYNC is transmitted, parallel to serial register 180 transmits an EMPTY signal on empty signal line 182 to control poll processor 134 to indicate that the SYNC has been fully sent and the next byte, the LINK LAYER CONTROL BYTE ("LLCB") can be input.

Control poll counter 140 also outputs the branch address, using the contents of branch address counter 148, along control branch address lines 126 to poll arbiter 96 indicating the branchline 36 currently being addressed for control by branch multiplexer 56, as described further hereinafter.

After the SYNC signal is sent, the Link Layer Control Byte (LLCB) is then transmitted. The LLCB, illustrated in FIG. 3H, provides information so that the appropriate branch interface 34, on the branchline 36 in use, receives the correct COMMAND DATA for the appropriate appliance 30. To do this, the LLCB contains a five bit short address that corresponds to one appliance 30, and therefore, branch interface 34, as well as the type of type of transfer taking place.

For Downstream COMMAND CONTROL DATA transfer being described, bits 6 and 5 of the LLCB are both set low.

Control poll counter 140 generates the short address and whether an upstream or downstream message is being transmitted. Bit 5 of LLCB is always low for CONTROL DATA transfers. The LLCB is input via address line 190 to buffer 192, and output to multiplexer 158. This byte is then output from multiplexer 158, parity added, and output serially as 9 bits on control data line 118 as previously described.

After LLCB is transmitted and parallel to serial register 180 sends control poll processor 134 an EMPTY signal, control poll processor 134 then increments byte counter 152 by one via increment line 162 and the first byte of COMMAND CONTROL DATA, as shown in FIG. 3B, is transmitted through multiplexer 158 and serially onto control data line 118 as previously described. The next 7 bytes of COMMAND CONTROL DATA are similarly transmitted. During each of these byte transmissions, control poll counter 140 counts the byte being transmitted, so that after 8 bytes have been sent, byte counter 152 is incremented by one and rolls over to a 0 value for the three least significant bits, thereby containing the correct address to address byte 0 of appliance 30#2, which can be input to memory interface 138 as described previously, and control poll processor 134 determines if the DCC 7 bit of appliance 30#2 is high or low. All 30 appliances 30 for all 30 branchlines 36 are sequentially processed in this manner so that all the downstream data present for transmission is transmitted.

It should be noted that parallel to serial register 180 preferably inputs 50 Khz clock signal generated from a standard clock control poll clock 192, that preferably inputs a 16 mhz clock signal transmitted from memory interface 138 on clock line 194. Poll clock 192 also transmits a 50 Khz BRANCH CLOCK via control poll clock line 120. This clock is delayed 5 microseconds from the 50 Khz clock received by parallel to serial register 180. This delay ensures that when a branch interface 34 receives the clock, that the serial data output from parallel to serial register 180 is valid on the branchline 36 data line. During this downstream COMMAND CONTROL DATA transmission, control poll processor 134 sends a BRANCH DIRECTION signal along control direction line 116, through branch multiplexer 56 to branch driver/receiver 58, for use as further explained hereinafter.

At the end of this downstream transmission of COMMAND CONTROL DATA for one appliance 30, control poll processor 134 takes off the BRANCH BUSY signal and inputs a second time from memory interface 138 byte 0 of appliance 30#2. Byte counter 152 already has the correct count, which makes this simple. Byte 0 is then input into mask from data buffer 154. Mask 198 is actually a multiplexer controlled by mask control line 196 that always passes bits 0–5 through. However, this second time through, line 196 is low and a low signal for bit 7 is input, indicating that this COMMAND CONTROL DATA has been sent downstream to the appliance. This bit will remain in this position until some sequence within control processor 50 and message processor 52 causes this COMMAND CONTROL DATA to change.

Control poll processor 134 then increments short address counter 150 by one and can generate a READ REQUEST to memory interface 138 for the first byte of COMMAND CONTROL DATA from appliance 30#3.

This process then repeats for all the appliances 30 on all the branchlines 36, at which time upstream STATUS CONTROL DATA is then transmitted from each branch interface 34 to the controller 32.

Upstream

Figure 4C:
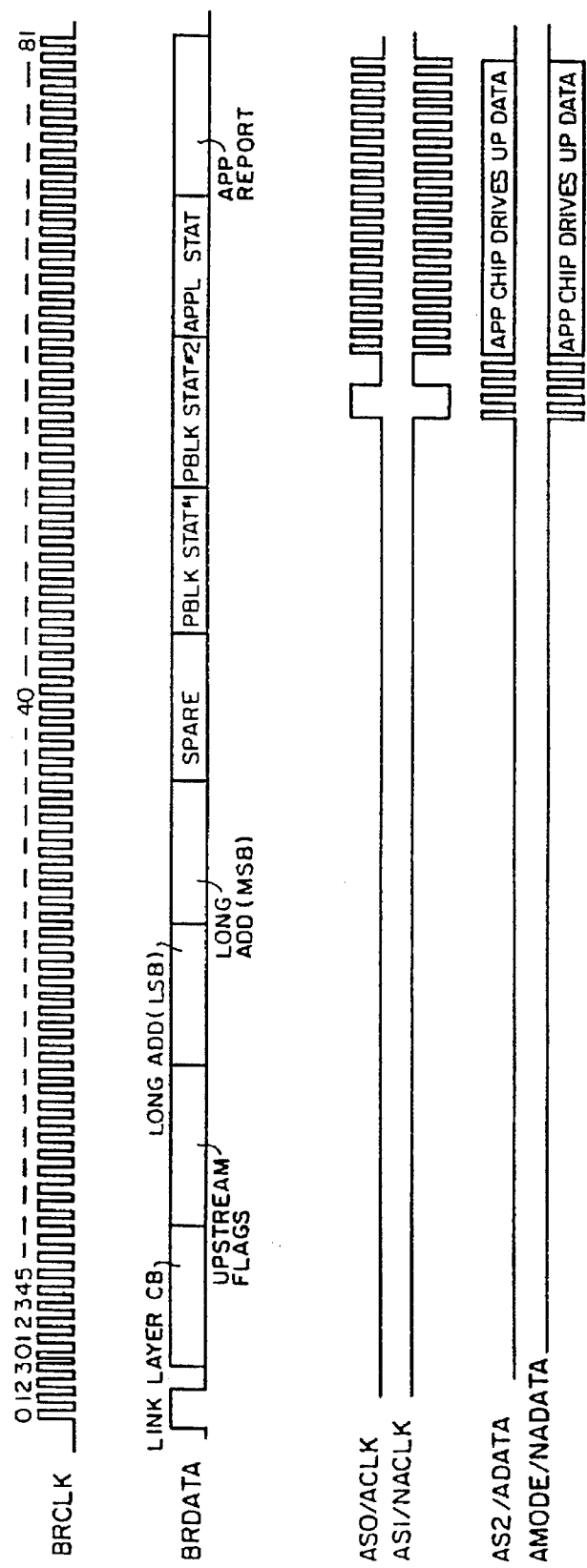
FIGS. 4C and D illustrate upstream STATUS CONTROL DATA sequence and timing according to the present invention.
Figure 4E:
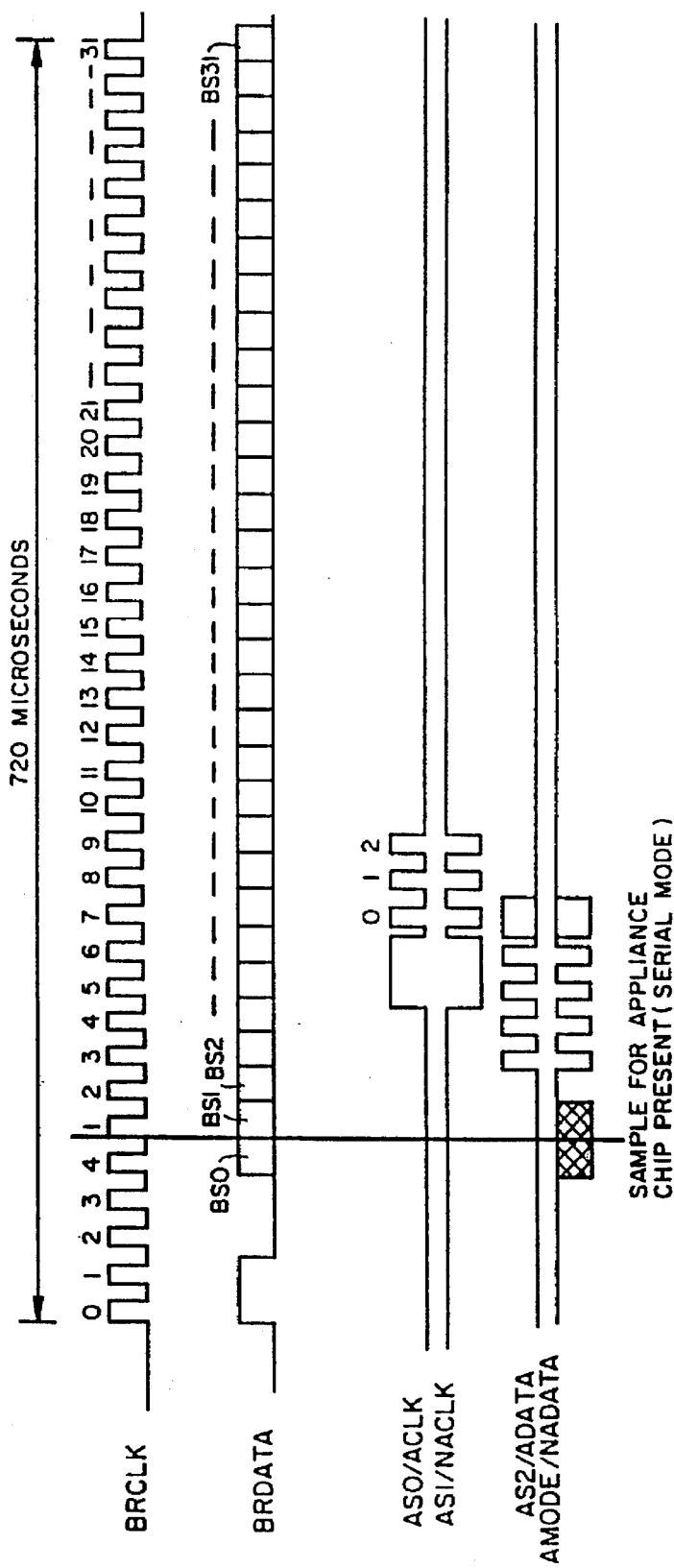
FIG. 4E illustrates the control poll timing on the branch channel and the timing of a normal or complex appliance on the branch channel, according to the present invention.
Figure 4F:
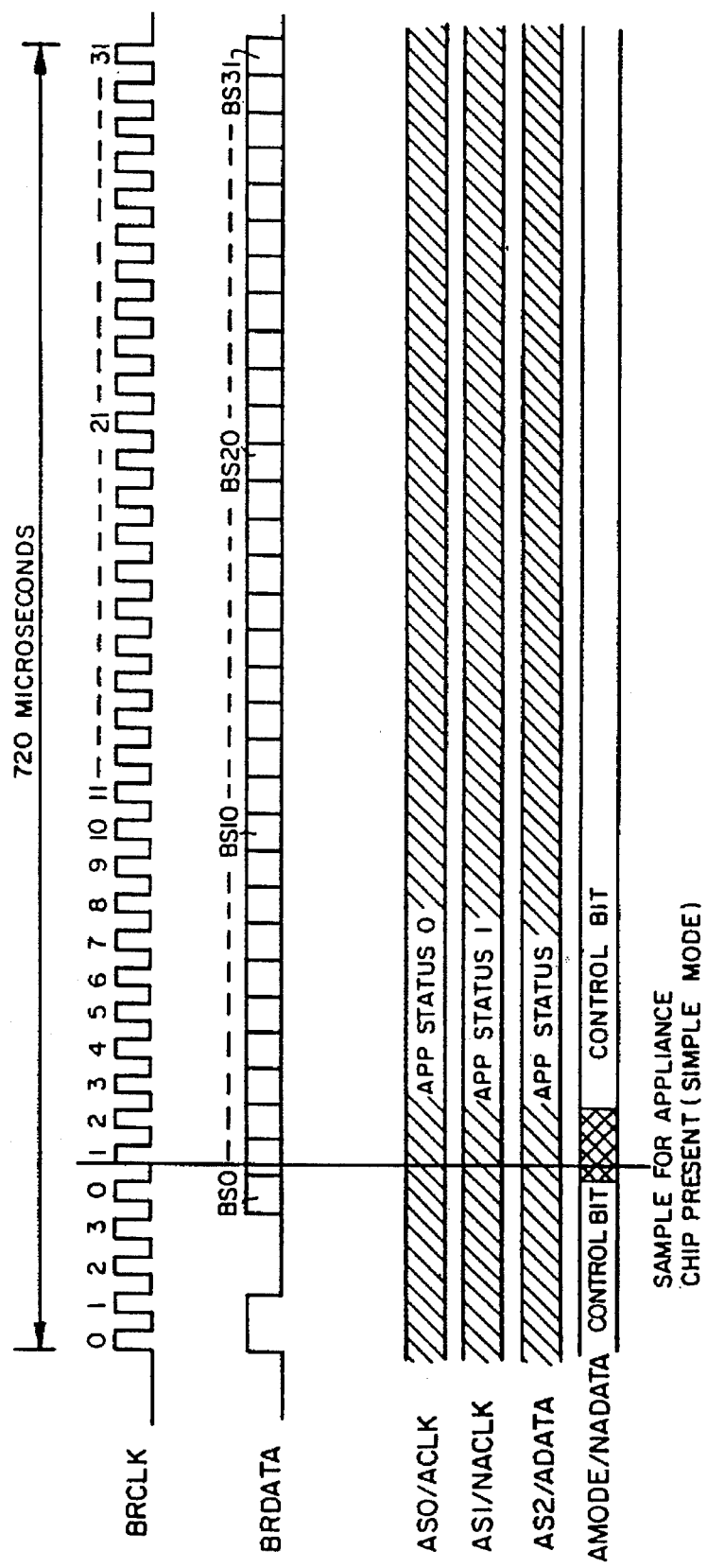
FIG. 4F illustrates the control poll timing on the branch channel, and the timing of a simple appliance on the branch channel, according to the present invention.

After the downstream transmission of COMMAND CONTROL DATA is complete for all branchlines 36, upstream transmissions of STATUS CONTROL DATA for all branchlines 36 take place. Upstream transmissions of STATUS CONTROL DATA, after sending a CONTROL REQUEST without a responsive HOLD, begin with a control poll. FIGS. 4E and 4F illustrate the timing of the control poll operation, and the variation in timing along the appliance channel, discussed hereinafter, for different types of attached appliances 30.

After the CONTROL BRANCH REQUEST, no HOLD, and BUSY SIGNAL assertions are complete, control poll processor 134 begins this operation by transmitting a CONTROL POLL SYNC using sync set lines 166 to sync buffer 164, which SYNC is output along sync buffer line to multiplexer 158 and eventually output serially to control data line 118. With this CONTROL POLL SYNC, each branch interface 34 recognizes that a control poll is occurring.

If the STATUS CONTROL DATA for an appliance 30 has changed since the last control poll operation, that branch interface 34 will place a STATUS DATA PRESENT signal on branch data lines at the appropriate time slot, using the delayed BRANCH CLOCK also output onto branch clock lines as a reference, for each of the 30 appliances 30 associated with that branch. 30 different one bit signals, one for each appliance 30, are therefore applied onto branch data lines in timed sequence, as illustrated in FIGS. 4E and 4F, which are then stored in poll register 200, which is a 32×1 shift register, one at each DELAYED BRANCH CLOCK BAR. This provides at least 10 microseconds for the upstream data to be received, which helps ensure proper data transmissions. After completion of a control poll, the BRANCH BUSY SIGNAL is turned off.

The 30 bits stored in poll register 200 are then sequentially input along line 202, shown in FIG. 7, into control poll processor 134, upon receipt of a SHIFT OUT signal on shift line 204 from control poll processor 134. Control poll processor 134 then determines whether an upstream STATUS CONTROL DATA transmission should take place for that appliance 30. If a low value is received, no new STATUS CONTROL DATA exists and the next bit in poll register 200 is read and control poll processor 134 increments short address counter 150 by one.

If this bit in poll register 200 has a high value and STATUS CONTROL DATA exists, control poll processor 134 initiates a CONTROL BRANCH REQUEST to poll arbitor 96, and if a HOLD is not received, then transmits a BRANCH BUSY signal to poll arbitor 96, as well as a DATA SYNC, and then a LLCB as described previously. The LLCB, for a transmission of STATUS CONTROL DATA transfer, will have bit six high and bit 5 low. FIGS. 4C and 4D illustrate the sequence and timing of the DATASYNC, the LLCB, and the STATUS CONTROL DATA in relation to the branch clock, which operates at 50 Khz.

In response, the appropriate branch interface 34 transmits the first of 8 bytes of STATUS CONTROL DATA for the appropriate appliance 30. Each byte of upstream data, with a ninth parity bit, is transmitted serially on control data line 118 into serial to parallel register 206, triggered by DELAYED BRANCH CLOCK BAR, and placed in latch 208. When one byte is received, serial to parallel register 206 transmits a BYTE READY signal along byte ready line 210 to control poll processor 134, the byte of STATUS CONTROL DATA is latched onto upstream data bus 212 to parity checker 214 and mask 198, while the parity bit is input along parity line 218 to control poll processor 134.

Parity checker 214 counts the parity of the byte of STATUS CONTROL DATA and transmits the counted parity along parity checker to control poll processor 134, which compares this value with the value of the parity bit transmitted via parity line 218.

If the parity matches, the byte of STATUS CONTROL DATA is transmitted through mask 198 address/data multiplexer 144. address/data multiplexer 144, as previously stated, is an 8 bit wide, 2 to 1 multiplexer that inputs either the long address, including branch, appliance, and byte address from control poll counter 140 along address out line 142, or the byte of STATUS CONTROL DATA from mask 198. Upon receipt of the proper control signals along control lines 220 from memory interface 138, the long address, followed by the byte of STATUS CONTROL DATA, is output on address/data bus 146 to memory interface 138 and, upon receipt of a WRITE REQUEST from control poll processor 134, transmits the byte of STATUS CONTROL DATA to the shared ram 76 illustrated in FIG. 5. Upon completion of the write operation from memory interface 138 to shared ram 76, memory interface 138 transmits a WRITE COMPLETE signal to control poll processor 134 via DONE signal line 156.

Each byte of STATUS CONTROL DATA is then transmitted in this manner, after which time control poll processor 134 takes off the BRANCH BUSY signal, increments short address counter 150 and then inputs the next bit in poll register 200 via line 202 to continue the sequence just described.

It should be noted that if the parity of one byte of STATUS CONTROL DATA did not match, control poll processor 134, prior to incrementing short address counter 150, can be configured to resend this SYNC and LLCB some predetermined number of times. If the STATUS CONTROL DATA for that appliance 30 is still not properly received, it will then set the parity bit of the upstream flag byte, bit 7 of byte 0 in FIG. 3A to indicate to control processor 50 and message processor 52 that the previous STATUS CONTROL DATA should be ignored and to ignore this appliances data until this bit is reset. Operation then passes to the next appliance 30 by incrementing short address counter 150.

As each branchline 36 is addressed fully, branch address counter 148 is also incremented by control poll counter 140 so that the continuous sequence described above simply repeats.

Message Poll

Message poll 90 is constructed in a manner very similar to that of control poll 92. Similar structure of message poll 90, illustrated in FIG. 8 that is similar to that of control poll 92 of FIG. 7 are similarly labelled. Described hereinafter, the state diagram for the message poll processor is nevertheless included in FIGS. 8B1–8B8.

The differences between control poll 92 and message poll 90 exist within message poll processor 222 and memory interface 224. Further, no mask 198 or associated data and control lines are required. Each of these differences will be explained. Otherwise, message poll 90 operates similarly to that described above to transmit DOWNSTREAM MESSAGE DATA from controller 32 to the appropriate branch interface 34 and UPSTREAM MESSAGE DATA from the appropriate branch interface 34 to controller 32.

Figures 3J, 3K:
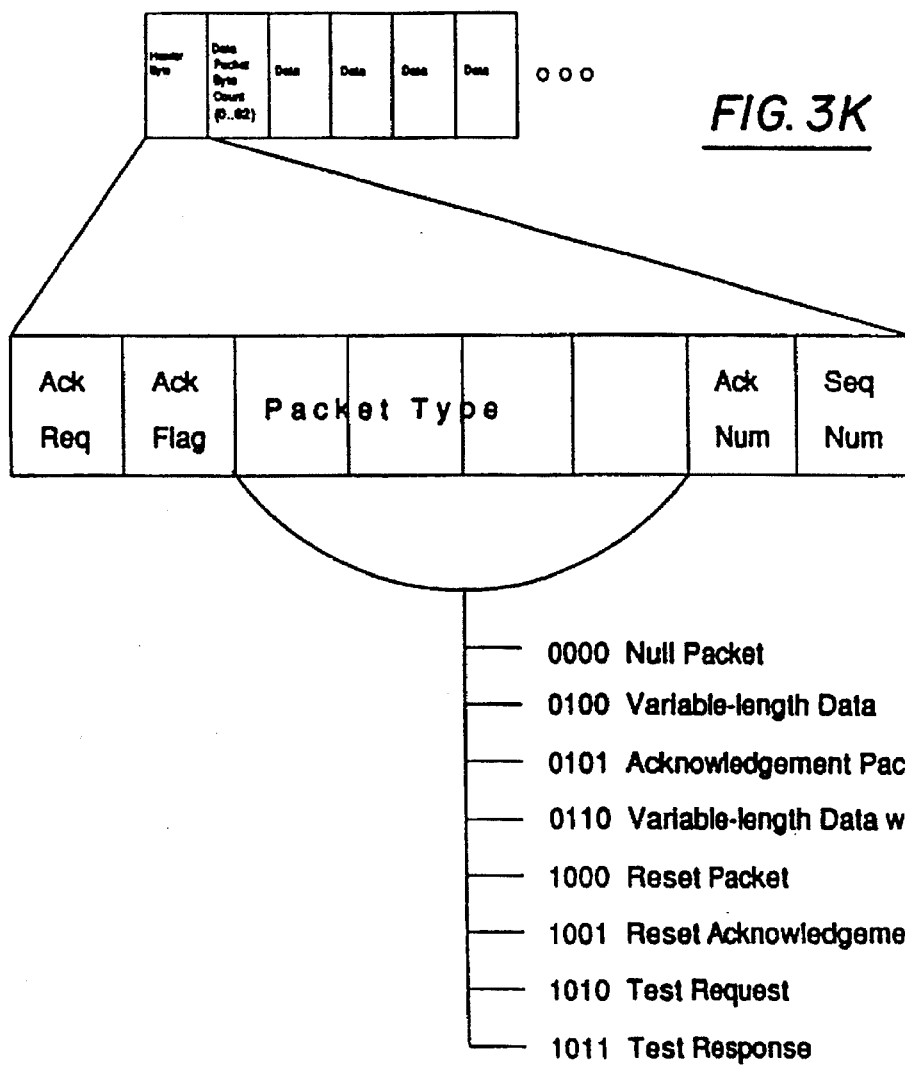
FIG. 3J illustrates registered message control status data according to the present invention.
FIG. 3K illustrates the data format for MESSAGE DATA according to the present invention.
Figure 4G:
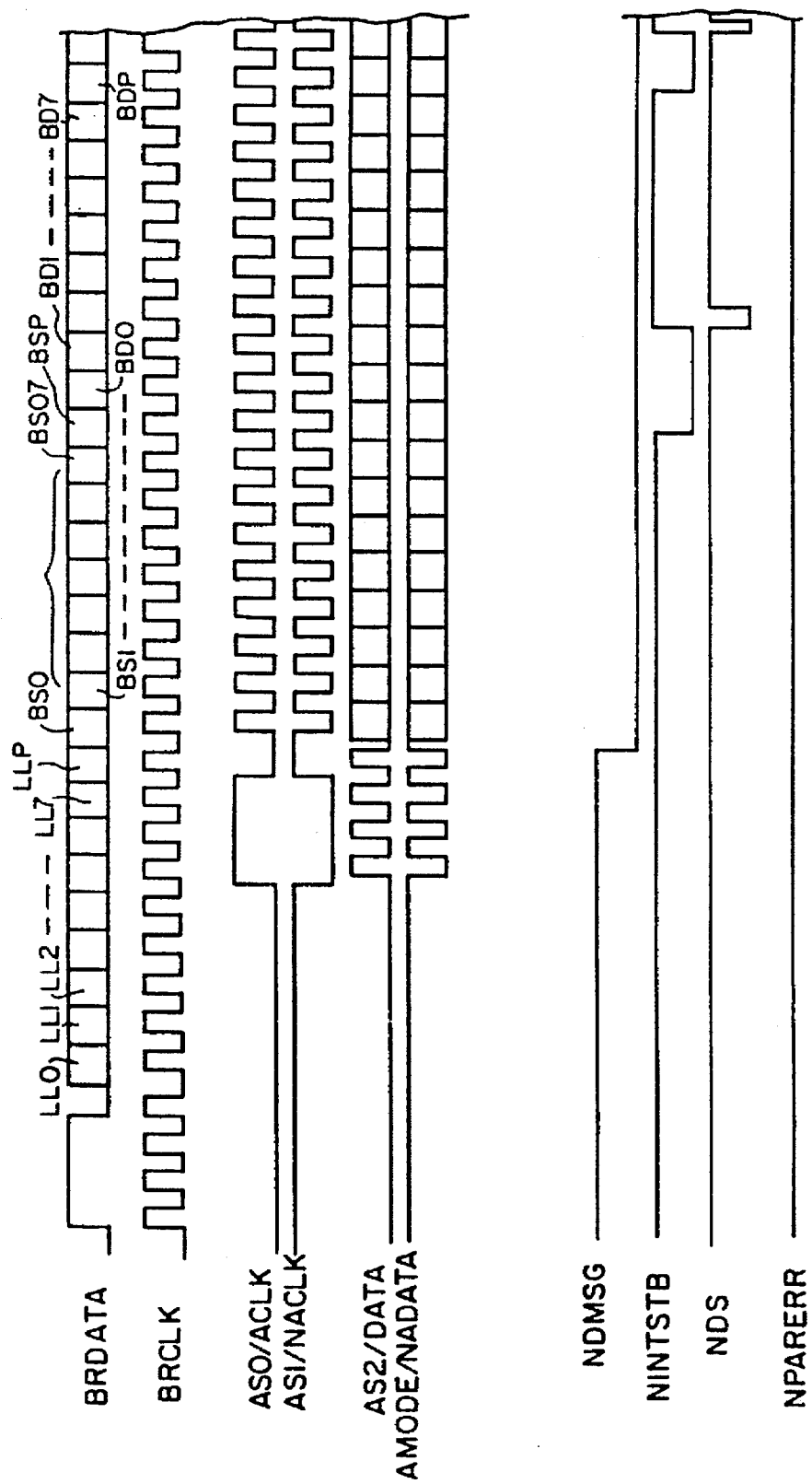
Figure 4J:
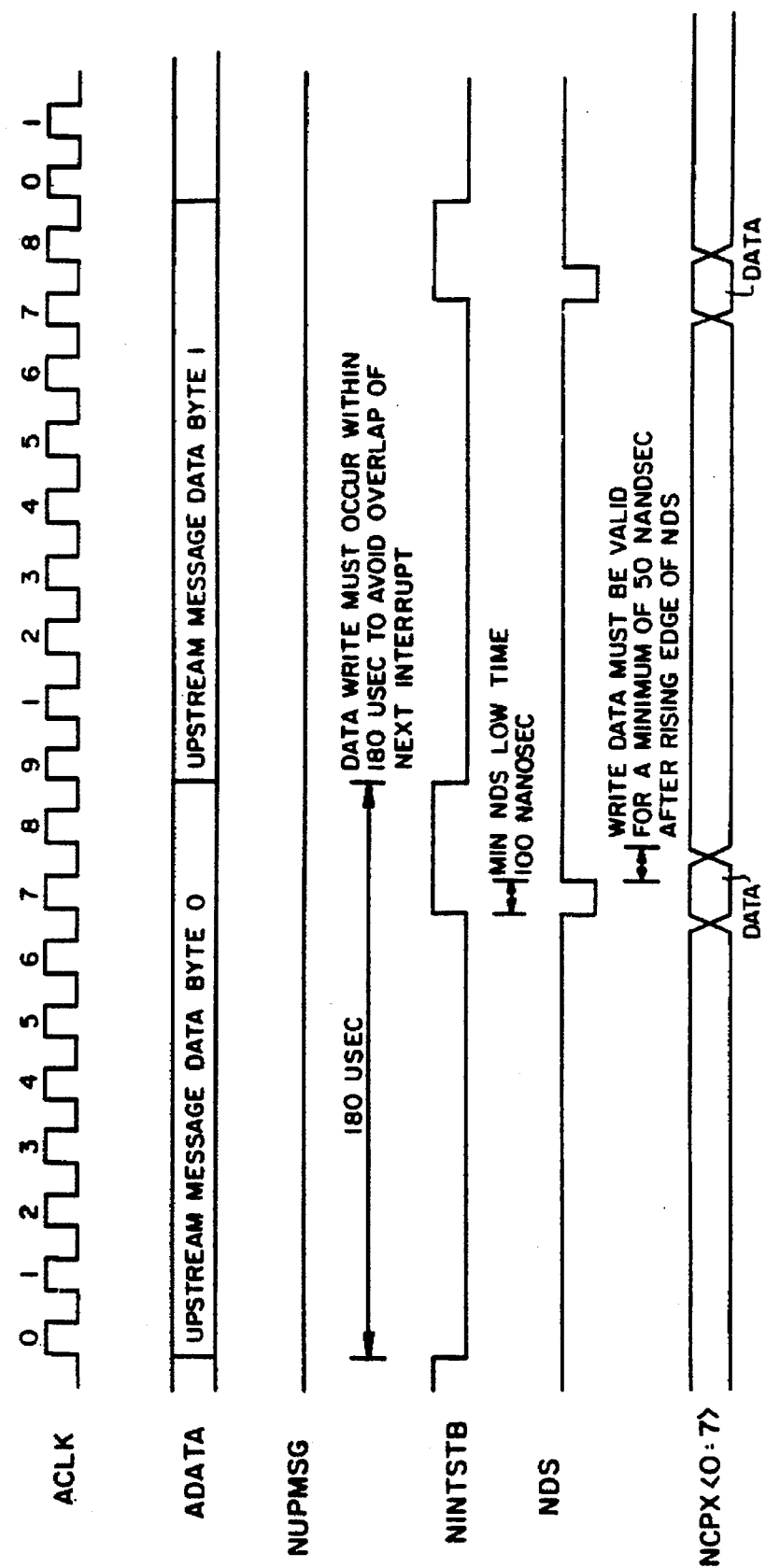
Figure 4K:
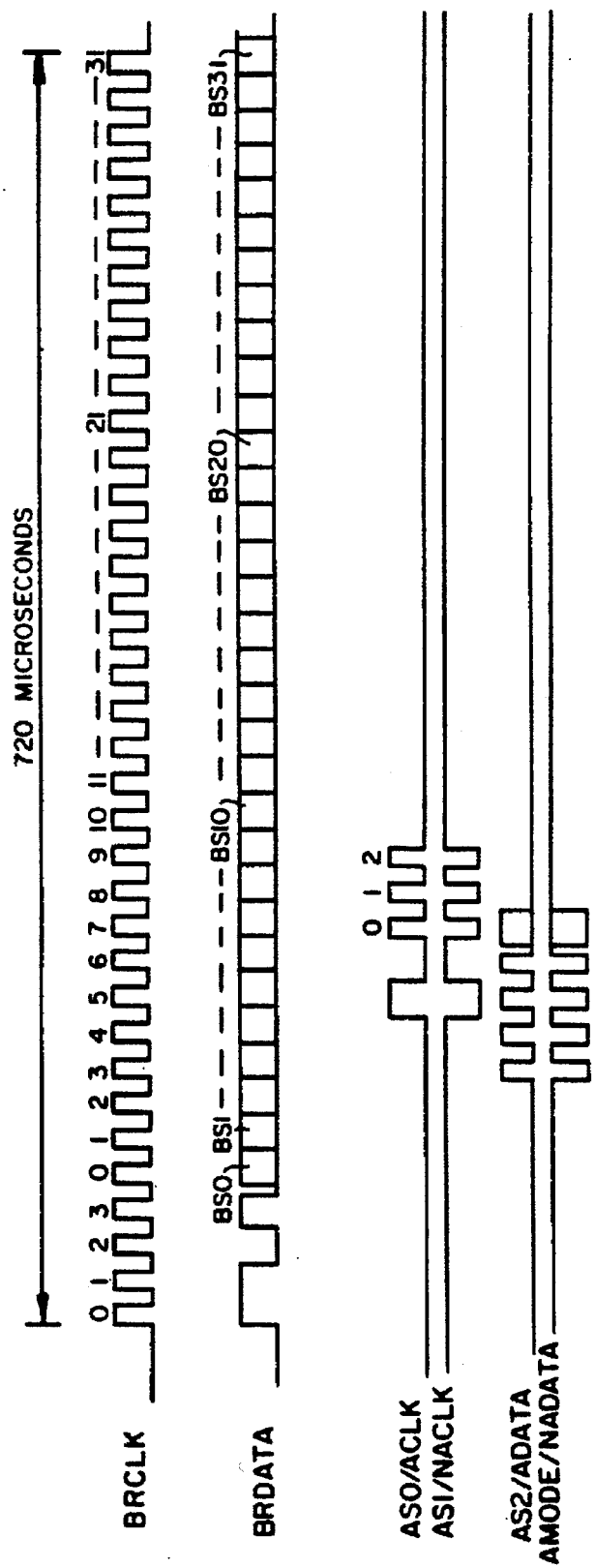
FIG. 4K illustrates the message poll timing on the branch channel for one branch according to the present invention.
Figure 4M:
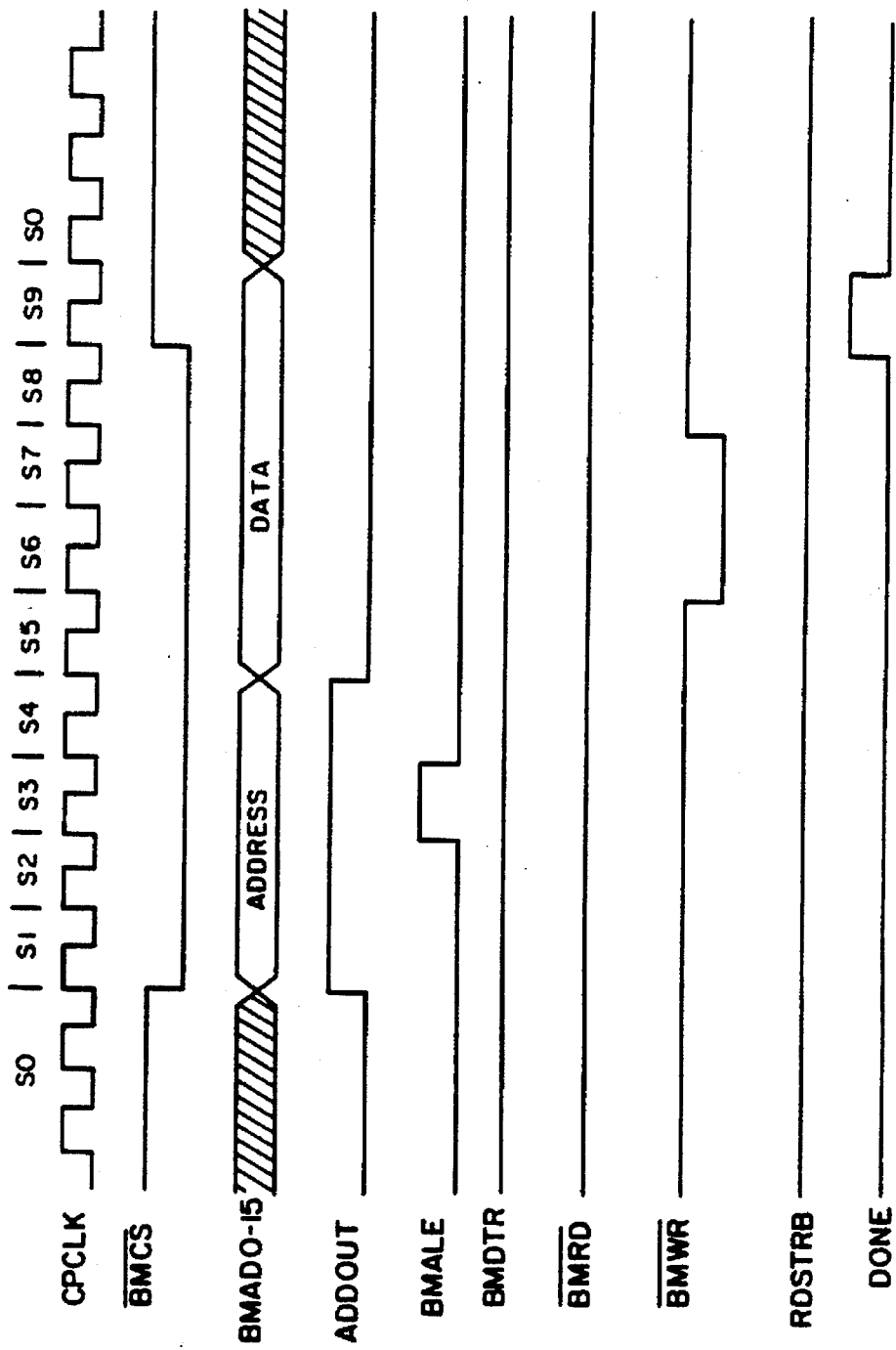
FIG. 4M illustrates a control poll memory write cycle of control memory interface according to the present invention.
Figure 4N:
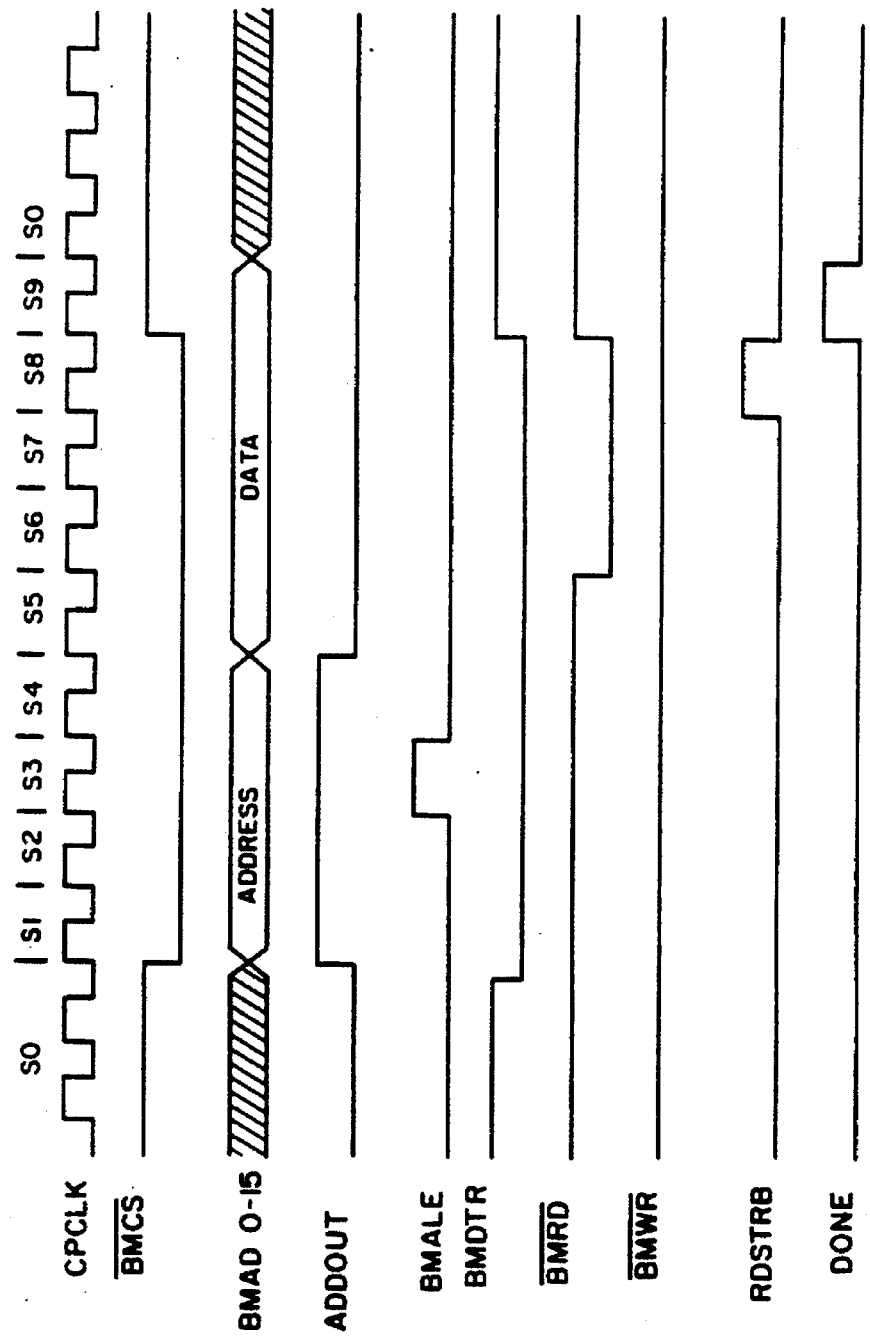
FIG. 4N illustrates a control poll memory read cycle of control memory interface according to the present invention.

FIG. 4K illustrates the timing of the message poll operation. This timing is identical to control poll operation, except that the SYNC signal is 1101, as is apparent from FIG. 3G.

FIGS. 4G and 4H illustrate the sequence and timing of the DATASYNC, the LLCB, and the DOWNSTREAM MESSAGE DATA in relation to the branch clock. FIGS. 4I and 4J illustrate the sequence and timing of the DATASYNC, the LLCB, and the UPSTREAM MESSAGE DATA in relation to the branch clock. The significant difference between COMMAND CONTROL DATA is that the length of the data transfer can be much longer, 64, rather than 8 bytes long.

The structure of MESSAGE DATA is illustrated in FIG. 3K, and contains a header byte, a message length byte, and then data bytes. The contents of the data bytes are Core Language Message Types, listed in FIG. 3L, which can be used to transmit data and perform various operations, as will become apparent hereinafter. Although longer, MESSAGE DATA is transmitted in almost the same manner as CONTROL DATA.

Figure 6:
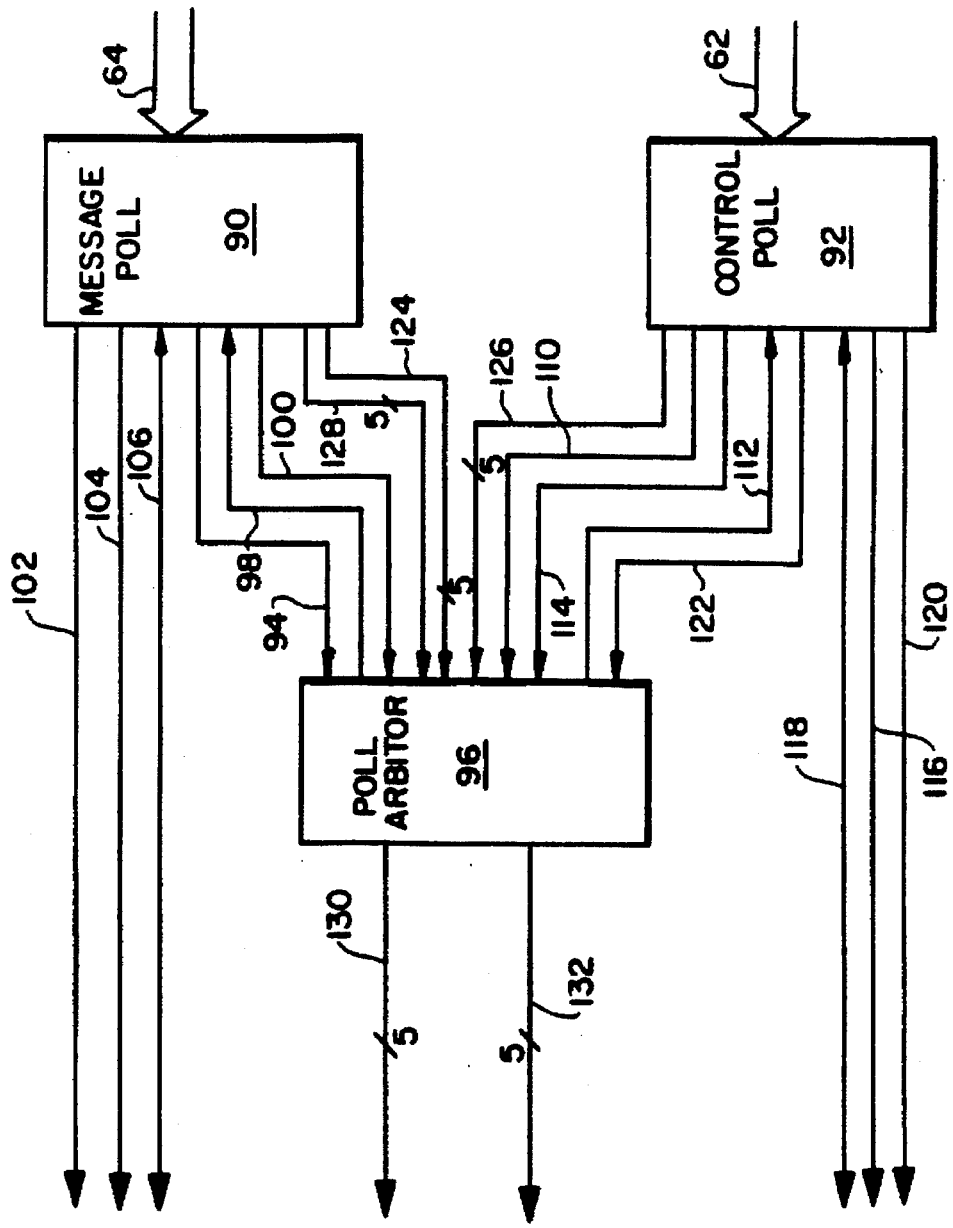
FIG. 6 illustrates the branch master circuit within the controller according to the present invention.

Message poll processor 222 controls the message polling and MESSAGE DATA operations in the absence of a CONTROL HOLD ALONG Hold line from poll arbitor 96 illustrated in FIG. 6.

Message polling will begin only after the internal message processor 52 DMA circuit of FIG. 5 outputs a RUM signal along line 226 to message poll processor 222 indicating that a WRITE REQUEST can take place. Further, the BRANCH ADDRESS for the MESSAGE POLL is output along message address lines 124 and 128 to poll arbitor 96 to determine if a collision will take place with control poll 92.

If a HOLD is not received from poll arbitor 96, and RUM is input to message poll processor 222, message polling takes place in an identical manner as in control poll 92. The branch address is output from message poll counter 228 along message branch address line 124 to poll arbitor 96. If the corresponding branchline 36 is not in use, message poll processor 222 sends a MESSAGE POLL SYNC and the branch interfaces 34 on that branchline 36 responds with an UPSTREAM MESSAGE PENDING signal, in the appropriate time slot, so that 30 different one bit signals are stored in poll register 200.

Prior to the processing of the bits in poll register 200, if a DOWNSTREAM MESSAGE is pending such that the DOWNSTREAM MESSAGE PENDING (DMP) bit of the DOWNSTREAM CSR, described hereinafter, is set, it receives priority. This enables the message queue in controller 32 to be emptied. If the DMP bit is not set, message poll processor 222 then reads these bits and processes UPSTREAM MESSAGE DATA in a manner almost identical to the STATUS CONTROL DATA for all of the appliances 30 on the polled branchline 36, still giving priority to DOWNSTREAM MESSAGES, if they exist, after each UPSTREAM MESSAGE is transmitted.

However, in the transmission of UPSTREAM MESSAGE DATA, CSR register 230 is loaded with the complete address from message poll counter 228 via address line 142. A WRITE ENABLE from message poll processor 222 along line 244 then causes the address in register 230 and then the byte of MESSAGE DATA in data register 232 to be transmitted to dam1 for processing and writing the data into scratchpad ram 82. When a whole UPSTREAM MESSAGE DATA packet is written, without a parity error, message poll processor 222 then continues to read the results of the poll operation, stored in poll register 200. It should be noted that message poll counter 228 is continually being incremented so that the associated address is correct.

The other difference that takes place is with respect to DOWNSTREAM MESSAGE DATA transmissions. Rather than polling all addresses within shared ram 76 as done by control poll processor 134, the message processor 52 initiates when to send DOWNSTREAM MESSAGE DATA on a random basis. As such, message processor 52 generates a DOWNSTREAM CSR, illustrated in FIG. 3J, which the DMA of message processor 52 places in CSR register 234 of memory interface 224.

When ready for this downstream message, message poll processor 222 inputs Bit 10, DOWNSTREAM MESSAGE PRESENT via line 226, generates a BRANCH REQUEST, transmitted to poll arbitor 96 along request line 94, and the BRANCH ADDRESS within register 234 is transmitted via message address line 128 to poll arbitor 96, which determines if a collision will take place. If a HOLD is not received, message poll processor 222 begins a downstream message operation by initiating a DATA SYNC. The LLCB follows, just as in a downstream COMMAND CONTROL DATA transfer, except the LLCB is obtained from a portion of the DOWNSTREAM CSR and DIRECTION SIGNAL output along line 238 from message poll processor 222. Once sent, corresponding MESSAGE DATA bytes are then transmitted from scratchpad ram 82, via dma0, data register 240, and to multiplexer 158. When the message is completely sent, message poll processor 222 generates a READ COMPLETE signal along line 242 to memory interface 224, which transfers this to DMA channel 0 of message processor 52 so that Bit 10, DOWNSTREAM MESSAGE PRESENT of the downstream CSR can be changed by Message processor 52 to a 0 value, indicating that there is no message present.

Poll Arbitor

As described previously, poll arbitor 96 arbitrates the branchline 36 that is currently being used by both control poll 92 and message poll 90, giving priority to control poll 92.

FIG. 9A illustrates message request line 94 for inputting the MESSAGE BRANCH REQUEST, control request line 110 for inputting the CONTROL BRANCH REQUEST, message busy line 100 and control busy line 114, for inputting the MESSAGE and CONTROL BUSY signals from message poll 90 and control poll 92, as well as message hold line 98 and control hold line 112, for outputting the HOLD signals that have previously been described. Further, message address lines 124 and 128 are input into multiplexer 250, the output depending on the state of the CSRMUX signal from message poll processor 222, transmitted along line 108. The selected message branch address from multiplexer 250 is output along message branch address lines 252 to branch address output register 254 and comparator 256. The control branch address from lines 126 is also input into comparator 256 and register 258. If the requested address in comparator 256 is the same, comparator 256 outputs a SAME ADDRESS signal along line 260 to arbitration control logic circuit 262.

Whenever arbitration control logic circuit 262 receives a MESSAGE BRANCH REQUEST, it outputs a MESSAGE STROBE along strobe line 264, which latches the message address into the register 254. Similarly, whenever arbitration control logic circuit 262 receives a CONTROL BRANCH REQUEST, it outputs a CONTROL STROBE along strobe line 266 to latch the control address into register 258.

The operation of arbitration control logic circuit 262, functionally described previously, avoids collisions between addresses on the same branchline 36. The arbitration control logic circuit 262 does this by determining, when a SAME ADDRESS signal is received, whether message poll 90 or control poll 92 is using the address. The prior description gave one example of this operation, from which the other possible scenarios that exist logically follow. However, the state table attache as FIG. 9B clearly sets forth all the possibilities between timing of input signals to arbitration control logic circuit 262 and output signals from arbitration control logic circuit 262. If a collision will not occur, a CONTROL ENABLE clocks register 258, whereas a MESSAGE ENABLE clocks register 254 to output the proper address on lines 270 and 272, respectively. If the CONTROL or MESSAGE ENABLE is not received, all of lines 272 or 274 are pulled high to VCC potential through a 10 Kohm resistor(not shown) attached to each line. This then provides an address of 11111 (equal to 31) which is an improper branch address that will not affect operation of branch multiplexer 56, as described hereinafter.

FIG. 10 illustrates branch multiplexer 56, which transfers the CLOCK and DATA signals from control poll 92 and message poll 90 within branch controller 54 to the appropriate branchline 36 using the control branch address and message branch address. It should he noted that during operation at times other than when a collision is being avoided, both CONTROL DATA and MESSAGE DATA will be transmitted through branch multiplexer 56.

Branch multiplexer 56 inputs the branch address signal for CONTROL DATA on lines 270, which is input into demultiplexer 274. Similarly, branch multiplexer 56 inputs the branch address for MESSAGE DATA on lines 272 to demultiplexer 276. Both demultiplexers 274 and 276 are standard demultiplexers that input a five bit address and output a SELECT signal on one of thirty lines within control select bus lines 278 or message select bus lines 280. The control select bus lines 278 containing the CONTROL SELECT is used to switch demultiplexers 282 and 284, which are 30:1 and 1:30 demultiplexers. Similarly, the message select bus lines 280 containing the MESSAGE SELECT is used to switch the demultiplexers 286 and 288, which are also 30:1 and 1:30 demultiplexers.

Control data line 118 is connected at the data input of demultiplexer 286 and the data output of demultiplexer 284. Message data line is similarly connected to demultiplexers 286 and 288. Depending on the control select bus lines 278 containing the CONTROL SELECT signal, the corresponding one of thirty control data lines 290 or 292 will be connected to control data line 118. Similarly, depending on the message select bus lines 280 containing the MESSAGE SELECT signal, the corresponding one of thirty message data lines 294 and 296 will be connected to message data line 106.

So that data path having minimal noise characteristics is achieved, the CONTROL SELECT and the MESSAGE SELECT are input to both multiplexers 298 and 300, each of which are composed of thirty different 2:1 multiplexers and basically act as a combiner of the 30 different lines of 292 and 296, as well as 290 and 294, out onto the 30 lines within databus 302.

FIG. 10 also shows that both the CONTROL SELECT on one control select bus lines 278 and the MESSAGE SELECT on one message select bus lines 280 is input to multiplexer 304, as well as the CONTROL CLOCK on control clock line 120 and the MESSAGE CLOCK on message clock line 104. Multiplexer 304 is a composed of thirty 2:1 multiplexers and operates so that the branchline 36 being used for transfer of CONTROL DATA also receives the CONTROL CLOCK, and the branchline 36 used for transfer of MESSAGE DATA receives the MESSAGE CLOCK.

Also shown in FIG. 10 is that multiplexer 306 inputs the CONTROL SELECT on one control select bus lines 278 and the MESSAGE SELECT on one message select bus lines 280, as well as inputting the MESSAGE DIRECTION and CONTROL DIRECTION signals. Thus, for the selected branchline 36, the DIRECTION signal is output along direction line bus 308 to provide the proper state for input or output of data, as will be described hereinafter.

Branch Driver/Receiver

Figure 11:
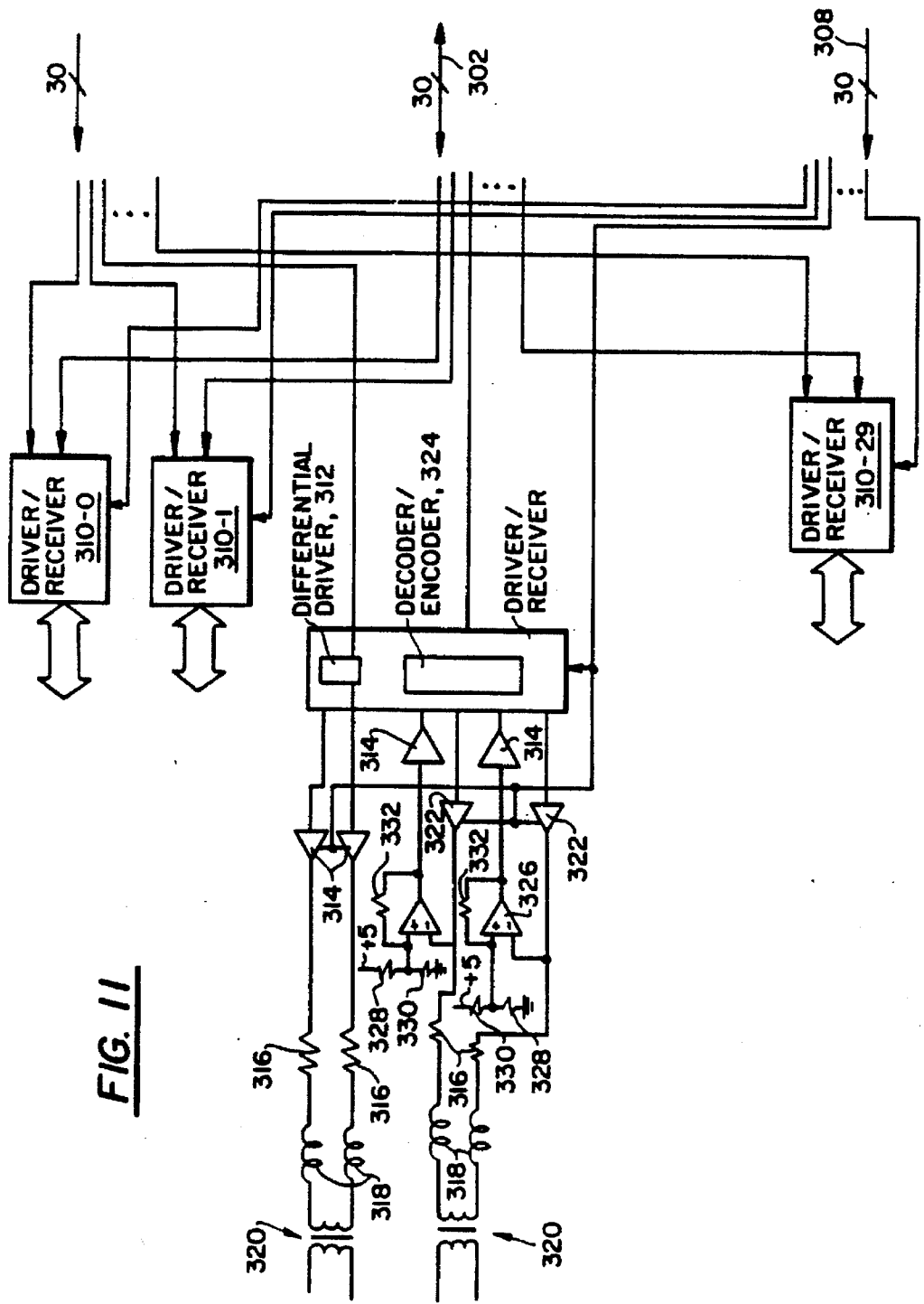
FIG. 11 illustrates the branch driver/receiver interface according to the present invention.

Illustrated in FIG. 11 is branch driver/receiver 58, which provides the driver/receiver function so that the various CONTROL CLOCK, CONTROL DATA, MESSAGE CLOCK, and MESSAGE DATA can be effectively transmitted to each branch interface 34, despite the fact that the data signals are being transmitted at 50 Khz and must travel distances of up to about 200 feet. So that such signal transmission can take place, the present invention uses the branchline 36 illustrated in FIG. 2 as well as the driver/receiver described hereinafter.

Branch driver/receiver 58 is made of thirty different driver receiver circuits 310. Each driver receiver circuits 310, as illustrated in FIG. 11, contains an differential driver 312 that inputs the BRANCH CLOCK signal and outputs a differential BRANCH CLOCK signal of BRANCH CLOCK and BRANCH CLOCK BAR. Both BRANCH CLOCK and BRANCH CLOCK BAR are transmitted through buffers 314, a 10 ohm resistor 316, a 100 microhenry inductor 318, and into a transformer 320 and then output onto branchline 36. decoder/encoder 324 encodes downstream DATA and decodes upstream DATA so that the encoded DATA signal follows the characteristics of the signal illustrated in FIG. 4L. It is noted that other encoding/decoding schemes could be used. Downstream data signals are then output just as BRANCH CLOCK SIGNALS, but are not transmitted until tri-state buffers 322 are enabled by one of the DIRECTION SIGNAL transmitted along line 308. However, upstream DATA signals, after passing resistor 316, are supplied to the negative terminal of differential receivers 326A and 326B, the positive terminals of differential receivers 326 being biased in opposite manner, as illustrated, using a 6.8 kohm resistor 328 and 3 kohm resistor 330. Also, connected between the positive terminal and the differential receiver 326 output is a 30 kohm resistor 332. The upstream DATA signal then passes through buffers 314 for decoding by decoder/encoder 324.

Branch Interface

FIGS. 12 and 13 illustrate two different embodiments of branch interfaces 34, each of which can be used interchangeably when connected to a branchline 36 and appliance 30. As will be apparent hereinafter, the illustrations of FIGS. 12 and 13 are simplified to show signal and power lines for attachment of only a single appliance 30. The branch interface 34 described in detail hereinafter can provide the interface for two different appliances 30.

Figure 17A:
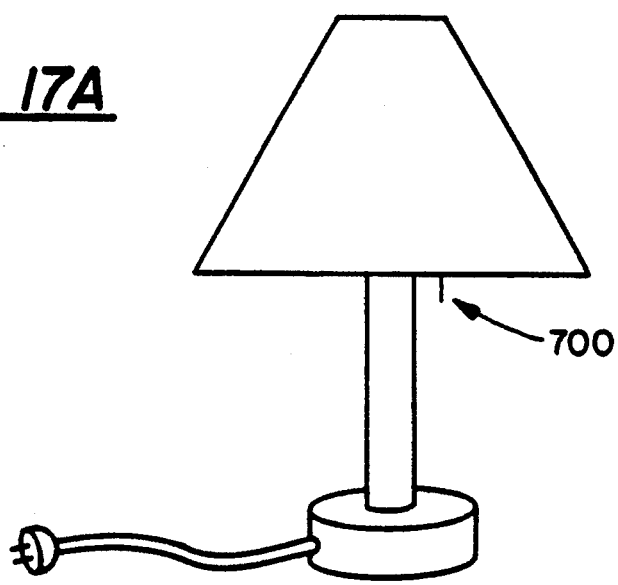
FIGS. 17A–17B illustrate block diagram of conventional appliances and simple appliances according to the present invention.
Figure 17B:
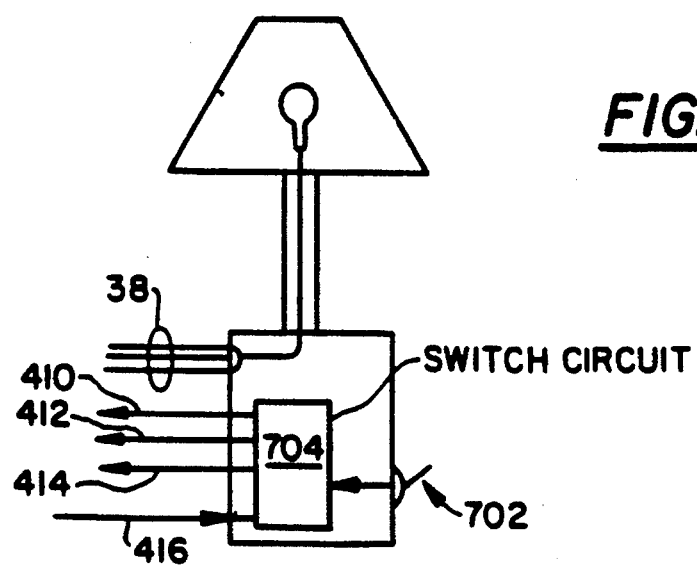

FIG. 12 illustrates a branch interface 34 configured for conventional appliances 30 that are "conventional" and only require AC electrical power, such as such as the light illustrated in FIG. 17A, or "simple" simple appliances 30, such as the light illustrated in FIG. 17B. Other simple appliances, such as switches and sensors having very limited control capacities, as described further hereinafter, are also connectable to a branch interface 34 configured for simple appliances.

Branch interface 34 of FIG. 12 utilizes a configurable interface 340, which is a circuit that can be used interchangeably with the configuration of branch interface 34 illustrated in FIG. 13. Connection of the two clock and two data lines of branchline 36 are made to interface driver/receiver 342, described hereinafter with reference to FIG. 15A. Clock line 344, not clock line 346, data line 348, and not data line 350, as well as out data line 352 and not out data line 354 connect interface driver/receiver 342 to configurable interface 340.

Select bus 360 of FIGS. 12 and 13 connects configurable interface 340 to appliance type select circuit 362. Appliance type select circuit 362 is simply a number of pull down resistors that will pull down the internal lines in configurable interface 340 so that a signal for the type of appliance 30 that is attached can be transmitted to the branch interface 34 and controller 32. FIG. 3C illustrates the various signals and their meanings.

It was stated previously that the preferred embodiment of configurable interface 340 allows attachment of two appliances 30. Select bus 360 includes select line 364, which, when pulled down, will result in one appliance 30#0 being a 0000 appliance 30 as defined in FIG. 3C, and appliance 30#1 being the type that results from the connection of lines 366, 368, 370, and 372. However, if line 364 is not pulled down, appliance 30#1 will also by the type of appliance 30 as appliance 30#0.

It should be noted that controller 32 receives the signal for the type of appliance 30 every time STATUS CONTROL DATA is transmitted upstream, within bits 0–3 of byte 5, shown in FIG. 3A.

Address rom 374 contains the address for the configurable interface 340, to which is connected the appliances 30 that will utilize this address, such that controller 32 can associate a unique address with each appliance 30. The address within address rom 374 is transmitted via address line 380 to configurable interface 340. How it is used will be described hereinafter.

Power up reset line 376 provides a power up reset signal, which is activated at initial start up and after a power failure to begin the reinitialization of each branch interface 34.

Communication error line 382 provides an output that a communication error with controller 32 has taken place, which can be referenced externally. As will be described hereinafter, when a communication error with controller 32 takes place, the affected branch interfaces 34 revert to a local communication mode with the attached appliance 30 so that limited functionality still exists.

Oscillator 384 provides an oscillation signal to configurable interface 340, which is used for circuit timing and is applied via line 386. Oscillator 384 can be a conventional oscillator, preferably outputting a 4 mHZ signal.

Also illustrated in FIG. 12 is ground potential 388 providing a ground for configurable interface 340, and AC power, such as 120 VAC, being applied via power lines 38, as illustrated in FIG. 1, to ac/dc converter 390, converted to 5 Vdc by ac/dc converter 390, and input into configurable interface 340 on DC line 392. Power line 38 is also connected to connector 394, which can be a plug-in receptacle into which an electrical appliance 30 can be connected, or a hardwired connection to an appliance 30.

Relay switch 396, controlled by POWERON/POWEROFF signal transmitted along switch control line 398 to relay switch 396. which can be a known relay type switch, control the application of AC power to connector 394, as will be described hereinafter. The presence of AC power is detected by AC detector 400 and the result of which transmitted via detector line 402 to configurable interface 340.

Also illustrated is plug detector 404, which is a detector that can detect when a two or three prong plug, conventionally used, is plugged into connector 394 when it is a receptacle. Conventional appliance signal line 406 inputs a signal to configurable interface 340 indicating that such a conventional plug is being used.

The last lines illustrated, status 0 line 410, status 1 line 412, status 2 line 414, and control bit line 416 transmit three status signals from an appliance 30 to configurable interface 340, and a control bit from configurable interface 340 to appliance 30. The APPLIANCE STATUS SIGNALS 0–2, illustrated in FIG. 3D, are continuously provided by a analog circuit within a simple appliance 30. One example of such a circuit is wall switch in which one of line 412 and 414 is left floating in different on off switch positions, such that LHL for power allowed and HLL for power off result. If a conventional appliance 30 is being used, these lines will be unconnected and AC power delivery to the conventional appliance 30 will depend on whether plug detector 404 detects an appliance is plugged in. Otherwise, the states of APPLIANCE STATUS SIGNALS 0–2 will control AC power delivery to simple appliances 30.

FIG. 13 is similar to FIG. 12, but shows a configuration for normal appliance 30 and complex appliance 30. One difference is that rather than status 0 line 410, status 1 line 412, status 2 line 414, and control bit line 416 transmitting three status signals and one control bit, data in line 420, data out line 422, and clock out line 424 transmit data and a clock signal, through appliance driver/receiver 426 to appliance channel data line 428, appliance channel not data line 430, appliance channel clock line 432, and appliance channel not clock line 434, in response to enable signals on address enable line 436 and clock enable line 438 from configurable interface 340 to appliance driver/receiver 426. As will be described hereinafter, this permits digital data transmissions between configurable interface 340 and a normal appliance 30 or complex appliance 30.

Further, for a normal appliance 30 and complex appliance 30, appliance channel 430, pulled high internally within configurable interface 340, is pulled low by a appliance 30 to indicate to configurable interface 340 that a normal appliance 30 or complex appliance 30 is attached. It should be noted that for a conventional appliance 30 or simple appliance 30 of FIG. 12, that configurable interface 340 determines that a simple appliance 30 or conventional appliance 30 is connected because appliance channel 430 is pulled high internally, and will be high during the tri-state period indicated in FIG. 4F for the amode/nadata line.

Figure 15A:
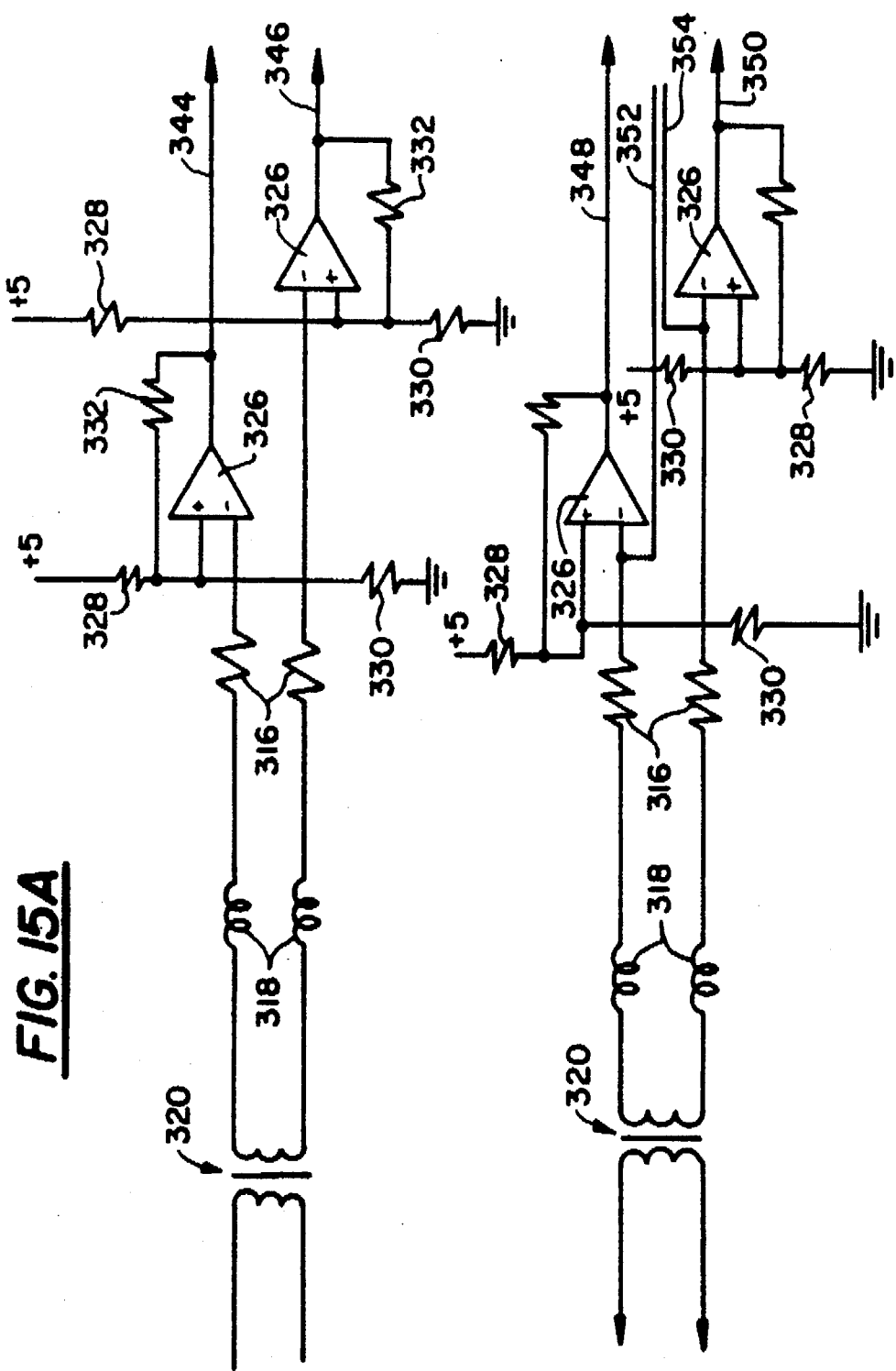
FIG. 15A illustrates the branch interface driver/receiver of FIGS. 12 and 13 according to the present invention.

FIG. 15A illustrates interface driver/receiver 342 of FIGS. 12 and 13, showing clock and not clock lines attached to transformer 320, with each line then passing through an inductor 318 and resistor 316 into the negative side of a differential receiver 326. Both lines then have the positive side of the differential receiver 326 biased with resistor 328 and resistor 330, which is also fed to the output, at clock line 344 or not clock line 346, of the respective differential receiver 326 through a resistor 332. Data line 348 and not data line 350 are input data lines, while lines 352 and 354, connected to the negative input of the respective differential receiver 326, for transmission of upstream data.

Figure 15B:
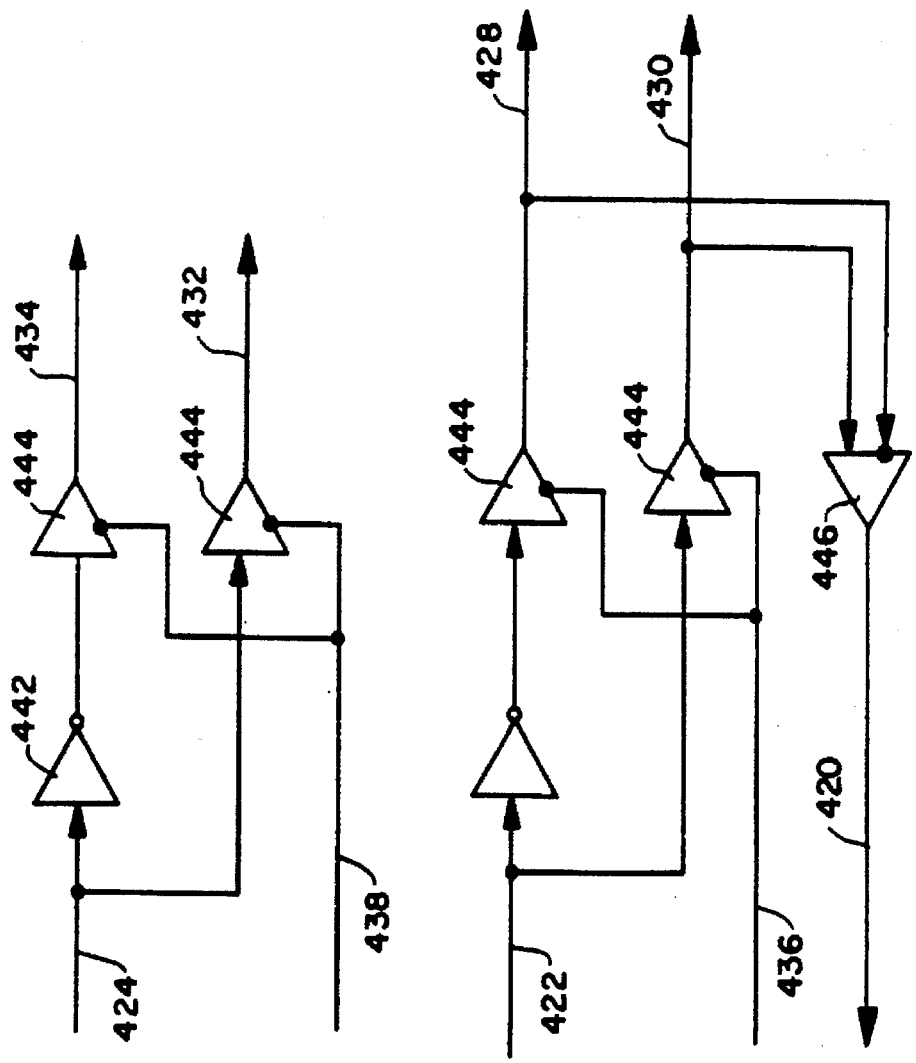
FIG. 15B illustrates the branch appliance interface driver/receiver of FIG. 13 according to the present invention.

FIG. 15B illustrates appliance driver/receiver 426 of FIG. 13. Clock line 424 passes the APPLIANCE CLOCK to inverter 442, which outputs to tri state driver 444, which, when enabled by line 438, outputs NOT APPLIANCE CLOCK along appliance channel not clock line 434. Clock line 424 is also connected to a tri state driver 444 and outputs the APPLIANCE CLOCK on appliance channel clock line 432. Data output line 422 is similarly connected to appliance channel data line 428 and appliance channel not data line 430 with an inverter 442 and tristate drivers 444. However, differential receiver 446 is also connected to appliance channel data line 428 and appliance channel not data line 430, which then inputs serial data on data input line 420 to configurable interface 340.

Figure 14A:
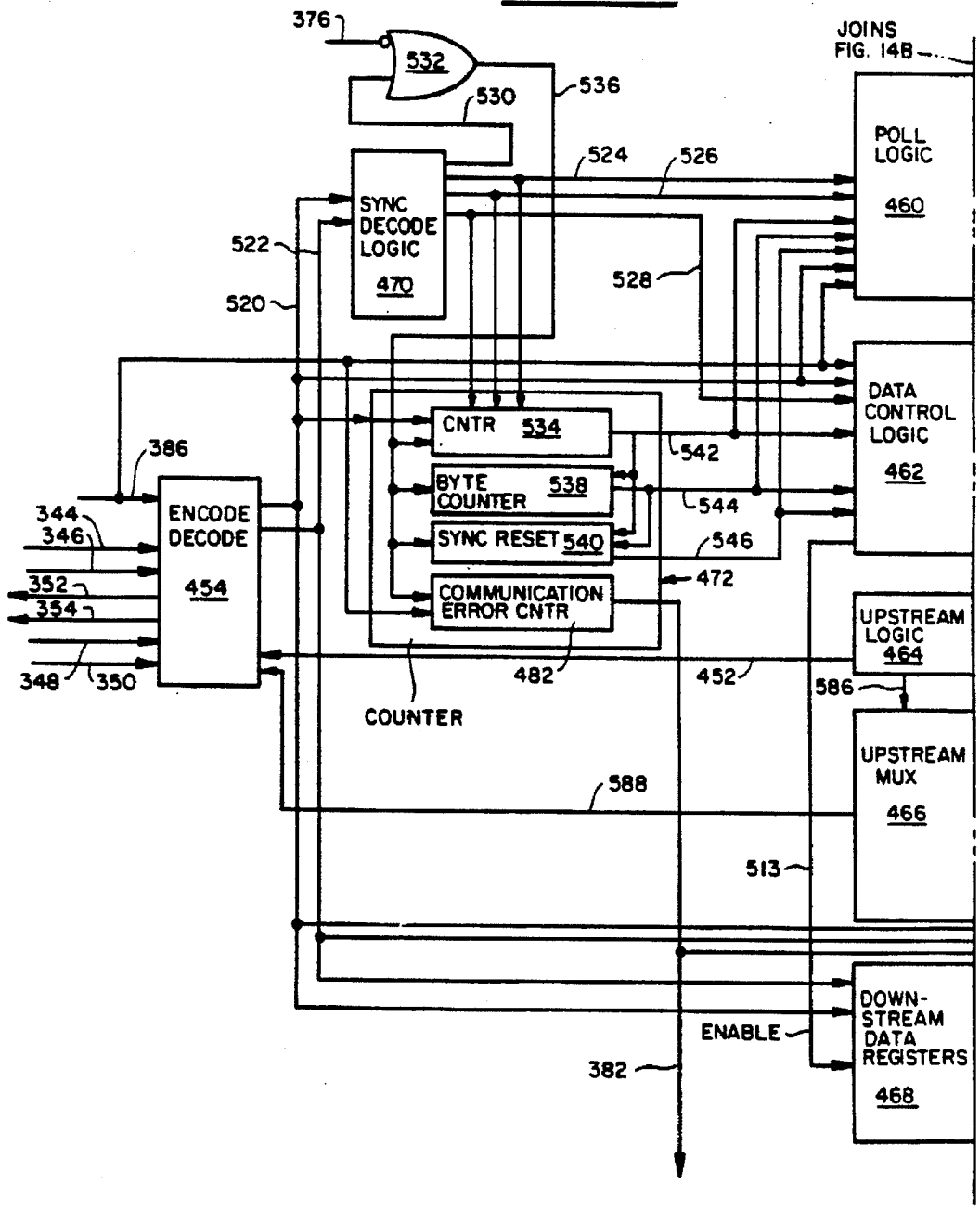

FIG. 14 details configurable interface 340, which will now be described. The lines previously referenced as output from interface driver/receiver 342, described above with reference to FIG. 15A, are connected to branch encode/decode circuit 454, as well as line 386 being input to branch encode/decode circuit 454.

Figure 16A:
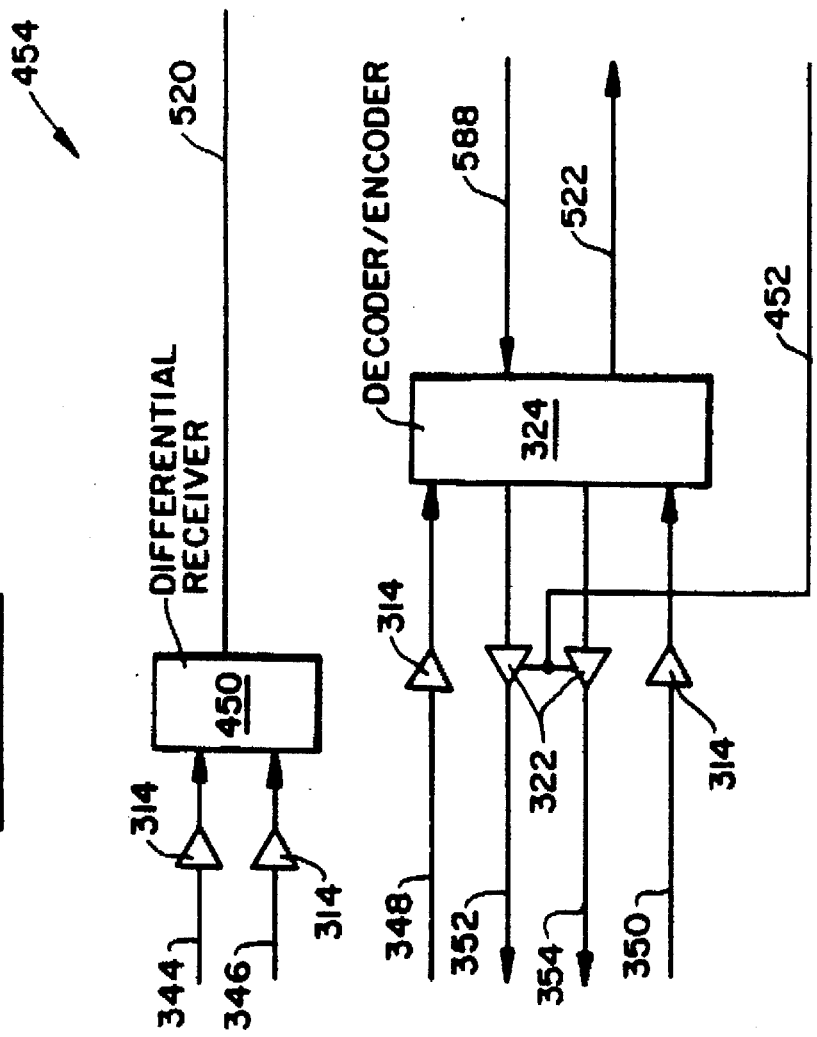
FIG. 16A illustrates the encoder/decoder of FIG. 14 according to the present invention.

FIG. 16A, which illustrates branch encode/decode circuit 454 of configurable interface 340, illustrates a differential receiver 450 for the BRANCH CLOCK, which connects to the differential driver 312 within decoder/encoder 310 of FIG. 11 and buffers 314 over the branch cable illustrated in FIG. 2. A decoder/encoder 324 for DATA is identical to that illustrated in FIG. 11 and includes, for upstream data, a differential driver. Also, the tri-state buffers 322 for upstream DATA signals are similarly enabled with the enable signal transmitted via branch data out enable line 452, which is enabled as described further hereinafter.

The oscillator 384 is also input along line 386 in FIG. 14 into poll logic circuit 460, data control logic 462, communication error counter 482 within internal counter 472, address logic circuit 474, and communication error logic 476.

Figure 16B:
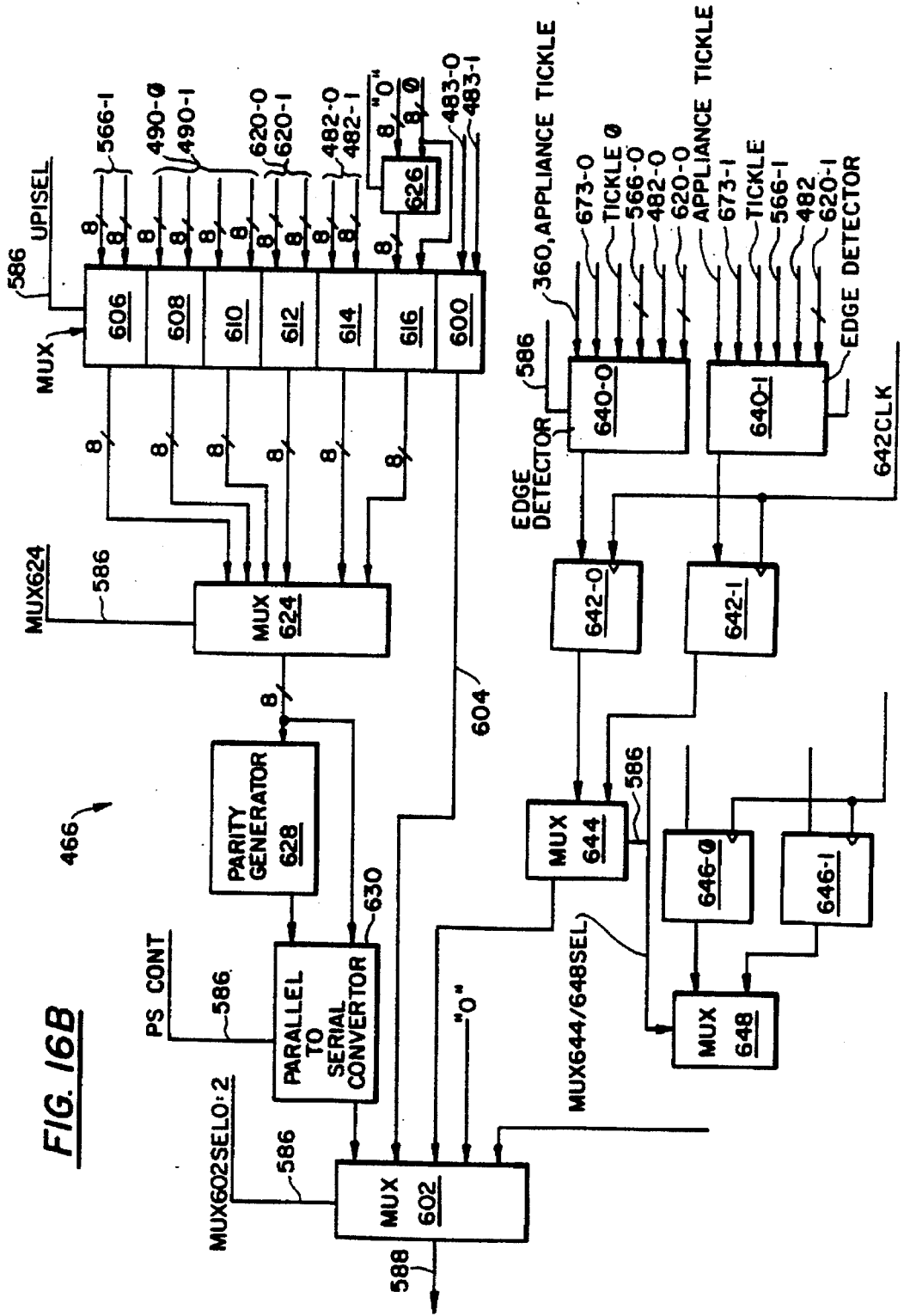
FIG. 16B illustrates the upstream multiplexer of FIG. 14 according to the present invention.
Figure 16C:
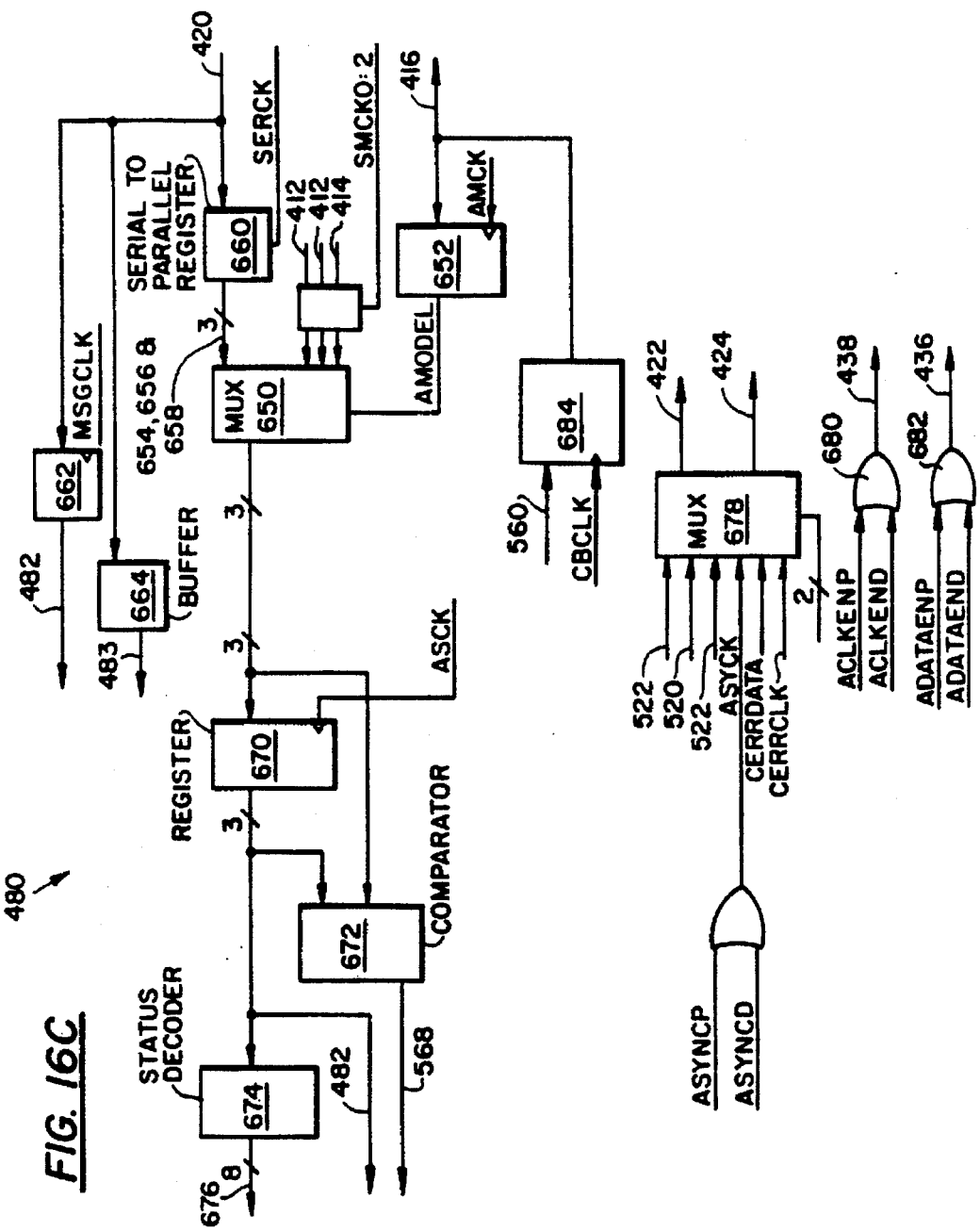
FIG. 16C illustrates the appliance control circuit of FIG. 14 according to the present invention.
Figure 16E:
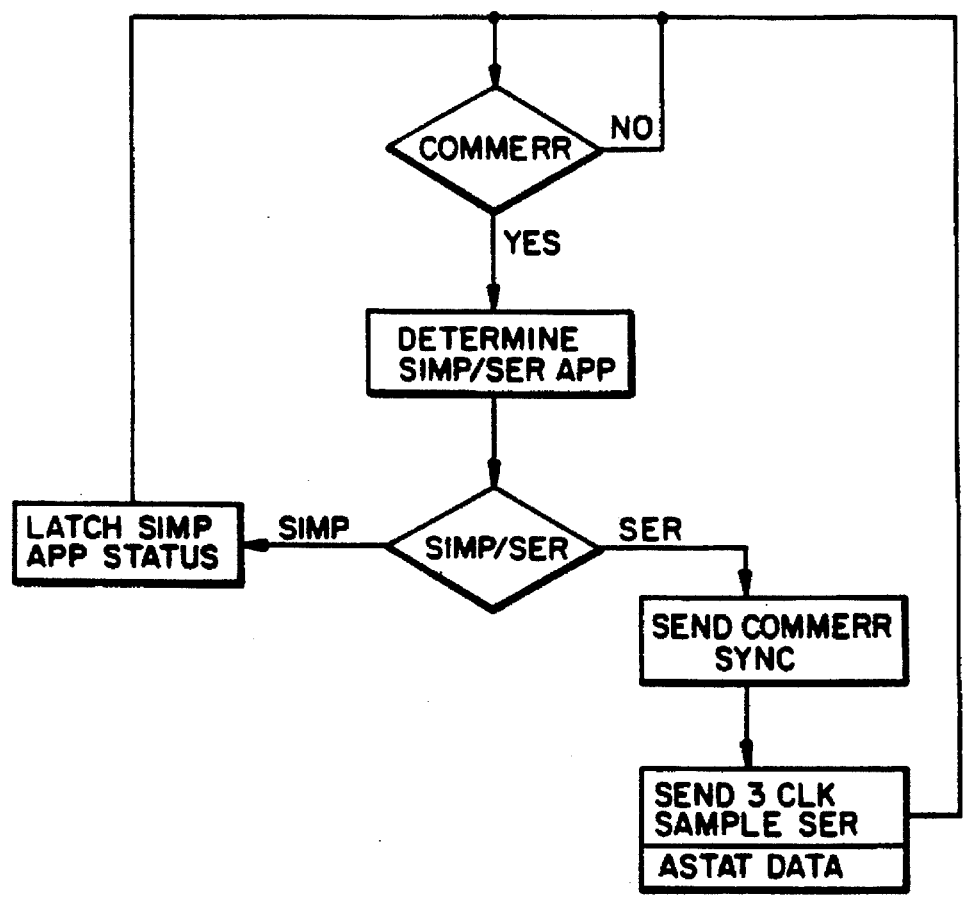
FIG. 16E is a flow chart illustrating operation of communication error state machine of FIG. 14 according to the present invention.

In operation, the first signal applied to configurable interface 340 is POWER UP RESET, which causes the beginning of initialization, described hereafter. The POWER UP RESET is applied to address logic circuit 474 and is then applied from address logic circuit 474 to address rom 374 along address line 380. As illustrated in flowchart FIG. 16G, if address rom 374 is connected, address logic circuit 474 signals address rom 374 to input the stored 15 bit address into the 15 most significant bits of long address register 488-0 and long address register 488-1 via long address input bus 486. Address logic circuit 474 then inputs a 0 in bit 0 of long address register 488-0 and a 1 in bit 0 of long address register 488-1, which gives two unique long addresses within configurable interface 340, one for use by each appliance 30-0 and 30-1.

Upon initial use, a single interface 34 is connected at a time to the controller 32. Changing the appliance status causes registers 492-0 and 492-1, which store a short 5 bit address, to return to 00000. Placing a high tickle signal on line 485-0 indicates to control poll processor communication is desired. After sending a data sync as described before, interface 34 will transmit the long address in the first STATUS CONTROL DATA packet it sends. Controller 32, and actually message processor 52, will format a COMMAND CONTROL DATA packet containing an short address with the "tickle" bit, bit 5, set, which causes the short address to be stored in register 492 that matches the 16 bit long address sent in the same COMMAND CONTROL DATA packet.

This long address is then supplied along long address output bus 490-0 and long address output bus 490-1 to upstream multiplexer 466 for transmission upstream in every thereafter, STATUS CONTROL DATA packet, as described in detail hereinafter.

In subsequent transmissions, the LLCB byte is input into comparators 500-0 and 500-1 on receipt of a LLSACK signal from data control logic 460 via line 501-0 and 501-1 and, if it matches with the contents of registers 492-0 or 492-1, branch interface 34 signals data control logic 462 along match line 498-0 or match line 498-1 so that data control logic 462 can begin its control sequence to input data.

Also, if the LLCB matches, byte 3, bits 0-4 illustrated in FIG. 3B are latched into comparator 504-0 and 504-1 upon receipt of a BYTCK3 signal via lines 503-0 and 503-1 from logic circuit 462, a comparison is made with the contents of registers 492-0 and 492-1. If this comparison is inaccurate, the incorrect comparison generates a signal along frame error line 506-0 or 506-1 connected to data control logic 462, which then provides a FRAME ERROR signal along control bus 508 to control data registers 510 and 512, for use described hereafter.

The BRANCH CLOCK, which would be either the CONTROL CLOCK or the MESSAGE CLOCK is input along clock line 520 and BRANCH DATA, which would be either CONTROL or MESSAGE DATA, is input from branch encode/decode circuit 454 onto data line 522. The BRANCH CLOCK is input, as illustrated in FIG. 14, to sync decoder 470, poll logic circuit 460, data control logic 462, internal counter 472, downstream data registers 468, and appliance logic circuits 480-0 and 480-1, whereas BRANCH DATA is input to sync decoder 470, downstream data registers 468, and appliance logic circuits 480-0 and 480-1.

Sync decoder 470 determines when the various sync patterns of FIG. 3G are input to determine when a control poll, message poll, data transfer, or reset sync are input, and outputs an appropriate signal along control poll sync line 524, message poll sync line 526, data sync line 528, and branch reset line 530.

FIG. 3G illustrates the table for sync decoder 470. When a signal is received, decoder 470 generates an output signal for such sync on the appropriate line, as described hereinafter. Branch reset line 530 is input to reset OR logic 532. Control poll sync line 524 and message poll sync line 526 are also connected to both poll logic circuit 460 and bit counter 534 within internal counter 472, whereas data sync line 528 is connected to bit counter 534 within internal counter 472 and data control logic 462. The RESET signal output along reset line 536 from reset OR logic 532, which also inputs a POWERUP RESET along power up reset line 376, is input to bit counter 534, byte counter 538, communication error counter 482, and sync reset decoder 540 within internal counter 472.

Bit counter 534, within internal counter 472, outputs a BIT SIGNAL on bit counter output line 542 to poll logic circuit 460, data control logic 462 and upstream control logic 464, as well as to byte counter 538, and sync reset decoder 540 within internal counter 472 at each BRANCH CLOCK pulse. Byte counter 538 counts the number of 9 bit bytes, and outputs a BYTE SIGNAL along byte counter output line 544 to poll logic circuit 460, data control logic 462, upstream control logic 464 and sync reset decoder 540.

Sync reset decoder 540 generates a SYNCRESET via sync reset line 546 to poll logic circuit 460 and data control logic 462 at the end of the count for the appropriate sequence taking place, either the control poll, message poll, CONTROL DATA transmission, or MESSAGE DATA transmission so data having the same pattern as a SYNC is ignored by sync decode logic 470.

Communication error counter 482 contains a 4 second counter, which generates a COMMERR signal, also referenced as COMMFAIL, (communication error) if it has not been reset within this time. COMMERR is then input, via communication error line 382 to electrical power logic control circuit 478-0 and electrical power logic control circuit 478-1, as well as to communication error logic 476 so that limited local operation of attached appliances 30 can take place as will be described hereinafter if such a condition occurs.

Downstream data registers 468, which inputs both the BRANCH CLOCK and BRANCH DATA, contains a serial to parallel register 548 that takes the input serial BRANCH DATA and outputs such data in an 8 bit byte wide format along byte wide data bus 560 to control registers 510 and 512, address registers 484-0 and 484-1, electrical power logic control circuit 478-0, electrical power logic control circuit 478-1, appliance control logic circuit 480-0, and appliance control logic circuit 480-1. Parity checker 562, also within downstream data registers 468, inputs each 9 bit byte of COMMAND CONTROL DATA and outputs a PARITY ERROR along parity error line 564 to the parity error bit 0 of registers 510 and 512, depending on the appliance receiving the data. Control registers 510 and 512 also receive the FRAME ERROR signal from data control logic 462 along bus 508, which will be described further hereinafter, which is placed in bit1 of the appropriate register 510 or 512. Further, if bit 5 of byte 0 of COMMAND CONTROL DATA is high, this indicates a configurable interface 340 SELF TEST, as shown in FIG. 3B, and this bit is latched into bit 5 of the appropriate register 510 or 512. Thus, bits 0, 1, and 5 of byte 0 of STATUS CONTROL DATA, as indicated in FIG. 3A, are stored and eventually output along control bus 566 to be output as BSTAT0 or BSTAT1 byte signals to upstream multiplexer circuit 466, as further described hereinafter.

Depending on whether a MESSAGE POLL or CONTROL POLL takes place, poll logic circuit 460 also contains the logic circuity to determine if a change in STATUS CONTROL DATA has occurred and to initiate the detection of whether an UPSTREAM MESSAGE DATA packet should be transmitted upstream, given the various inputs previously described.

If a CONTROL POLL is received, poll logic circuit 460 will enable, via a signal on lines 511-0 and 511-1, the CONTROL DATA PENDING signal, previously described with reference to control poll operation, to upstream multiplexer circuit 466 for transmission onto branch data lines.

If a MESSAGE POLL is received, poll logic circuit 460 sends signals, described further hereinafter, along appliance control logic control bus 568-0 to appliance control logic circuit 480-0 and appliance control logic control bus 568-1, which then allow control logic circuits 480-0 and 480-1 to determine if an upstream message is pending, and output the bit indicating this is transmitted along message pending line 483-0 or 483-1 to upstream multiplexer circuit 466.

The various logic operation performed by poll logic circuit 460 are also concisely set forth in the state diagrams attached as FIGS. 16I1–16I3.

Data control logic 462 and upstream control logic 464 together provide the logic for implementing data transmissions. When data control logic 462 receives a DATASYNC, and either lines 498-0 or 498-1 go high, indicating a compared address, the input BIT signals, BYTE signals, and BRANCH CLOCK signals are used to control the data transmission.

For a DATA packet transfer through downstream data registers 468, a data enable along line 513 from data control logic 462 latches the data, as well as applies data control signals along either power control bus 572-0 or 572-1 to electrical power logic control circuit 478-0 or electrical power logic control circuit 478-1, as described hereinafter to latch byte 4, and applies appliance data control signals along one of busses 481-0 or 481-1 to appliance control logic circuit 480-0 or appliance control logic circuit 480-1 to latch bytes 6 and 7 as shown in FIG. 3B. Other COMMAND CONTROL DATA or MESSAGE DATA to be transmitted to an appliance 30 or electrical power logic control circuit 478-0 is also input by downstream data registers 468 to bus 560.

Serial to parallel register 548 of downstream data registers 468 outputs each byte of data to byte wide data bus 560 to electrical power logic control circuit 478-0, electrical power logic control circuit 478-1 appliance logic circuits 480-0 and 480-1, which use or transmit this data as described hereafter.

For an upstream DATA transfer, data control logic 462 and upstream control logic 464 cooperate to send enable signals along upstream control bus 586 to upstream multiplexer circuit 466 so that the appropriate bytes of upstream data are properly transmitted, serially, along upstream serial data line 588 to branch encode/decode circuit 454 as described hereinafter.

Figure 16F:
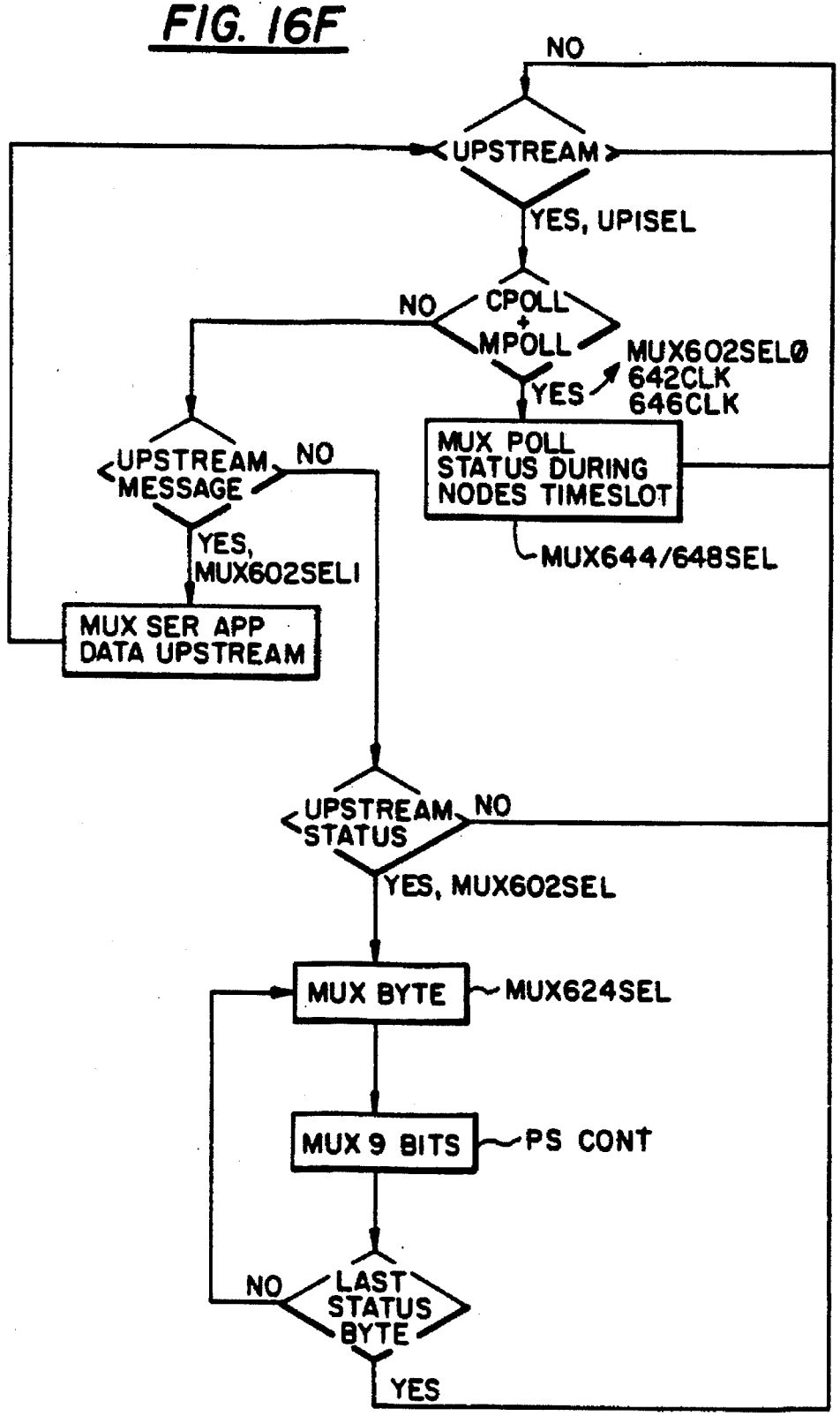
FIG. 16F is a flow chart illustrating operation of upstream state machine of FIG. 14 according to the present invention.
Figure 16G:
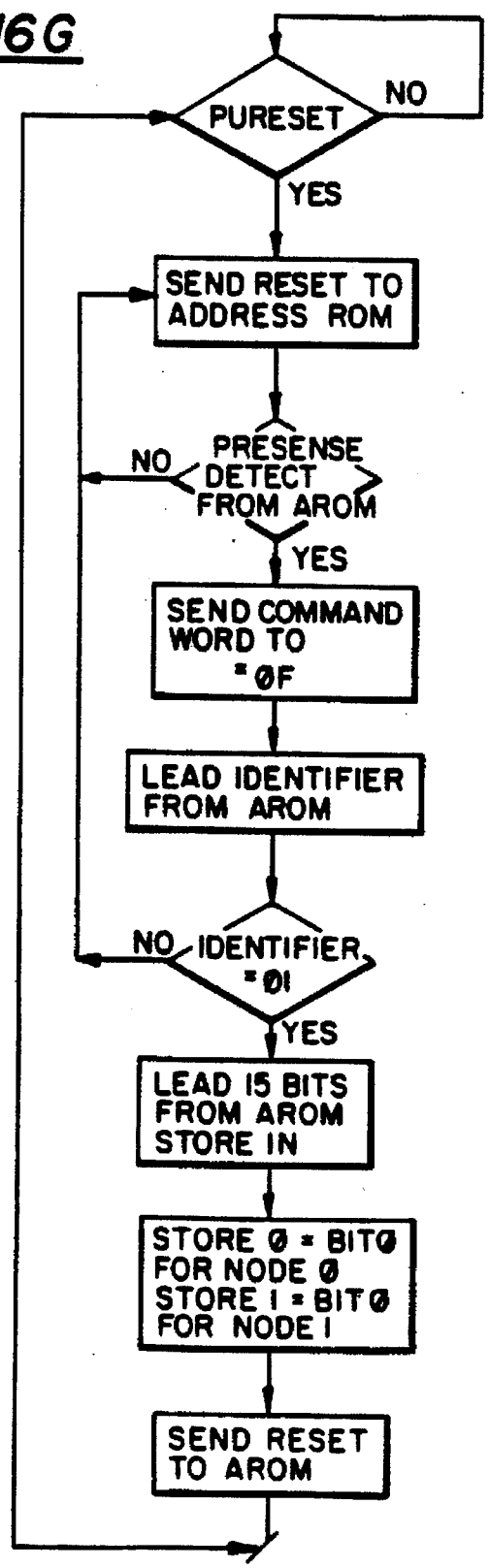
FIG. 16G is a flow chart illustrating operation of address logic circuit of FIG. 14 according to the present invention.

The state machine diagram for data control logic 462 illustrated in FIGS. 16H1–16H6 and the flow chart for upstream control logic 464 illustrated in FIG. 16F further illustrate operation of these logic circuits.

Upstream multiplexer circuit 466, mentioned previously, is further illustrated in FIG. 16B, and illustrates a nested array of connected multiplexers, which allows the upstream data, whether MESSAGE DATA or STATUS CONTROL DATA to be transmitted upstream in proper serial manner. UP1SEL, output from upstream logic circuit 464 along upstream control bus 586 selects whether appliance 30#0 or appliance 30#1 connections should be made in the multiplexers described below.

Serial multiplexer 600 is enabled with a UPISEL signal from control bus 586 so that serial data for MESSAGE DATA transmissions pass to select multiplexer 602 along line 604. MUX602SEL0:2) signal via control bus 586 enables select multiplexer 602 so that output line 604 is connected to upstream serial data line 588 and serial data is output.

Multiplexers 606, 608, 610, 612, 614, and 616, are all 8 bit wide 2 to one multiplexers that select a control byte from lines 566-0 or 566-1, a long address from lines 490-0 or 490-1, a power logic status byte from lines 620-0 or 620-1, all being enabled by UP1SEL from control bus 586 depending on whether appliance 30#0 or appliance 30#1 inputs data. It should be noted that each data transmission is based on a counters, which are zeroed at the beginning of a poll sync or message sync via lines 531-0 and 531-1 or the LLCB comparison, described above, for data transmissions. Each multiplexer output line is input into multiplexer 624, an 8 bit wide, 6 byte multiplexer which connects each of the lines using MUX624SEL signals from control line 586 so that the signals will be output in a manner that corresponds with the STATUS CONTROL DATA structure set forth in FIG. 3B. It should be noted that multiplexer 626, disposed at the input of multiplexer 616, is enabled by line 364 of FIG. 12 as described previously.

Multiplexer 624 outputs the byte wide signals to parity generator 628 and to parallel to serial generator 630, which outputs the nine bit wide signal, including parity, along line 588.

For control polls, edge detector 640-0 determines if there has been a change in state of STATUS CONTROL DATA by inputs of electrical power logic control circuit 478-0, appliance logic control circuit 480-0, and from register 510 contents for appliance 30-0, and edge detector 640-1 determines if there has been a change in state of STATUS CONTROL DATA by inputs of electrical power logic control circuit 478-1, appliance logic control circuit 480-1, and from register 512 contents for appliance 30-1.

If the state of any of these inputs has changed, edge detectors 640-0 or 640-1 will output a signal to control poll flip flops 642-0 or 642-1, respectively, which are latched in response to 642CLK, so that the contents are then transmitted to 2 to 1 multiplexer 644, the selected appliance then outputting a signal to multiplexer 602 for output onto the branch data lines.

For message polls, MPD0 or MPD1 signals, which indicates a BRANCH MESSAGE is pending from appliance 30#0, are input into flip flops 646-0 and 646-1, and output to multiplexer 648, which then outputs the signal at the appropriate time in the message poll sequence for that appliance.

Appliance control logic circuit 480 of FIG. 16C illustrates both appliance control logic circuit 480-0 and appliance control logic circuit 480-1 of FIG. 14. Appliance control logic circuit 480 inputs status 0 line 410, status 1 line 412, and status 2 line 414, described in FIG. 12, to multiplexer 650, which switches, using the signal along amodel, either status 0 line 410, status 1 line 412, and status 2 line 414 or lines 654, 656, 658, depending on whether a simple/conventional appliance 30 or normal/complex appliance 30 is attached. Multiplexer 650 selects using output Amodel, which obtains its value from mode flip flop 652, that inputs a low value on control bit line 416 at the appropriate time, indicated in FIGS. 4E and F, from poll logic circuit 460 via poll control bus 568 for normal or complex appliance 30, or is always at a high value for a simple appliance 30 or conventional appliance 30.

Serial parallel register 660 is enabled at the appropriate time, via SERCK from data control logic 462, to input the three STATUS BITS that will eventually be transmitted upstream as STATUS CONTROL DATA in byte 6, bits 0–2 for a normal/complex appliance.

Data line 420 is also input into flip flop 662, which outputs the MESSAGE PENDING BIT on bus 482 to upstream multiplexer 466, and is clocked by MSGCLK from poll logic 460. Also, data line 420 is input to buffer 664, which then outputs serial data from an appliance 30 to upstream multiplexer 466 via bus 483.

The output of multiplexer 650 is input into register 670 and comparator 672, which compares the contents of the new STATUS DATA with the old STATUS DATA, and outputs an indicative change signal to poll logic circuit 460 via control bus 568. The data in register 670 is latched out upon a ASCK clock, and is input along to status decoder 674, which decodes this STATUS DATA so that one of the 8 signals set forth in FIG. 3D is output along status decode bus 676 to the associated electrical power logic control circuit 478-0, for use as described hereinafter.

The STATUS DATA from register 670 is also input to comparator 672 to be used as the basis for the next comparison, and also output along bus 482 to upstream multiplexer circuit 466, to be transmitted upstream with the next STATUS CONTROL DATA packet.

Multiplexer 678 inputs the branch clock, branch data, and syncs from data control logic 462 and poll logic 460 to output appliance serial data and clocks along the appliance channel. The BRANCH CLOCK is input twice to obtain the reversal of sync and clock as compared to communications along branchline 36 during a sync period for added stability, as illustrated in FIGS. 4E, F, G and 4I. The output of error logic circuit 476 is also input into multiplexer 678 so that when a communications error is detected, local mode data, such as appliance status data, can be transmitted to an appliance 30.

Clock and data enable lines 436 and 438 are enabled using ACLKENP, ACLKEND, ADATAENP, and ADATAEND signals transmitted from poll logic circuit 460 and data control logic 462, respectively, which are ORed together by OR circuits 680 and 682, to provide the appropriate enable outputs. It should also be noted that bit 0 line of byte wide data bus 560 is input into register 684, which is output when triggered by a CBCK signal from poll logic circuit 460 to output the control bit along control bit line 416.

Electrical power logic control circuit 478 of FIG. 16D1 illustrates both electrical power logic control circuit 478-0 and electrical power logic control circuit 478-1 of FIG. 14. Switching decisions are made in power logic circuit 684, which inputs the decoded STATUS DATA signal transmitted along line 676 from decoder 674 and the commerr signal via communication error line 382, as well as bit 0 of byte 4 of any COMMAND CONTROL DATA, illustrated in FIG. 3B. Bit 0 of byte 4, the power switch condition SC is input via byte wide data bus 560 to register 686, and output along line 688. FIG. 16D2 defines the logic of power logic circuit 684, which determines the relay control signal switchcon output along switch control line 398 of FIGS. 12 and 13. This logic is defined in terms of the meanings of the decoded STATUS DATA set forth in FIG. 3D. Detector line 402 and conventional appliance signal line 406 of FIGS. 12 and 13 are also input into register 686, and are output along bus 620 to upstream multiplexer circuit 466, for transmission upstream as bits 0 and 3 of byte 4 of STATUS CONTROL DATA, illustrated in FIG. 3A. Further, for a electrical power logic control circuit 478-0 self test, bit 3 of byte 4 of COMMAND CONTROL DATA of FIG. 3B is set high on a downstream transmission, latched into register 686 of FIG. 16D1, and output as bit 4 of byte 4 of STATUS CONTROL DATA of FIG. 3A.

APPLIANCE CONNECT CIRCUIT

FIG. 17A illustrates a conventional appliance 30, which is a home appliance operating with AC power and which has no ability to process any type of control or data signals. Typically, such an interface 34 would then be coded 0010, as illustrated in FIG. 3C, for a 15 amp receptacle. Further, when plugged into a connector 394, plug detector 404 of FIG. 12 will detect a conventional appliance 30 and report this information to controller 32 so that power will be supplied to the illustrated conventional appliance 30 when the light switch 700 is toggled as with a typical light. As such, the present invention is intended for use with such an appliance 30.

Another type of appliance 30, illustrated in FIG. 17B as a simple appliance 30, only requires using control bit line 416, status 0 line 410, status 1 line 412, and status 2 line 414 of FIG. 12. An example of such an simple appliance 30 is a light. The simple appliance 30 light would not be recognized by a user as being different from the conventional appliance 30 light, but different switching operation is implemented. The signal output by switch 702 is input into switch circuit 704, which, depending on the operation desired, will output STATUS DATA in one of the eight signal combinations of FIG. 3D, which will then be input into a electrical power logic control circuit 478 to control AC power delivery using the switching decoder logic illustrated in FIG. 16D2. The control bit along control bit line 416 could be defined by the manufacture, and used in any manner. One switch circuit 704 was described previously.

Figure 18A:
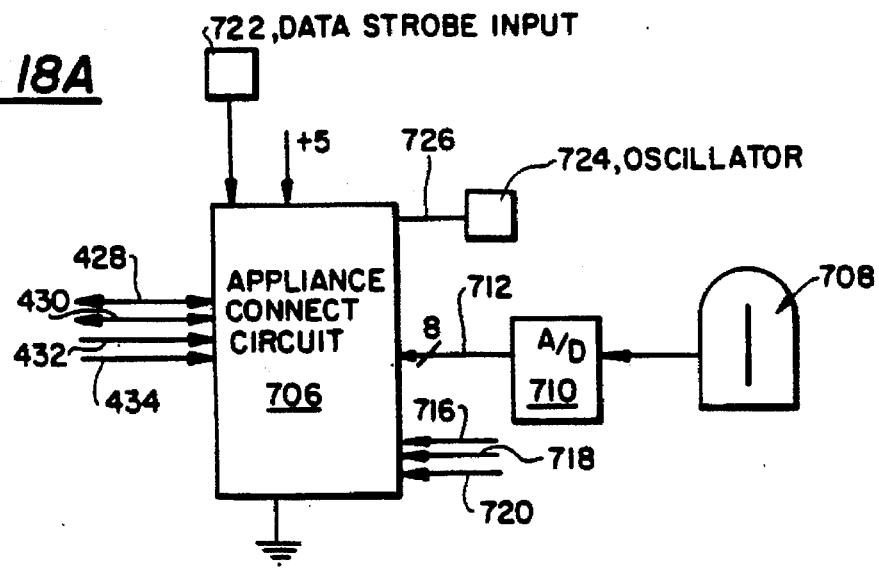
FIGS. 18A and 18B illustrate block diagrams of normal appliances according to the present invention.
Figure 18B:
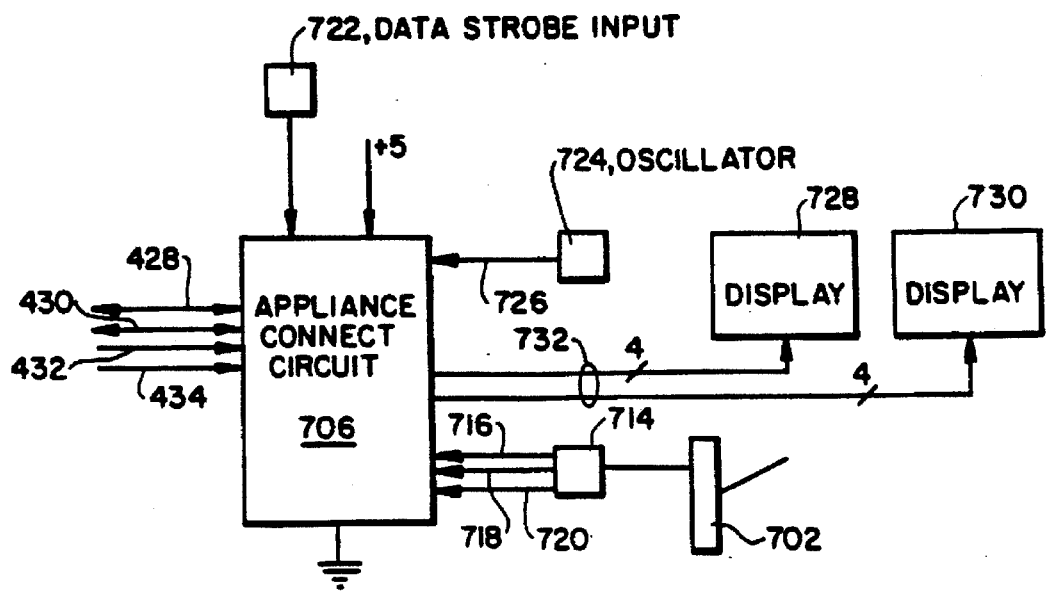

FIGS. 18A and 18B illustrate examples of normal appliance 30 which uses an appliance connect circuit 706, described hereinafter. It should be observed that appliance connect circuit is a multi-mode serial interface. FIG. 18A illustrates a normal appliance 30 that monitors the temperature using a thermometer 708. The thermometer 708 outputs the detected temperature with an analog signal to analog to digital converter 710 that converts this temperature to an 8-bit digital signal, which is then input on appliance input bus 712 to appliance connect circuit 706. Appliance connect circuit 706 needs no AC power, and, as such STATUS DATA lines 716, 718, and 720 to appliance connect circuit 706 are not needed. This STATUS DATA will eventually be used for AC power switching as described previously with reference to FIG. 17B. Appliance connect circuit 706 outputs the byte of data via appliance channel data line 428 and appliance; channel not data line 430 to branch interface 34, for processing and eventual transmission to controller 32 as an appliance report of STATUS CONTROL DATA to controller 32. This byte is byte 7 illustrated in FIG. 3A. Also illustrated is a data strobe input 722 that, if not connected, indicates that the internal circuits, described hereinafter, a used to strobe data into the circuit, or allows the external microprocessor to perform such operation. Appliance external oscillator 724 generates a 4 Khz signal, which is input along line 726 to appliance connect circuit 706 for use internally as described hereinafter.

FIG. 18B illustrates another example of a normal appliance 30, which include digit displays 728 and 730, that could be used, for example, to display the temperature determined by the normal appliance 30 of FIG. 18A. This normal appliance 30 inputs the appliance report as the byte of data in a COMMAND CONTROL DATA packet of FIG. 3A via appliance channel data lines 428 and 430 to appliance connect circuit 706, which processes the data as described hereinafter, and outputs this data along appliance output bus 732 digit displays 728 and 730. STATUS DATA will eventually be used to AC power on the displays 728 and 730, as such lines 716, 718, and 720 are connected to a circuit described previously that allows switch 702 to obtain the various STATUS DATA states for AC power. The other connections illustrated are similar to that described in FIG. 18A.

Figure 19A:
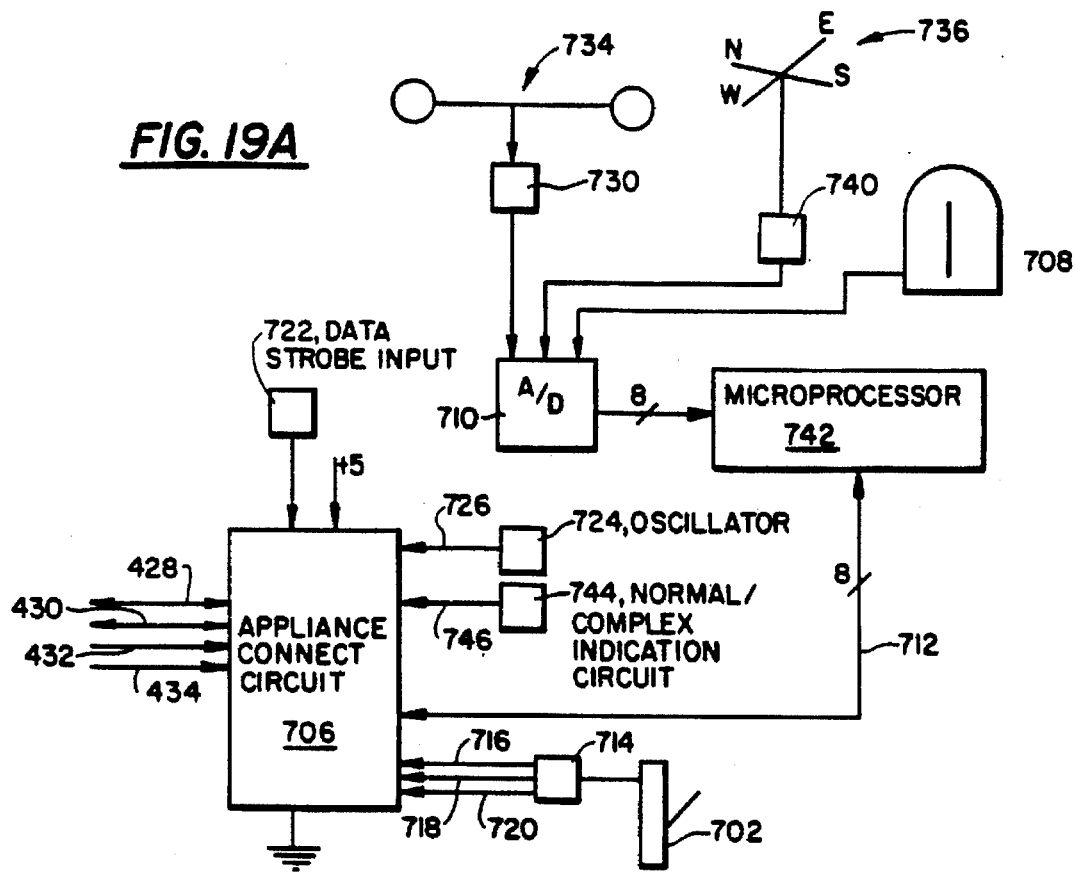
FIGS. 19A and 19B illustrate block diagrams of complex appliances according to the present invention.
Figure 19B:
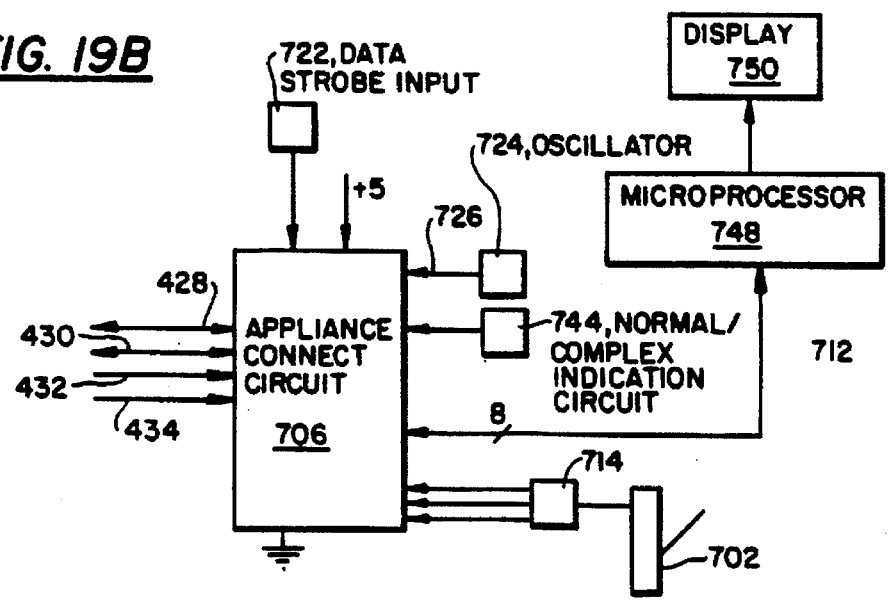

FIGS. 19A and 19B illustrate two examples of complex appliance 30. FIG. 19A illustrates a thermometer 708, barometer 734, and wind sensor 736. Barometer sensor 738 and directional sensor 750 output an analog electrical signal indicating the humidity and wind speed, while such a signal is output directly from thermometer 708. These signals are input into analog to digital converter 710, which multiplexes and converts these signals into digital signals for output along to a microprocessor 742, which processes the signals and outputs such signals on data bus 712 to appliance connect circuit 706.

It should be noted that these signals output from microprocessor 742 will be upstream MESSAGE DATA destined for another appliance 30 through controller 32 of FIG. 1. As such, this output data will preferably use the CORE LANGUAGE MESSAGE TYPES illustrated FIG. 3L for message transmission format, although other MESSAGE format structures could be used and should be considered within the scope of the present invention.

For any complex appliance 30, such as the one being described, normal/complex indication circuit 744, which consists of a pull down resistor, is also connected line 746 to appliance connect circuit 706 to indicate that a complex appliance 30, rather than a normal appliance 30, is attached. Also, in place of a data strobe input, input 722 connects to bit-width circuit 746 to output a signal to appliance connect circuit 706 detailing whether a 4-bit or 8-bit microprocessor is attached to bus 712.

FIG. 19B illustrates another example of a complex appliance 30, which is a microprocessor based display. This could, for example, receive the CORE LANGUAGE MESSAGE TYPES transmitted to controller 32 from the complex appliance 30 described in FIG. 19A in the form of a downstream MESSAGE DATA packet. This packet, input on appliance channel data lines 428 and 430 to appliance connect circuit 706, can then be output to microprocessor 748 via databus 712. Microprocessor 748 can then, for example, process the data so that the appropriate display is observable on display 750.

Figure 20A:
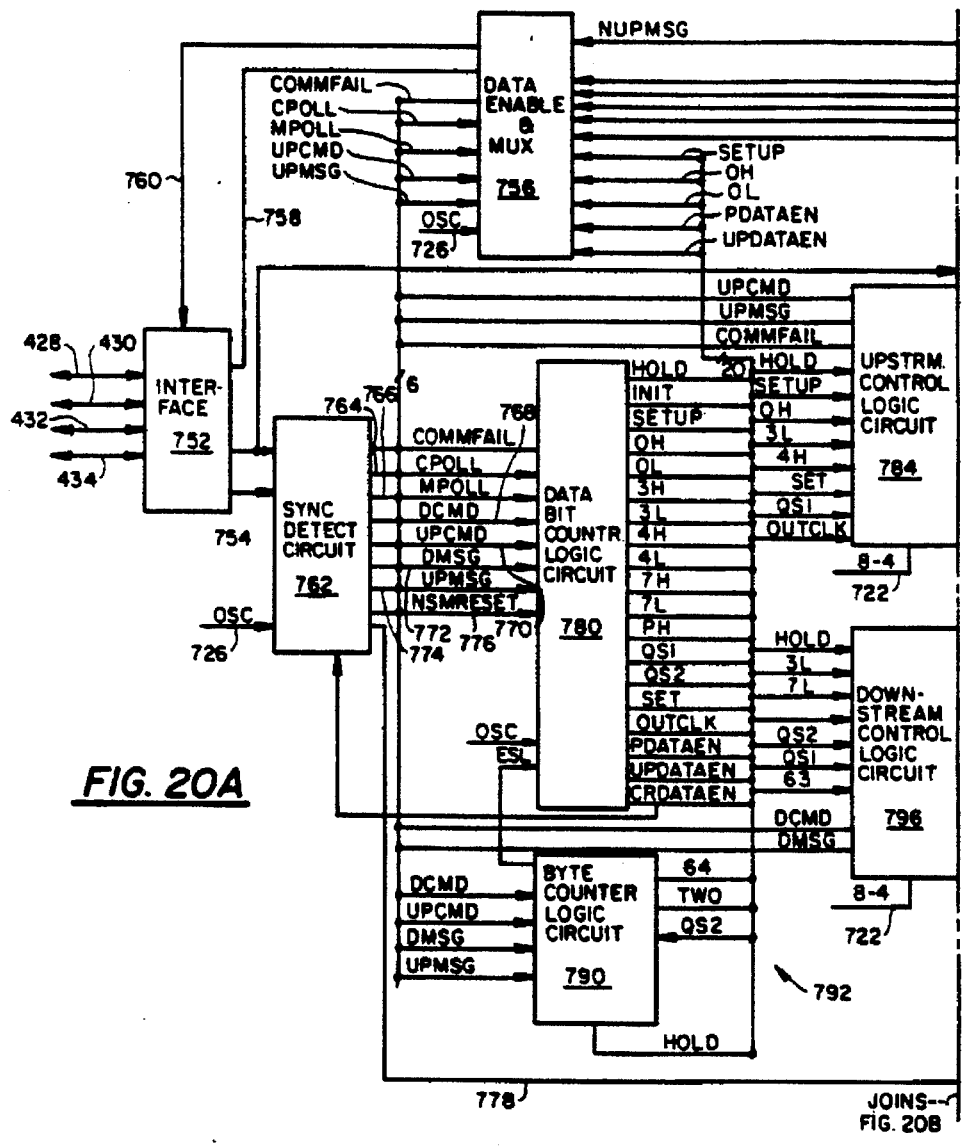
FIG. 20 illustrates a block diagram of the appliance connect circuit according to the present invention.
Figure 20B:
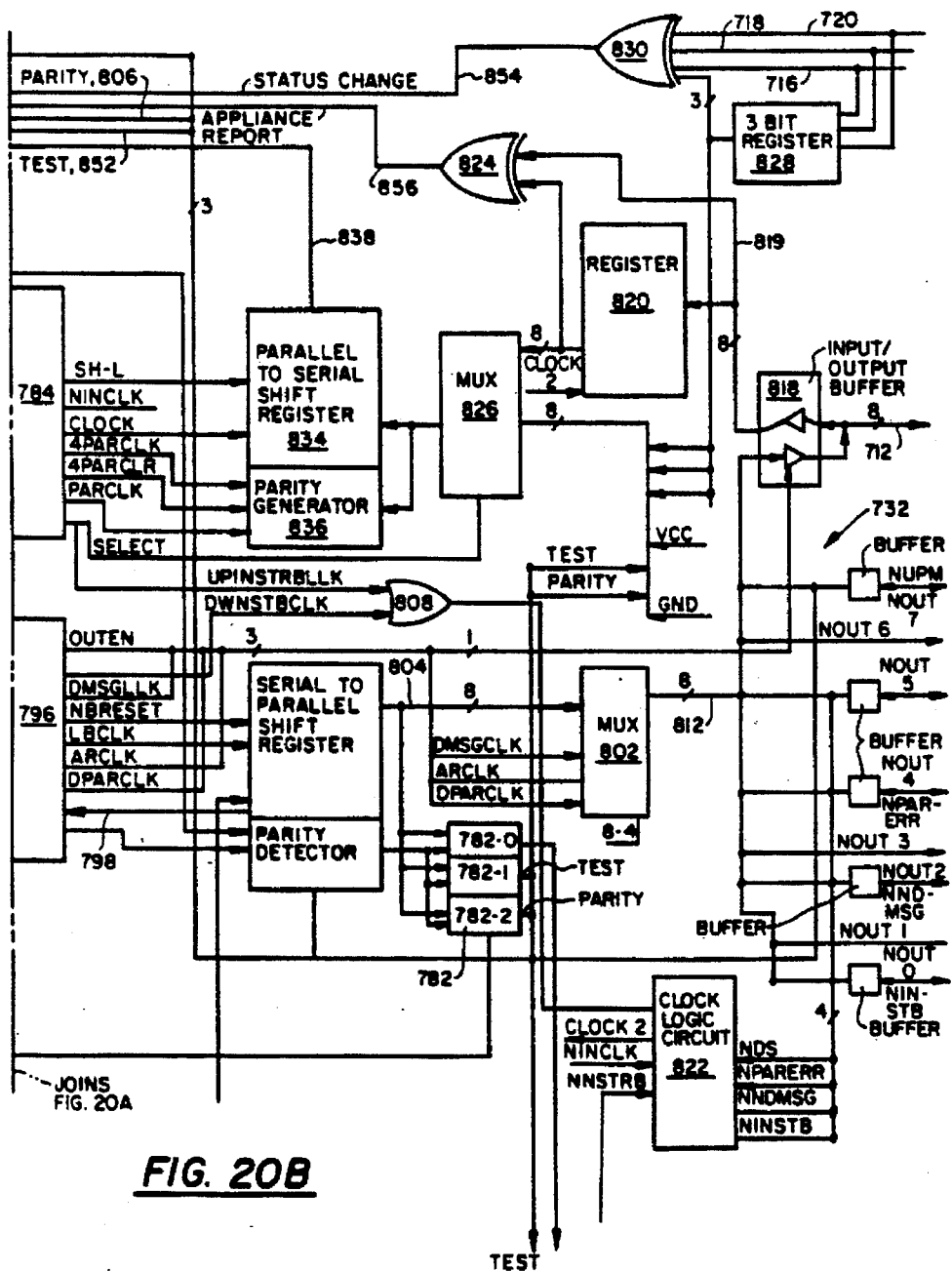

FIGS. 20A and 20B, taken together, illustrate appliance connect circuit 706 of FIGS. 18 and 19, which can be connected to branch interface 34 so that different types of normal appliance 30 and complex appliance 30 can communicate with controller 32 and other appliances 30.

Appliance interface 752 is connected to appliance channel data lines 428 and 430, and appliance channel clock lines 432 and 434. Appliance interface 752 is preferably identical to appliance driver/receiver 426 of FIG. 15B, except that there is no clock enable for the input clock signal.

Appliance interface 752 outputs serial APPLIANCE DATA along appliance data in line 754 to appliance sync decoder 762 and parity checker 788 and outputs the APPLIANCE CLOCK to appliance sync decoder 762 and appliance data logic circuit 780.

This APPLIANCE DATA and APPLIANCE CLOCK could be the control or message polls as illustrated in the bottom portion of FIGS. 4E and 4K, respectively, in which appliance channel clock lines 432 and 434 input the SYNC signals, and, if appliance 30 has a change in status, appliance connect circuit 706 outputs the STATUS DATA PRESENT or UPSTREAM MESSAGE PRESENT signals, along appliance channel data lines 428 and 430.

The APPLIANCE DATA could also be downstream data, in which case portions of a COMMAND CONTROL DATA packet or MESSAGE DATA is input along appliance channel data lines 428 and 430, to appliance data in line 754 through appliance interface 752. Timing and sequence of these data transfers, along these lines, is illustrated in the lower portions of FIGS. 4A, 4B, and 4G.

APPLIANCE DATA is also transmitted upstream, out through appliance connect circuit 706 via data enable/multiplexer 756 along data out line 758 to interface 752. This output data could be bytes 6 and 7 of STATUS CONTROL DATA illustrated in FIG. 3A, or an upstream MESSAGE DATA packet, such as is illustrated in FIG. 3K. Data enable/multiplexer 756 also outputs a data enable along line 760, as described hereinafter.

Sync detect circuit 762 inputs the APPLIANCE CLOCK to determine when a SYNC is received. The various appliance syncs are illustrated in FIG. 3I. Depending on the sync pattern received, sync detect circuit 762 outputs a COMM-FAIL for a communication failure sync, control poll signal for a control poll along line 764, a MPOLL signal for a message poll along mpoll line 766, a DCMD signal for downstream CONTROL DATA bytes along fine 768, a UPCMD signal for an upstream transfer of STATUS CONTROL DATA bytes along line 770, a DMSG signal for a downstream MESSAGE DATA transfer along line 772, and a UPMSG signal for an upstream MESSAGE DATA transfer along line 774. Sync detect circuit 762 also outputs a NSMRESET AND NBRESETCLR along and lines 776 and 778, respectively, when a new sync is received to reset data bit counter logic circuit 780 and to clear the contents of control register 782 after a sync following a BRANCH RESET signal. Sync detect circuit 762 also inputs a NSYNC CLEAR signal from data bit counter logic circuit 780 when data bit counter logic circuit 780 finishes one of the six operations listed in FIG. 3L.

Downstream and upstream data and message syncs are inputs by byte counter logic circuit 790, which contains a byte counter such that it outputs a TWO signal when two bytes are counted, and a 64 signal when the 64 bytes are counted. Byte counter logic circuit 790 can input a HOLD and is incremented by the QS1 signal countbus 792.

Data bit counter logic circuit 780 inputs all of the SYNC signals from sync detect circuit 762 to generate the proper states so that appliance connect circuit 706 can process these various types of data transfers, as well as the APPLIANCE CLOCK, the external system oscillator along line 726, and ESC signal from byte counter logic circuit 790, which resets data bit counter logic circuit 780 after two bytes of COMMAND CONTROL DATA have been transmitted/received in upstream status, downstream command data transfers, or after 64 bytes of data have been transmitted/received.

These various data transfers, described above, will be described with respect to the other circuit elements within appliance connect circuit 706 hereinafter. However, a state diagram, indicating operation of the various states of data bit counter logic circuit 780, with outputs at each state, is set forth in FIGS. 21A1–21A2. As illustrated in FIG. 20, a separate output line exists on count bus 792 for each of these output signals, which is written over the line on which it is output.

Appliance downstream control logic 796 performs the logic operation on downstream data. As such, appliance downstream control logic 796 inputs both the DCMD and DMSG syncs to correctly process the downstream data. Appliance downstream control logic 796 receives inputs signals along bus 792 from data bit counter logic circuit 780, which signals are written over the input line connected to appliance downstream control logic 796. Appliance downstream control logic 796 also is connected to line 722 to determine whether a 4 bit or 8 bit microprocessor is connected if a complex appliance is attached. Parity reset 798 outputs to logic circuit 796 after it has received a parity reset in a COMMAND CONTROL PACKET, which resets the parity checker after it previously detected a parity error. The logic equations for this circuit are listed in FIG. 21B.

Serial to parallel register 800 performs the serial to parallel data conversion and inputs an external BRRESET signal from branch reset line 530 after a branch reset.

The output signals for down control logic 796, described in equation form in FIG. 21B, perform the following functions, all relating to downstream data transfer.

DPAR-CLK, is used to latch the parity value multiplexer/register 802, CB-CLK latches the control bits on bus 804 in control register 782 by causing serial to parallel register 800 to generate a CBCLK signal along after the first byte of COMMAND CONTROL DATA is received, and AR-CLK latches an appliance report during a COMMAND CONTROL DATA transfer in parallel to parallel register/mux 802. Parity checker 788, which inputs each 9 bit byte, strips bit 9, the parity bit, checks the parity, and outputs a PARITY ERROR signal along parity line 806 if a parity error exists. NPAR-CLR clears the contents of a previously reported parity error residing in parity register 782-2 at the beginning of the next downstream data transfer.

OUTEN, controls each of 8 parallel tri state output drivers when a complex appliance 30 is attached so that bus 712 can properly transmit data bidirectionally. If a normal appliance 30 is attached, DMSGCLK, transmitted along will latch parallel to parallel register/mux 802 to output MESSAGE DATA as described hereinafter.

NBRESET is used for setting low all registers within serial to parallel register 800 during a QS1 state after a byte of data has been output from serial to parallel register 800 to bus 804.

DWNINSTRB1K signal is input to OR logic 808, as well as UPINSTRBCLK from upstream control logic 784, to obtain an INSTRBCLK output signal used by the attached microprocessor to indicate that data is ready to be read or written by appliance connect circuit 706.

Parallel to parallel register/mux 802, mentioned previously, also inputs line 8-4 to configure parallel to parallel register/mux 802 properly for a 4 bit or 8 bit attached microprocessor if a complex appliance 30 is attached to appliance connect circuit 706. Parallel to parallel register/mux 802 then outputs each bit of data along output bus 812 to lines 732/0–7. Output multiplexers for each line of bus 812 are tri-state output buffers. Normally the OUTEN signal line is left unconnected for these tri state output buffers so that either input or output of data can occur, as output lines 732 are used as an output bus only for a normal appliance 30, and is used for inputs for a complex appliance.

MESSAGE DATA input from a microprocessor along appliance input bus 712 for a normal appliance 30 or bidirectional databus 712 for a complex appliance 30, is transmitted through input/output buffer 818 and latched in register 820 on receipt of CLOCK2, derived from interrupt and clock logic circuit 822, as described hereinafter and also input to comparator 824. The data in register 820 is then output the other comparator input for use in the next comparison and select multiplexer 826. Comparator 824 compares the new data with the previous data to determine if it is different, and, if so, outputs an APPLIANCE REPORT CHANGE signal to enable multiplexer 756.

Multiplexer 826 also inputs appliance byte, byte 6 of STATUS CONTROL DATA, shown in FIG. 3A. This includes the STATUS DATA, input on lines 716, 718, and 720, which passes through a three bit register 828 and is also input into a comparator 830, for a similar comparison as just described. Also input are the parity check result from the last downstream data transfer, and the test bit that was latched in the test register of control register 782 if bit 1 of byte 6 of the previous COMMAND CONTROL DATA packet was high.

Upstream control logic circuit 784 performs the logic functions along with data counter logic circuit 780 so that upstream data is transmitted properly. Upstream control logic circuit 784 therefore inputs the UPCMD and UPMSG syncs, as well as the control signals from data bit counter logic circuit 780 and line 722 indicating the width of the attached microprocessor if such is the case. These control signals, on FIGS. 20A and 20B, are printed over each input line for all logic circuits.

Upstream control logic circuit 784 is primarily responsible for controlling the selection of data from either registers 782 or bus 819. The selected data is input to parallel to serial shift register 834 and parity generator 836. Parallel to serial shift register 834 then serially outputs the data along line 838 to data enable/multiplexer 756. The upstream control logic circuit 784 outputs, also printed over the corresponding output line in FIG. 20, are derived using the inputs illustrated in FIG. 20 and the equations for generating the output set forth in FIG. 21C.

Data enable/multiplexer 756, mentioned previously, is controlled by data bit counter logic circuit 780, and determines which data to output along dataout line 758, as illustrated in further detail in FIG. 21D. Control Poll OR gate 850 inputs the signals from parity line 806, testline 852, status change line 854, and line 856 to edge detector 858. If any of these bits have changed from the previous STATUS CONTROL DATA packet sent upstream, or gate 850 outputs a STATUS DATA PRESENT SIGNAL which, in response to a control poll, will be output through multiplexer 860 to multiplexer 862 and output along dataout line 758. Similarly, if the microprocessor has MESSAGE DATA to send upstream, MPOLL DATA line will be low, which is inverted, edge detected by circuit 864 and output through multiplexer 860 during a message poll.

Flip flop 862 controls whether a control poll or message poll exists, and uses the logic equations shown at the select inputs to determine if the output should be high or low. Serial data from line 838 is also input to multiplexer 862 and is output when serial form STATUS CONTROL DATA bytes or MESSAGE DATA should be placed on dataout line 758. OR gate 864 is set high using the equations described to provide a DATA enable.

Also illustrated in FIG. 20 is logic and interrupt circuit 822, which performs two functions. One function is to output CLOCK2 to latch data in register 820. This can be achieved for a complex appliance inputting a NDS signal, as illustrated in FIGS. 4I or 4J. A normal appliance 30 typically uses internally generated NIN_CLK, generated by upstream control logic circuit 784, to obtain CLOCK2, although an external strobe can be input using an external NNSTRB signal.

Control and Message Processing

Figure 22A:
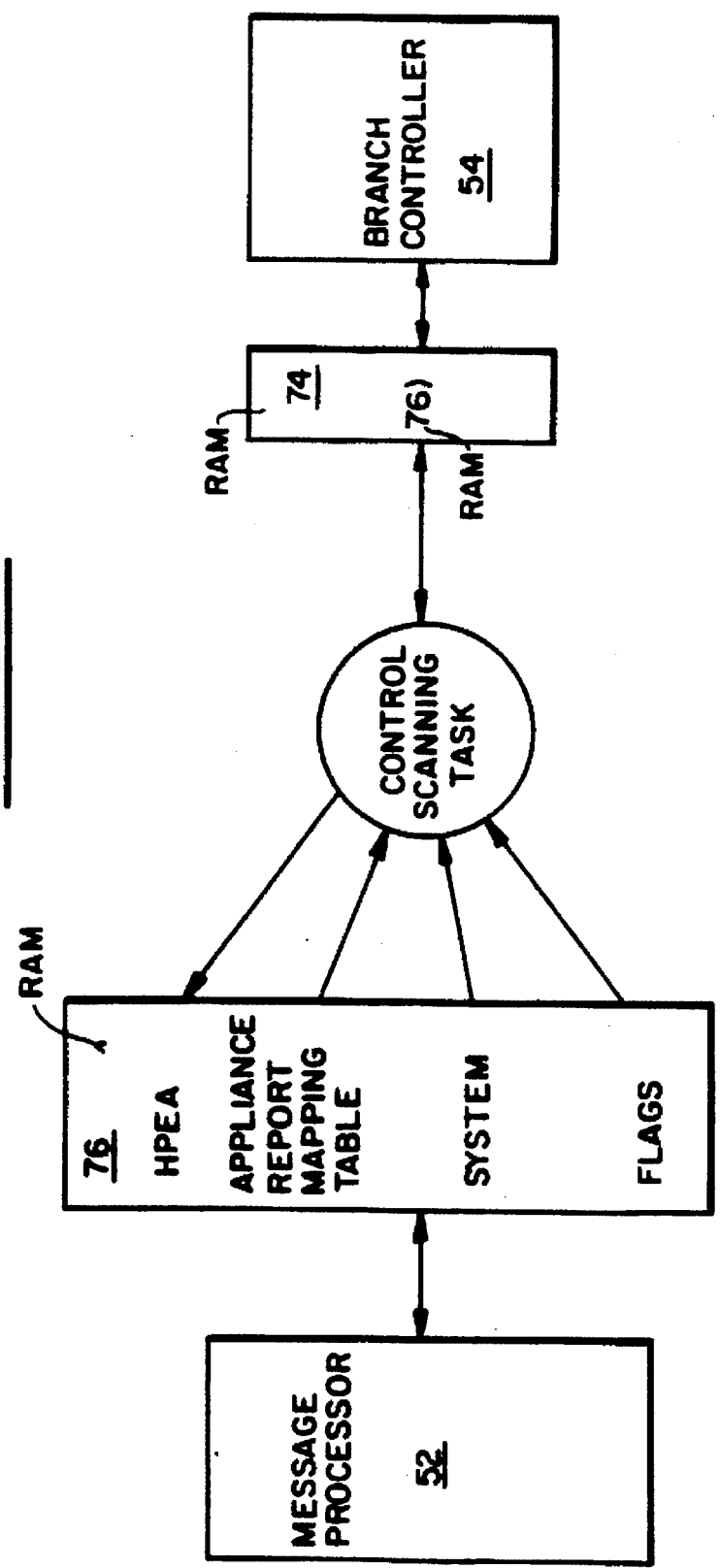
FIG. 22 illustrates flow diagrams of operation of control processor and message processor according to the present invention.

FIG. 22A illustrates a block diagram of the interaction between the control processor 50, and the incoming and outgoing CONTROL DATA transmissions.

COMMAND DATA of FIG. 3A has highest priority in the system, as evidenced by the previous descriptions, everything is accomplished to speed the data transfer rate. The small size of COMMAND DATA packets and the priority in polling, among other features such as arbiters 70 and 72 provide status data with the highest priority.

The control processor has the primary responsibility for performing "control scanning tasks". STATUS DATA input through the branch controller and into ram 76 will be processed. A portion of the processing includes handling "high priority action events" (HPEA). Different types of event actions exist, These include HPEA's that cause a change in other appliances in the system due to a change in electrical power or control information, or an appliance report mapping, in which an 8-bit appliance report received upstream must be transmitted downstream to another appliance.

The control scanning task repeatedly scans for changes in STATUS CONTROL DATA that will then require a new packet of COMMAND CONTROL DATA to be transmitted upstream.

A high priority event action table, stored in the shared memory 76. This table indicates which nodes and which bytes of information to which node the control scanning task must send information based on the change in power and control STATUS CONTROL DATA. This table stores the present state of all appliances power and control logic, so that a subsequent change that affects this state can be acted on quickly. When acted on, one of the action of the control scanning task is to place bit 7 of byte 0 of COMMAND CONTROL DATA high to indicate to the control poll processor that the certain address requires newly updated digital information.

Logic in the high priority event action table may require, for example, a COMMAND DATA packet that would change the status of power in an appliance 30#0 on branch 16 due to a change in STATUS COMMAND DATA from an appliance 30#5 on branch 4.

The control scanning task also determines if an appliance report is transmitted with STATUS CONTROL DATA. If so, it contains preselected mappings that will transmit this appliance report to one or many other attached appliances, depending on the mapping.

Flags that were caused due to parity errors, framing errors and tests, referenced above, are also controlled by the control scanning tasks executed by the control processor.

Figure 22B:
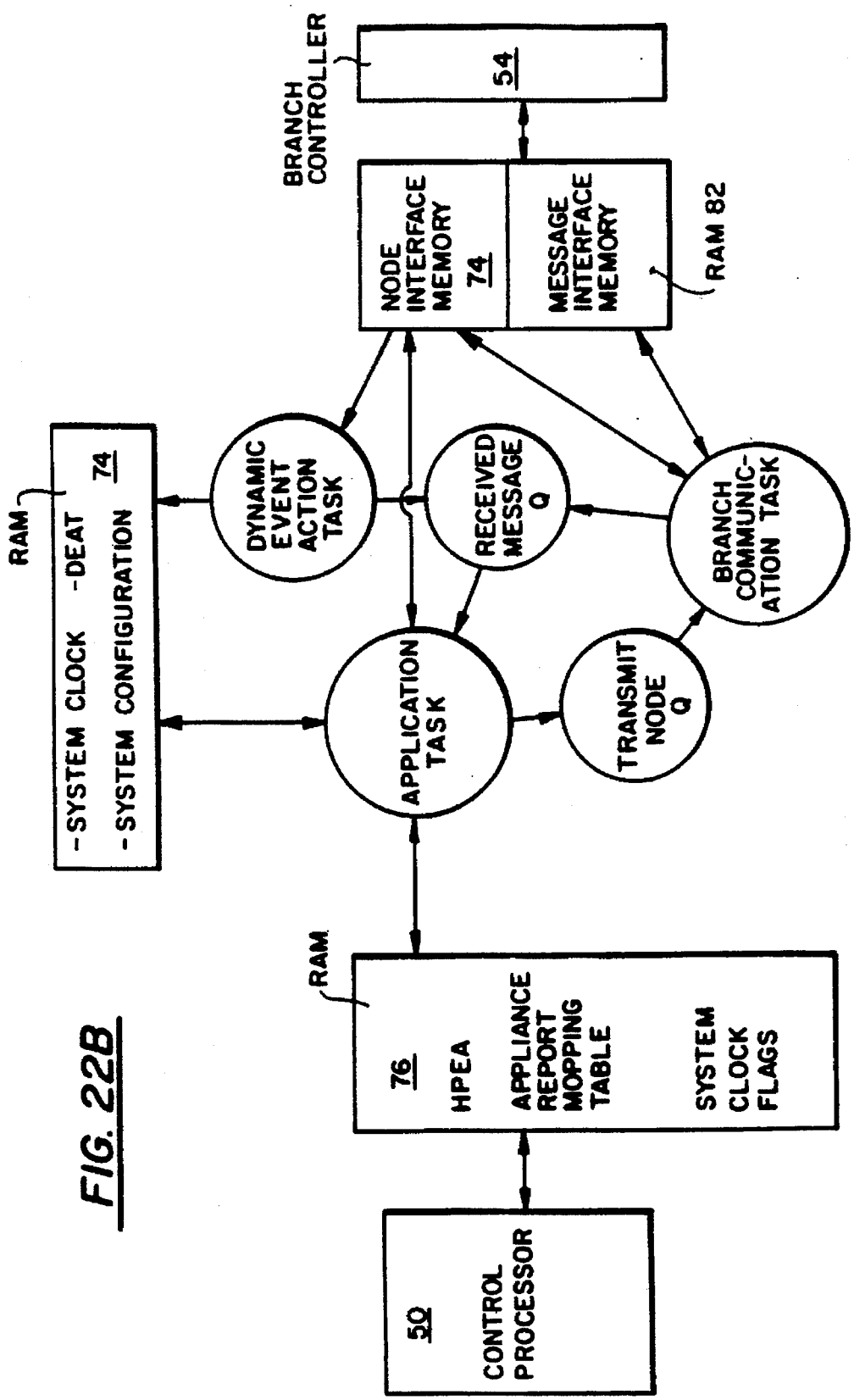

FIG. 22B illustrates the various tasks performed by the message processor, which are labelled "applications tasks".

Different events make up applications tasks. One type of event is a dynamic event action event. Rather than require an appliance to receive data that a certain configuration of events has occurred and then require that appliance to send a message that acts on it, the present invention allows for the previous transmission of a message that is stored in database memory. This message could request that if certain conditions exist that trigger the event action, that some event will then take place. This considerably improves messaging times and also prevents the system for transmitting frequently used messages (events).

Messages input from branch controller are placed in a queue, acted upon in the order received unless it contains certain priority access coding, and the executed message (which is the same as an executed message stored in the event action table) are placed in another transmit queue to be transmitted downstream to the appropriate appliance.

The branch communication task is thus concerned with transmitting message downstream from the transmit queue, and placing upstream messages in the received queue.

It should be noted again that the developed CORE LANGUAGE MESSAGE TYPES of FIG. 3L are most advantageously used in conjunction with the structure described above, although other message and data structures that perform equivalent tasks should properly be included within the scope of the present invention.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

I claim:

1. A system for controlling electrical power and distributing digital data between a plurality of first type appliances only inputting electrical power, second type non-microprocessor based appliances inputting electrical power and receiving and transmitting digital data, and third type microprocessor based appliances inputting electrical power and receiving and transmitting digital data, said system comprising:

a plurality of numerically identifiable electrical branches;

a plurality of branch interface means coupled to each of said plurality of branches for receiving and transmitting some of said digital data, each branch interface means comprising:

means for supplying an address identifying at least one of said first, second and third type appliances associated with that branch interface means;

means for inputting and outputting some of said digital data to said branch;

means for inputting and outputting some of said digital data to a data port associated with that branch interface means; and means for controlling electrical power delivered to said at least one first, second and third type appliance using some of said control digital data;

control processor means for performing control operations including processing control digital data from one of said branch interface means to another of said branch interface means;

message processor means for handling transmission of message digital data from one of said branch interface means to another of said branch interface means;

a plurality of appliance connect means for coupling each of said second and third types of appliances to a respective data port of one of said branch interface means to permit transmission of some of said digital data between each of said second and third types of appliances and said respective data port of one of said branch interface means; and polling means coupled between said control processor means, said message processor means, and said plurality of electrical branches for polling each of said branch interface means, said polling means comprising:

control polling means for polling each of said branches one at a time in a numerically ascending order;

message polling means for polling each of said branches one at a time in numerically descending order; and arbitor means for determining priority of said control and message polling means so that the same branch is never used by said control processor means and said message processor means at the same time.

2. A system according to claim 1, wherein said control digital data comprises downstream transmissions of eight bytes of eight bit command data and upstream transmissions of eight bytes of eight bit status data.

3. A system according to claim 2, wherein said message digital data comprises upstream and downstream transmissions of variable byte lengths of eight bit message data.

4. A system according to claim 3, wherein said transmitted command data, status data, and message data are preceded by a link layer control byte describing a following data signal as one of command data, status data, and message data.

5. A system according to claim 4, wherein said link layer control byte further comprises a short address uniquely identifying each appliance connected to a single branch.

6. A system according to claim 2, wherein said control operations include processing received status data using predetermined control scanning tasks.

7. A system according to claim 6, wherein said predetermined scanning tasks update an event action table stored in a memory, said event action table storing a present state of said command data for each appliance, and a change in an appliance state for a single appliance resulting in a transmission by said control processor means of said command data to said single appliance.

8. A system according to claim 2, wherein each of said appliance connect means includes user configurable means for encoding as a portion of said status data an appliance mode signal, said appliance mode signal indicating said connected appliance type.

9. A system according to claim 1, wherein said control polling means generates a control poll sync signal on one of said branches to indicate to connected appliances that a control poll will take place and said message polling means generates a message poll sync signal on one of said branches to indicate to connected appliances that a message poll will take place.

10. A system according to claim 1, wherein:

each of said branch interface means further comprises means for generating a communication error signal if no digital data signals from said branch are received within a predetermined time period; and said means for controlling electrical power, upon detection of said communication error signal, reverts to a local communication mode.

11. A system according to claim 1, wherein said means for controlling electrical power provides electrical power if a force on signal is input, if a power allowed signal and a conventional appliance signal are input, and if said power allowed signal and a new state signal are input.

12. A system according to claim 1 wherein each of said branch interface means further comprises user configurable means for encoding a branch interface type signal representing a predetermined configuration of said branch interface means.

* * * * *